US006714172B2

(12) United States Patent
Matsuzaki et al.

(10) Patent No.: US 6,714,172 B2
(45) Date of Patent: *Mar. 30, 2004

(54) DISPLAY CONTROL SYSTEM AND ITS CONTROL METHOD, SWITCHING DEVICE, CONNECTION DEVICE, PERIPHERAL DEVICE, PERIPHERAL DEVICE SYSTEM, AND THEIR CONTROL METHOD, AND COMPUTER READABLE MEMORY

(75) Inventors: Eiichi Matsuzaki, Kawasaki (JP); Akio Saito, Yokohama (JP); Takashi Yamamoto, Yamato (JP); Hajime Morimoto, Tokyo (JP); Yuichi Matsumoto, Hiratsuka (JP); Kenji Inoue, Hiratsuka (JP); Nobuharu Ichihashi, Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,380

(22) Filed: Jul. 10, 1998

(65) Prior Publication Data

US 2002/0067318 A1 Jun. 6, 2002

(30) Foreign Application Priority Data

| Jul. 14, 1997 | (JP) | 9-188612 |
| Sep. 4, 1997 | (JP) | 9-239956 |
| Sep. 30, 1997 | (JP) | 9-267271 |

(51) Int. Cl.[7] ............................................. G09G 5/00
(52) U.S. Cl. ......................... 345/1.1; 345/1.2; 345/204
(58) Field of Search ........................... 345/1.1, 1.2, 2.2, 345/7–9, 1.3, 2.1, 2.3, 3.1, 4, 5, 6, 204, 205

(56) References Cited

U.S. PATENT DOCUMENTS

| 4,964,699 A | * 10/1990 | Inouie ........................ 350/332 |
| 5,159,324 A | * 10/1992 | Ohtani et al. ................ 340/712 |
| 5,377,097 A | * 12/1994 | Fuyama et al. .............. 364/401 |
| 5,444,550 A | * 8/1995 | Enokida et al. ............. 358/453 |
| 5,602,983 A | 2/1997 | Naba et al. .................. 395/501 |

(List continued on next page.)

FOREIGN PATENT DOCUMENTS

| JP | 56-94851 | 7/1981 |
| JP | 59-104844 | 6/1984 |
| JP | 63-257352 | 10/1988 |
| JP | 64-038826 | 2/1989 |
| JP | 2-226333 | 9/1990 |
| JP | 3-095593 | 4/1991 |
| JP | 4-79439 | 3/1992 |
| JP | 4-104195 | 4/1992 |
| JP | 5-100644 | 4/1993 |
| JP | 6-96000 | 4/1994 |
| JP | 6-236339 | 8/1994 |
| JP | 8-030428 | 2/1996 |
| JP | 8-328514 | 12/1996 |
| JP | 8-338984 | 12/1996 |
| JP | 9-163032 | 6/1997 |

Primary Examiner—Vijay Shankar
(74) Attorney, Agent, or Firm—Fitzpatrick, Cella, Harper & Scinto

(57) ABSTRACT

The presence/absence of an image information request signal HSYNC output from each of a plurality of display devices is monitored. Based on the monitoring result, image information stored in an image memory of a display controller incorporated in a host computer is distributed to each display device.

11 Claims, 54 Drawing Sheets

U.S. PATENT DOCUMENTS

| | | | |
|---|---|---|---|
| 5,606,336 A | * 2/1997 | Yuki | 345/1 |
| 5,652,845 A | 7/1997 | Arai et al. | 395/286 |
| 5,678,135 A | * 10/1997 | Fukui et al. | 399/77 |
| 5,736,981 A | * 4/1998 | Nobutani et al. | 345/185 |
| 5,887,147 A | 3/1999 | Arai et al. | 395/286 |
| 6,034,652 A | * 3/2000 | Freiberger et al. | 345/2 |
| 6,058,249 A | * 5/2000 | Matsuda et al. | 395/113 |
| 6,193,153 B1 | * 2/2001 | Lambert | 235/380 |
| 6,247,090 B1 | 6/2001 | Arai et al. | 710/129 |
| 6,275,852 B1 | * 8/2001 | Filepp et al. | 709/220 |

* cited by examiner

FIG. 34

| | | | | | | | |
|---|---|---|---|---|---|---|---|
| PD0  | | A0  | D0  | D16 | D32 | | D5104 | don't care |
| PD1  | | A1  | D1  | D17 | D33 | | D5105 | don't care |
| PD2  | | A2  | D2  | D18 | D34 | | D5106 | don't care |
| PD3  | | A3  | D3  | D19 | D35 | | D5107 | don't care |
| PD4  | | A4  | D4  | D20 | D36 | | D5108 | don't care |
| PD5  | | A5  | D5  | D21 | D37 | | D5109 | don't care |
| PD6  | | A6  | D6  | D22 | D38 | | D5110 | don't care |
| PD7  | | A7  | D7  | D23 | D39 | | D5111 | don't care |
| PD8  | | A8  | D8  | D24 | D40 | | D5112 | don't care |
| PD9  | | A9  | D9  | D25 | D41 | | D5113 | don't care |
| PD10 | | A10 | D10 | D26 | D42 | | D5114 | don't care |
| PD11 | | A11 | D11 | D27 | D43 | | D5115 | don't care |
| PD12 | | U0  | D12 | D28 | D44 | | D5116 | don't care |
| PD13 | | U1  | D13 | D29 | D45 | | D5117 | don't care |
| PD14 | | U2  | D14 | D30 | D46 | | D5118 | don't care |
| PD15 | | U3  | D15 | D31 | D47 | | D5119 | don't care |

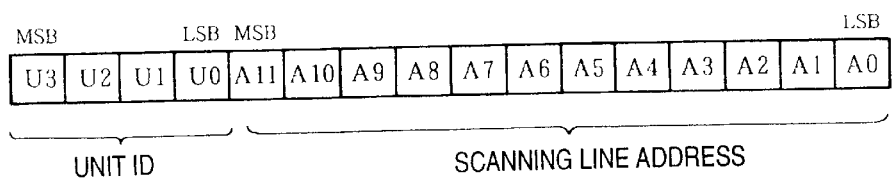

MSB · · · LSB  MSB · · · · · · · · · · · · LSB
| U3 | U2 | U1 | U0 | A11 | A10 | A9 | A8 | A7 | A6 | A5 | A4 | A3 | A2 | A1 | A0 |

UNIT ID — SCANNING LINE ADDRESS

DISPLAY CONTROL SYSTEM AND ITS CONTROL METHOD, SWITCHING DEVICE, CONNECTION DEVICE, PERIPHERAL DEVICE, PERIPHERAL DEVICE SYSTEM, AND THEIR CONTROL METHOD, AND COMPUTER READABLE MEMORY

BACKGROUND OF THE INVENTION

The present invention relates to a display control system, which connects a display controller having an image memory for storing image information, and a plurality of display devices, and controls the plurality of display devices to display an image on the basis of the image information, and its control method.

The present invention also relates to a switching device and connection device, which connect a plurality of peripheral devices to a single host equipment, and a peripheral device system using these devices. More specifically, the present invention relates to a switching device which connects a plurality of printers to a host computer having one printer interface, and a peripheral device system. Furthermore, the present invention relates to a branch device suitable for building a display system that connects a plurality of display devices to a single host equipment to display, a peripheral device system using that device, and their control method.

As a display device for a computer equipment or the like, a CRT display device is generally known. However, since the CRT display device requires a considerable depth in the thickness direction of its display screen, it has a large volume as a whole, and the entire system can hardly be made compact. Display control of such CRT display device must use a CRTC (CRT controller) or the like to refresh display data, and is complex.

As a display device that can compensate for the shortcomings of such conventional CRT display device, a liquid crystal display device, which can realize a size reduction, especially, a low-profile structure, of the display device, is known. Of such liquid crystal device, a display device (to be referred to as an FLCD: FLC display hereinafter) using a ferroelectric liquid crystal (to be abbreviated as FLC hereinafter) is known. As one of the features of the FLCD, its liquid crystal cells retain their display states upon application of an electric field. That is, the FLCD has very low-profile liquid crystal cells, in each of which an elongated FLC element orients itself in a first or second stable state according to the applied direction of the electric field, and maintains its orientation state after the electric field is removed. With the bistability of the FLC elements, the FLCD using such feature has memory characteristics of the display state. Such FLC and FLCD are described in detail in, e.g., U.S. Pat. No. 4,964,699.

A display controller for such FLCD need not refresh the screen all the time unlike a CRT display controller. By preferentially updating the display contents of a display area corresponding to a portion where the contents of a display memory have been updated, data can be displayed even on a large screen without dropping the refresh rate.

As an application of such display device, in events such as exhibitions, demonstrations, and the like held in broad sites, a plurality of display devices are set, and identical image information is displayed on these display devices, thus providing identical image information to many people.

On the other hand, as a display control system that displays different contents of image information on a plurality of display devices, the following three systems are known.

(1) LAN-connected System

A plurality of host computers are connected via a LAN, and display devices are connected to these host computers via display controllers.

(2) System Using a Plurality of Graphic Sub-systems

A plurality of display controllers are connected to a single host computer. Display devices are connected to these display controllers.

(3) Display Memory Dividing System

A display memory on a single host computer and single display controller is logically divided into a plurality of memory areas, which are assigned to a plurality of display devices connected.

However, in order to output identical or different image information contents to a plurality of conventional display devices, display controllers for controlling the display devices are required in correspondence with the number of display devices.

Especially, in order to display different image information contents to a plurality of display devices, the above-mentioned systems respectively have the following shortcomings.

(1) LAN-connected System

This system requires high cost since one display device requires one each host computer and display controller. Since a plurality of host computers must be controlled, a large-scale, complex control program is required.

(2) System Using a Plurality of Graphic Sub-systems

This system requires high cost since one display device requires a single display controller. Also, since the number of display controllers that can be connected to a single host computer is limited, the number of display devices that can be connected is inevitably limited.

(3) Display Memory Dividing System

Data must be sequentially read out from a plurality of divided memory areas. For this reason, the number of display devices that can be connected is limited by the read speed from the display memory.

On the other hand, a switching device shown in FIG. 19 is generally known. By switching a switch 3 provided to a switching device 332, one of two printers 334a and 334b is selected to print. When such switching devices are connected in series with each other, as shown in FIG. 20, one of a plurality of printers 334a to 334c can be selected. FIG. 21 shows an arrangement for selecting one of printers 334a to 334e using more switching devices 332a to 332d.

When the number of printers connected increases, and the number of switching devices increases, the total length of connection cables between adjacent switching devices becomes large, and the load viewed from a host computer 331 increases. For this reason, each switching device requires a circuit for shaping the signal waveform, and the like. Operating such waveshaping circuit and the like requires electric power. Hence, the individual switching devices have power supplies and power switches 335a to 335d for turning on/off these power supplies (FIG. 21).

In a display system that connects a plurality of displays to a single host equipment, as shown in FIG. 27, displays 4100, 4120, and 4130 are connected via branch switches 4202, 4203, and 4204.

However, in the arrangement shown in FIG. 21, in order to print using the printer 334d, all the power switches 335a to 335d of the switching devices 332a to 332d must be manually turned on by the user.

When the printers 334a and 334b are used but the printers 334c to 334e are not used, the power switches 335a and 335b of the switching devices 332a and 332b must be turned on, but the power switches 335c and 335d of the switching devices 332c and 332d need not be turned on. In terms of power savings, these switching devices 332c and 332d are preferably kept OFF. Such combination of the ON states of the power switches 335a to 335d must also be determined by the user.

Furthermore, since some switching devices have ON power switches and some other have OFF power switches, the user sometimes forgets to turn off such power switches.

In the above-mentioned display system which includes the branch connectors which distribute and supply image data from the host equipment to a plurality of displays, as the numbers of displays and branch connectors become larger, the user must turn on/off a larger number of switches every time the system is activated/deactivated, resulting in a heavy load on the user.

SUMMARY OF THE INVENTION

The present invention has been made in consideration of the above-mentioned problems, and has as its object to provide a flexible display control system, which can control a plurality of display devices by a single display controller and is not restrained by the number of display devices connected, its control method, and a computer readable memory.

It is another object of the present invention to provide a switching device which automatically turns on/off required power supplies on the basis of the ON/OFF states of the power supplies in peripheral devices connected, a peripheral device system using the switching device, and a computer readable memory.

It is still another object of the present invention to provide a connection device which can control to automatically supply electric power to a peripheral device to be driven in response to an instruction from a host equipment, a peripheral device system using the connection device, and a computer readable memory.

It is still another object of the present invention to provide a peripheral device system which connects a plurality of peripheral devices by branching them from a single communication bus, and which can attain communications associated with control information other than the data to be processed by the respective peripheral devices by a lower-cost arrangement, a connection device and peripheral device used in the system, their control method, and a computer readable memory.

It is still another object of the present invention to provide a peripheral device system which connects a plurality of peripheral devices by branching them from a single communication bus, and which permits one of a plurality of peripheral devices to communicate the control information and automatically denies other peripheral devices from communicating the control information, a connection device and peripheral device used in the system, their control method, and a computer readable memory.

It is still another object of the present invention to provide a connection device which automatically determines the peripheral device that communicates the control information, and other peripheral devices in a peripheral device system which connects a plurality of peripheral devices by branching them from a single communication bus and controls the peripheral devices to display identical image data, its control method, and a computer readable memory.

It is still another object of the present invention to provide a peripheral device which automatically determines the peripheral device that communicates the control information, and other peripheral devices in a peripheral device system which connects a plurality of peripheral devices by branching them from a single communication bus and controls the peripheral devices to display different image data, its control method, and a computer readable memory.

In order to achieve the above objects, a display control system according to the present invention comprises the following arrangement.

That is, a display control system which connects a display controller having an image memory for storing image information to a plurality of display devices, and controls the plurality of display devices to display an image on the basis of the image information, comprises:

monitoring means for monitoring a presence/absence of an image information request signal output from each of the plurality of display devices; and distribution means for distributing the image information stored in the image memory of the display controller to each of the plurality of display devices on the basis of a monitoring result of the monitoring means.

In order to achieve the above objects, a method of controlling a display control system according to the present invention comprises the following arrangement.

That is, a method of controlling a display control system which connects a display controller having an image memory for storing image information to a plurality of display devices, and controls the plurality of display devices to display an image on the basis of the image information, comprises:

the monitoring step of monitoring a presence/absence of an image information request signal output from each of the plurality of display devices; and the distribution step of distributing the image information stored in the image memory of the display controller to each of the plurality of display devices on the basis of a monitoring result in the monitoring step.

In order to achieve the above objects, a display control system according to the present invention comprises the following arrangement.

That is, a display control system which connects a display controller having an image memory for storing image information to a plurality of display devices, and controls the plurality of display devices to display an image on the basis of the image information, comprises:

designation means for designating a destination display device of the image information; and control means for controlling the display device designated by the designation means to display the image based on the image information.

In order to achieve the above objects, a method of controlling a display control system according to the present invention comprises the following arrangement.

That is, a method of controlling a display control system which connects a display controller having an image memory for storing image information to a plurality of display devices, and controls the plurality of display devices to display an image on the basis of the image information, comprises:

the designation step of designating a destination display device of the image information; and the control step of controlling the display device designated in the designation step to display the image based on the image information.

In order to achieve the above objects, a computer readable memory according to the present invention comprises the following arrangement.

That is, a computer readable memory which stores a program code for controlling a display control system which connects a display controller having an image memory for storing image information to a plurality of display devices, and controls the plurality of display devices to display an image on the basis of the image information, comprises:

a program code of the monitoring step of monitoring a presence/absence of an image information request signal output from each of the plurality of display devices; and a program code of the distribution step of distributing the image information stored in the image memory of the display controller to each of the plurality of display devices on the basis of a monitoring result in the monitoring step.

In order to achieve the above objects, a computer readable memory according to the present invention comprises the following arrangement.

That is, a computer readable memory which stores a program code for controlling a display control system which connects a display controller having an image memory for storing image information to a plurality of display devices, and controls the plurality of display devices to display an image on the basis of the image information, comprises:

a program code of the designation step of designating a destination display device of the image information; and a program code of the control step of controlling the display device designated in the designation step to display the image based on the image information.

In order to achieve the above objects, a switching device according to the present invention comprises the following arrangement.

That is, a switching device for forming a communication path between a host equipment and a plurality of peripheral devices, comprises:

input means for receiving a signal representing a power supply state which indicates if a power supply of a peripheral device connected to a line on the peripheral device side is ON or OFF;

supply means for supplying electric power to the peripheral device when the signal indicates the ON power supply state; and output means for outputting the supply state of electric power by the supply means onto a line on the host equipment side as the power supply state of the peripheral device.

In order to achieve the above objects, a method of controlling a switching device according to the present invention comprises the following arrangement.

That is, a method of controlling a switching device for forming a communication path between a host equipment and a plurality of peripheral devices, comprises:

the input step of receiving a signal representing a power supply state which indicates if a power supply of a peripheral device connected to a line on the peripheral device side is ON or OFF;

the supply step of supplying electric power to the peripheral device when the signal indicates the ON power supply state; and the output step of outputting the supply state of electric power in the supply step onto a line on the host equipment side as the power supply state of the peripheral device.

In order to achieve the above objects, a computer readable memory according to the present invention comprises the following arrangement.

That is, a computer readable memory which stores a program code for controlling a switching device for forming a communication path between a host equipment and a plurality of peripheral devices, comprises:

a program code of the input step of receiving a signal representing a power supply state which indicates if a power supply of a peripheral device connected to a line on the peripheral device side is ON or OFF;

a program code of the supply step of supplying electric power to the peripheral device when the signal indicates the ON power supply state; and a program code of the output step of outputting the supply state of electric power in the supply step onto a line on the host equipment side as the power supply state of the peripheral device.

In order to achieve the above objects, a peripheral device system according to the present invention comprises the following arrangement.

That is, a peripheral device system which has a host equipment, a plurality of peripheral devices, and a plurality of switching devices for forming a communication path therebetween, comprises:

first output means for outputting a signal representing a power supply state which indicates if its own power supply is ON or OFF from each of the plurality of peripheral devices;

input means for receiving a signal representing a power supply state which indicates if a power supply of a peripheral device connected to a line on the peripheral device side is ON or OFF, in each of the plurality of switching devices;

supply means for supplying electric power to the switching device when the signal indicates the ON power supply state; and second output means for outputting the supply state of electric power by the supply means onto a line on the host equipment side as the power supply state of the switching device.

In order to achieve the above objects, a method of controlling a peripheral device system according to the present invention comprises the following arrangement.

That is, a method of controlling a peripheral device system which has a host equipment, a plurality of peripheral devices, and a plurality of switching devices for forming a communication path therebetween, comprises:

the first output step of outputting a signal representing a power supply state which indicates if its own power supply is ON or OFF from each of the plurality of peripheral devices;

the input step of receiving a signal representing a power supply state which indicates if a power supply of a peripheral device connected to a line on the peripheral device side is ON or OFF, in each of the plurality of switching devices;

the supply step of supplying electric power to the switching device when the signal indicates the ON power supply state; and the second output step of outputting the supply state of electric power by the supply means onto a line on the host equipment side as the power supply state of the switching device.

In order to achieve the above objects, a computer readable memory according to the present invention comprises the following arrangement.

That is, a computer readable memory which stores a program code for controlling a peripheral device system which has a host equipment, a plurality of peripheral devices, and a plurality of switching devices for forming a communication path therebetween, comprises:

- a program code of the first output step of outputting a signal representing a power supply state which indicates if its own power supply is ON or OFF from each of the plurality of peripheral devices;
- a program code of the input step of receiving a signal representing a power supply state which indicates if a power supply of a peripheral device connected to a line on the peripheral device side is ON or OFF, in each of the plurality of switching devices;
- a program code of the supply step of supplying electric power to the switching device when the signal indicates the ON power supply state; and
- a program code of the second output step of outputting the supply state of electric power by the supply means onto a line on the host equipment side as the power supply state of the switching device.

In order to achieve the above objects, a connection device according to the present invention comprises the following arrangement.

That is, a connection device for forming a communication path between a host equipment and a plurality of peripheral devices, comprises:

- holding means for holding a set identification number;
- detection means for detecting identification information output from the host equipment;
- determination means for determining based on the identification information detected by the detection means and the identification number held in the holding means if electric power is to be supplied; and
- control means for controlling power supply to the peripheral device connected to the connection device on the basis of a determination result of the determination means.

In order to achieve the above objects, a method of controlling a connection device according to the present invention comprises the following arrangement.

That is, a method of controlling a connection device for forming a communication path between a host equipment and a plurality of peripheral devices, comprises:

- the holding step of holding a set identification number in a storage medium;
- the detection step of detecting identification information output from the host equipment;
- the determination step of determining based on the identification information detected in the detection step and the identification number held in the storage medium in the holding step if electric power is to be supplied; and
- the control step of controlling power supply to the peripheral device connected to the connection device on the basis of a determination result in the determination step.

In order to achieve the above objects, a computer readable memory according to the present invention comprises the following arrangement.

That is, a computer readable memory which stores a program code for controlling a connection device for forming a communication path between a host equipment and a plurality of peripheral devices, comprises:

- a program code of the holding step of holding a set identification number in a storage medium;
- a program code of the detection step of detecting identification information output from the host equipment;
- a program code of the determination step of determining based on the identification information detected in the detection step and the identification number held in the storage medium in the holding step if electric power is to be supplied; and
- a program code of the control step of controlling power supply to the peripheral device connected to the connection device on the basis of a determination result in the determination step.

In order to achieve the above objects, a peripheral device system according to the present invention comprises the following arrangement.

That is, a peripheral device system which has a host equipment, a plurality of peripheral devices, and a plurality of switching devices for forming a communication path therebetween, comprises:

- holding means for holding an identification number set in the connected peripheral device in each of the plurality of switching devices;
- detection means for detecting identification information output from the host equipment;
- determination means for determining based on the identification information detected by the detection means and the identification number held in the holding means if electric power is to be supplied; and
- control means for controlling power supply to the peripheral device connected to the connection device on the basis of a determination result of the determination means.

In order to achieve the above objects, a method of controlling a peripheral device system according to the present invention comprises the following arrangement.

That is, a method of controlling a peripheral device system which has a host equipment, a plurality of peripheral devices, and a plurality of switching devices for forming a communication path therebetween, comprises:

- the holding step of holding, in a storage medium, an identification number equal to an identification number set in the connected peripheral device in each of the plurality of switching devices;
- the detection step of detecting identification information output from the host equipment;
- the determination step of determining based on the identification information detected in the detection step and the identification number held in the storage medium in the holding step if electric power is to be supplied; and
- the control step of controlling power supply to the peripheral device connected to the connection device on the basis of a determination result in the determination step.

In order to achieve the above objects, a computer readable memory according to the present invention comprises the following arrangement.

That is, a computer readable memory which stores a program code for controlling a peripheral device system which has a host equipment, a plurality of peripheral devices, and a plurality of switching devices for forming a communication path therebetween, comprises:

- a program code of the holding step of holding, in a storage medium, an identification number equal to an identification number set in the connected peripheral device in each of the plurality of switching devices;
- a program code of the detection step of detecting identification information output from the host equipment;

a program code of the determination step of determining based on the identification information detected in the detection step and the identification number held in the storage medium in the holding step if electric power is to be supplied; and a program code of the control step of controlling power supply to the peripheral device connected to the connection device on the basis of a determination result in the determination step.

In order to achieve the above objects, a connection device according to the present invention comprises the following arrangement.

That is, a connection device for connecting a plurality of peripheral devices to a single information output device, comprises:

a first communication path which is connected to an input-side device, output-side device, and a peripheral device, receives information to be processed by the peripheral device from the input-side device, and outputs the information to be processed to the peripheral device and the output-side device;

a second communication path used for making a communication of control information between the input-side device and the peripheral device;

determination means for trying a communication with the input-side device using the second communication path, and determining based on the trial result if the communication of the control information is to be made; and path control means for forming the second communication path between the input-side device and the peripheral device when the determination means determines that the communication of the control information is to be made.

In order to achieve the above objects, a peripheral device according to the present invention comprises the following arrangement.

That is, a peripheral device for processing data to be processed output from an information processing apparatus, comprises:

first communication means for receiving the data to be processed;

second communication means for making a communication of control information with the information processing apparatus;

determination means for observing a communication state of the second communication means, and determining based on the communication state if the communication of the control information is to be executed; and control means for making the communication of the control information with the information processing apparatus via the second communication means when the determination means determines that the communication of the control information is to be executed.

In order to achieve the above objects, a method of controlling a connection device according to the present invention comprises the following arrangement.

That is, a method of controlling a connection device which comprises a first communication path which is connected to an input-side device, output-side device, and a peripheral device, receives information to be processed by the peripheral device from the input-side device, and outputs the information to be processed to the peripheral device and the output-side device, and a second communication path used for making a communication of control information between the input-side device and the peripheral device, comprises:

the determination step of trying a communication with the input-side device using the second communication path, and determining based on the trial result if the communication of the control information is to be made; and the path control step of forming the second communication path between the input-side device and the peripheral device when it is determined in the determination step that the communication of the control information is to be made.

In order to achieve the above objects, a computer readable memory according to the present invention comprises the following arrangement.

That is, a computer readable memory which stores a program code for controlling a connection device which comprises a first communication path which is connected to an input-side device, output-side device, and a peripheral device, receives information to be processed by the peripheral device from the input-side device, and outputs the information to be processed to the peripheral device and the output-side device, and a second communication path used for making a communication of control information between the input-side device and the peripheral device, comprises:

a program code of the determination step of trying a communication with the input-side device using the second communication path, and determining based on the trial result if the communication of the control information is to be made; and a program code of the path control step of forming the second communication path between the input-side device and the peripheral device when it is determined in the determination step that the communication of the control information is to be made.

In order to achieve the above objects, a method of controlling a peripheral device according to the present invention comprises the following arrangement.

That is, a method of controlling a peripheral device which comprises first communication means for receiving data to be processed, and second communication means for making a communication of control information with an information processing apparatus, and processes the data to be processed output from the information processing apparatus, comprises:

the determination step of observing a communication state of the second communication means, and determining based on the communication state if the communication of the control information is to be executed; and the control step of making the communication of the control information with the information processing apparatus via the second communication means when it is determined in the determination step that the communication of the control information is to be executed.

In order to achieve the above objects, a computer readable memory according to the present invention comprises the following arrangement.

That is, a computer readable memory which stores a program code for controlling a peripheral device which comprises first communication means for receiving data to be processed, and second communication means for making a communication of control information with an information processing apparatus, and processes the data to be processed output from the information processing apparatus, comprises:

a program code of the determination step of observing a communication state of the second communication means, and determining based on the communication state if the communication of the control information is to be executed; and a program code of the control step of making the communication of the control information with the information processing apparatus via the second communication means when it is determined in the determination step that the communication of the control information is to be executed.

In order to achieve the above objects, a peripheral device system according to the present invention comprises the following arrangement.

That is, a peripheral device system for connecting a single information processing apparatus and a plurality of peripheral devices via a plurality of connection devices, comprises:

communication control means for transmitting data to be processed by the peripheral device from the information processing apparatus to each of the plurality of peripheral devices;

selection means for selecting one peripheral device which executes a communication of control information between the information processing apparatus and the peripheral device from the plurality of peripheral devices; and communication control means for permitting the peripheral device selected by the selection means to execute the communication of the control information with the information processing apparatus, and inhibiting other peripheral devices from executing communication of the control information.

In order to achieve the above objects, a method of controlling a peripheral device system according to the present invention comprises the following arrangement.

That is, a method of controlling a peripheral device system for connecting a single information processing apparatus and a plurality of peripheral devices via a plurality of connection devices, comprises:

the communication control step of transmitting data to be processed by the peripheral device from the information processing apparatus to each of the plurality of peripheral devices;

the selection step of selecting one peripheral device which executes a communication of control information between the information processing apparatus and the peripheral device from the plurality of peripheral devices; and the communication control step of permitting the peripheral device selected in the selection step to execute the communication of the control information with the information processing apparatus, and inhibiting other peripheral devices from executing communication of the control information.

In order to achieve the above objects, a computer readable memory according to the present invention comprises the following arrangement.

That is, a computer readable memory which stores a program code for controlling a peripheral device system for connecting a single information processing apparatus and a plurality of peripheral devices via a plurality of connection devices, comprises:

a program code of the communication control step of transmitting data to be processed by the peripheral device from the information processing apparatus to each of the plurality of peripheral devices;

a program code of the selection step of selecting one peripheral device which executes a communication of control information between the information processing apparatus and the peripheral device from the plurality of peripheral devices; and a program code of the communication control step of permitting the peripheral device selected in the selection step to execute the communication of the control information with the information processing apparatus, and inhibiting other peripheral devices from executing communication of the control information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 34 shows the format of the image data to be transferred;

FIG. 45 is a timing chart for explaining the operations until driving starts, when a certain display starts to be driven, and then, another display is turned on;

DESCRIPTION OF THE PREFERRED EMBODIMENTS

The preferred embodiments of the present invention will be described in detail hereinafter with reference to the accompanying drawings.

<First Embodiment>

Figure 1:
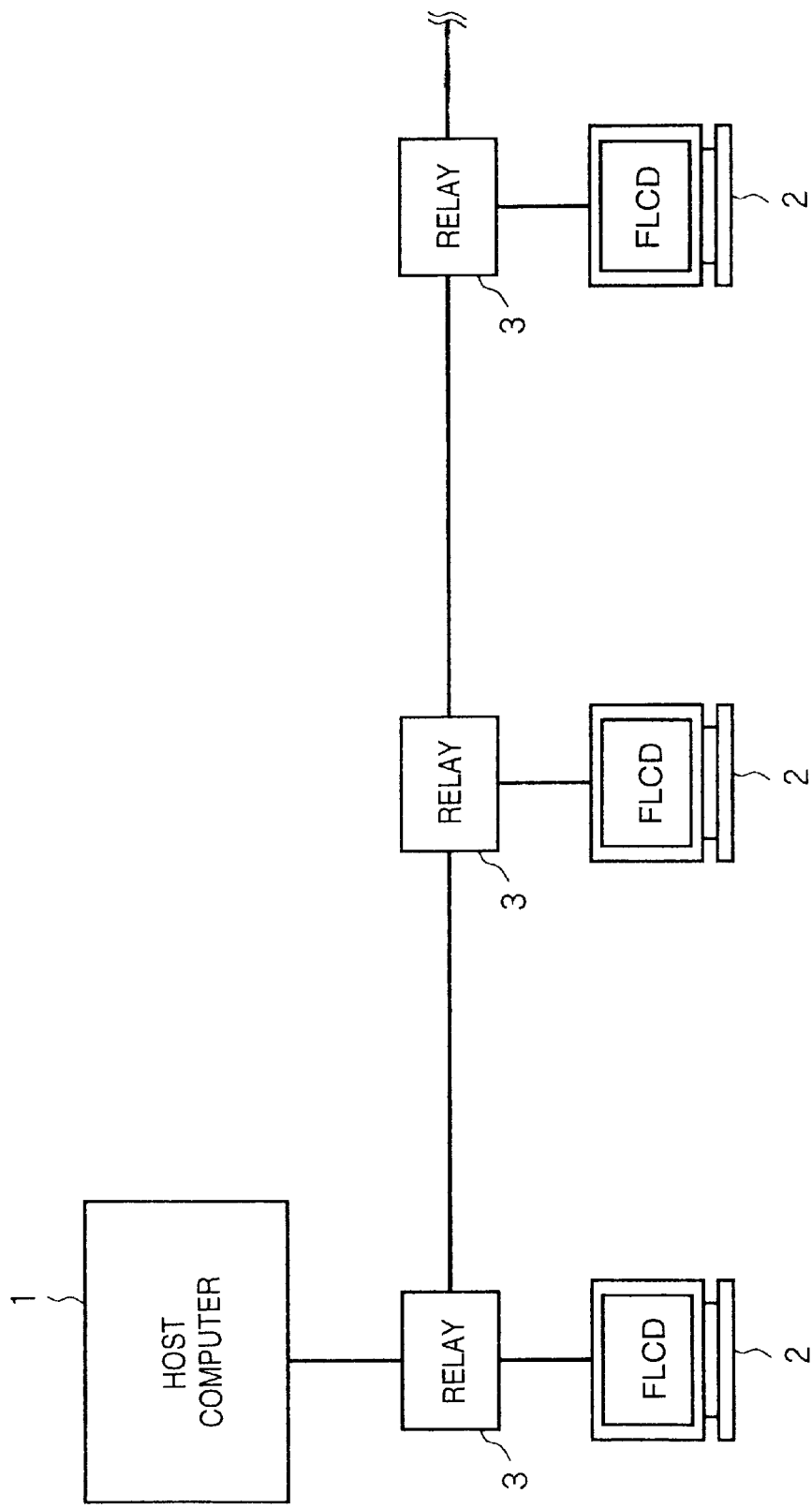
FIG. 1 is a schematic block diagram showing the arrangement of a display control system according to the first embodiment of the present invention.

FIG. 1 is a schematic block diagram showing the arrangement of a display control system according to the first embodiment of the present invention.

In FIG. 1, reference numeral 1 denotes a host computer which controls the overall display control system. Reference numeral 2 denotes FLCDs each of which is used as a display device of image data such as various characters, image information, and the like output from the host computer 1. Reference numeral 3 denotes relays each of which distributes an FLCD control signal output from the host computer 1 to control display of the FLCDs to a single FLCD 2 and also to FLCD(s) 2 connected on the output side.

In the display control system with the above-mentioned arrangement, image data such as various characters, image information, and the like output from the single host computer 1 are simultaneously displayed on the display screens of the individual FLCDs 2. Hence, users can simultaneously get identical image information at the locations of the individual FLCDs 2.

Figure 2:
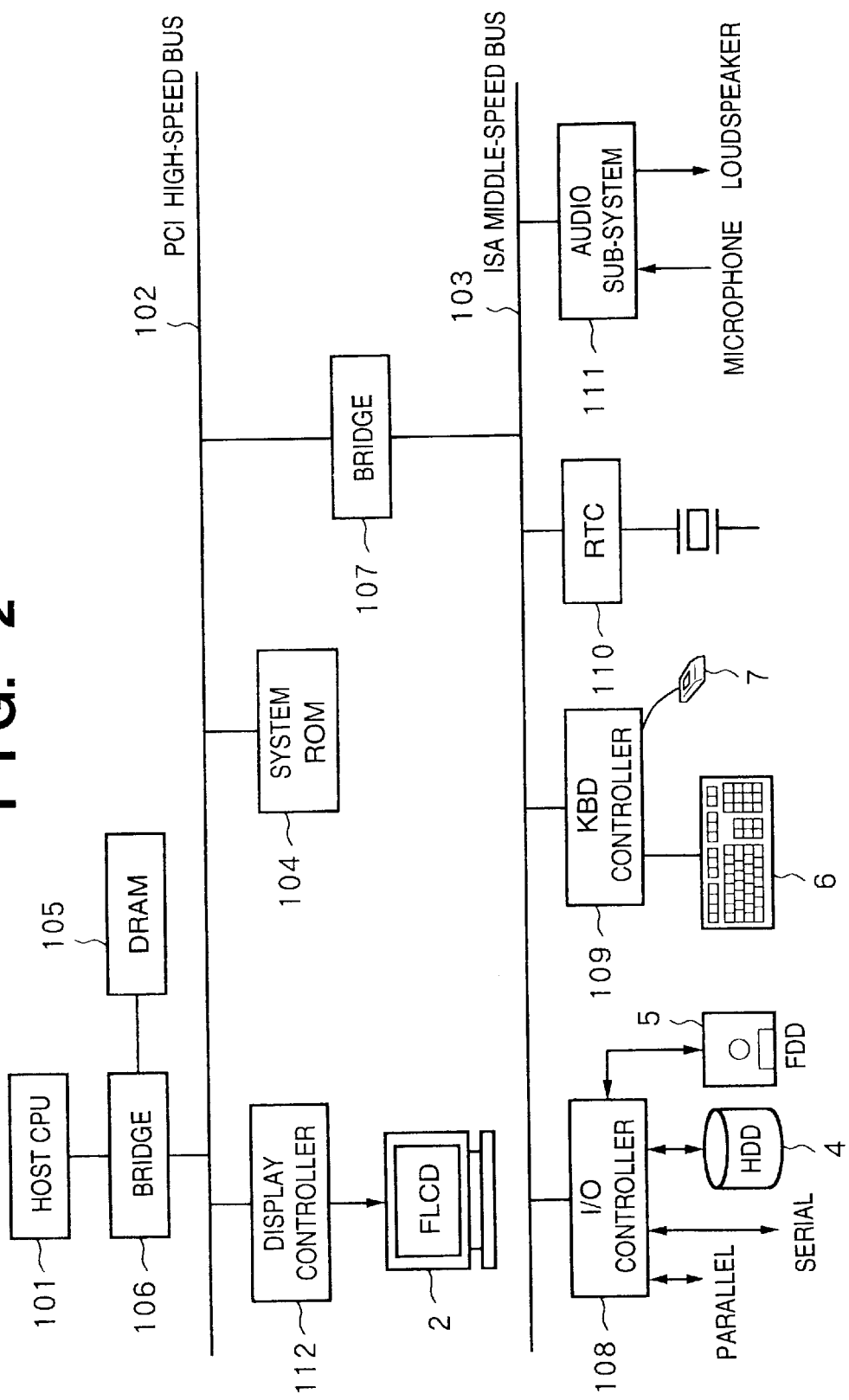
FIG. 2 is a detailed block diagram showing the arrangement of a host computer according to the first embodiment of the present invention.

The arrangement of the host computer 1 will be described in detail below with reference to FIG. 2. FIG. 2 is a detailed block diagram showing the arrangement of the host computer according to the first embodiment of the present invention.

In FIG. 2, reference numeral 101 denotes a host CPU which controls the overall display control system. Reference numeral 106 denotes a bridge which interfaces between the host CPU 101 and a high-speed bus (PCI bus) 102. Reference numeral 105 denotes a DRAM which is used as a main memory, and is used for storing a control program executed by the host CPU 101 and as a work area upon executing the control by the host CPU 101. Reference numeral 102 denotes a high-speed bus (PCI bus), which includes an address bus, control bus, data bus, and the like.

Reference numeral 103 denotes a middle-speed bus which comprises, e.g., an ISA bus. Reference numeral 107 denotes a bridge, which connects the high- and middle-speed buses 102 and 103. Reference numeral 104 denotes a system ROM which stores various programs such as a program for initializing the entire display control system, and the like. Reference numeral 112 denotes a display controller which controls interface with the individual FLCDs 2.

Reference numeral 108 denotes an I/O controller which comprises a parallel or serial interface, and also comprises a disk interface for a hard disk drive (HDD) 4 and floppy disk drive (FDD) 5. Reference numeral 109 denotes a keyboard (KBD) controller, which controls interfacing with a keyboard 6 and mouse 7 used for inputting characters such as letters, numerals, and the like. Reference numeral 110 denotes a real-time clock, which also has a timer function of measuring time by counting clocks. Reference numeral 111 denotes an audio sub-system, which outputs an audio signal received from a microphone onto the middle-speed bus 103, and outputs an audible signal to a loudspeaker on the basis of a signal from the middle-speed bus 103.

The arrangement of the display controller 112 will be described in detail below with reference to FIG. 3.

Figure 3:
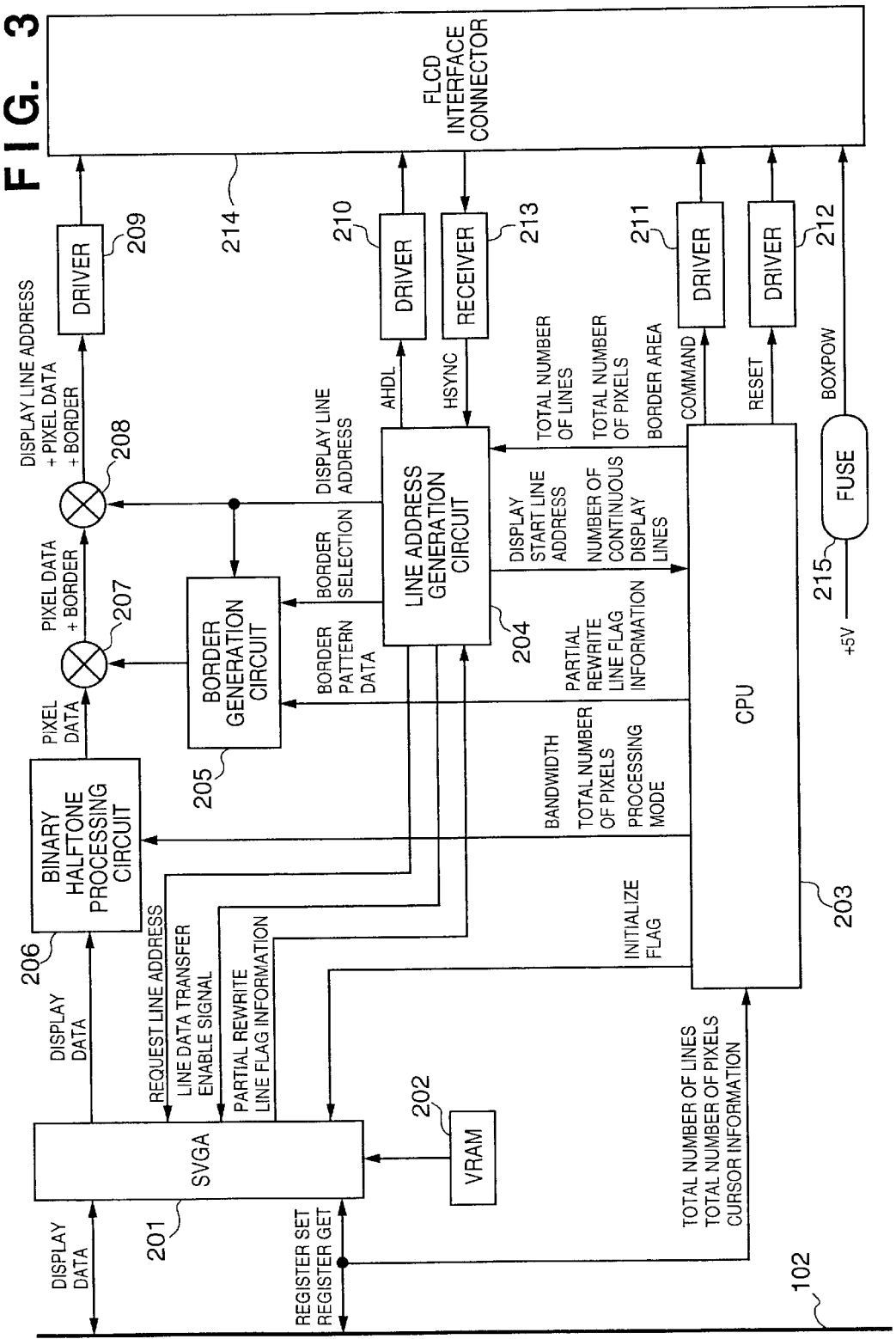
FIG. 3 is a detailed block diagram showing the arrangement of a display controller according to the first embodiment of the present invention.

FIG. 3 is a detailed block diagram showing the arrangement of the display controller according to the first embodiment of the present invention.

In FIG. 3, the display controller 112 uses an SVGA 201 that uses an existing SVGA as a CRT display control circuit. Prior to the detailed description of the arrangement of the display controller 112 shown in FIG. 3, the arrangement of the SVGA 201 will be described in detail below with the aid of FIG. 4.

Figure 4:
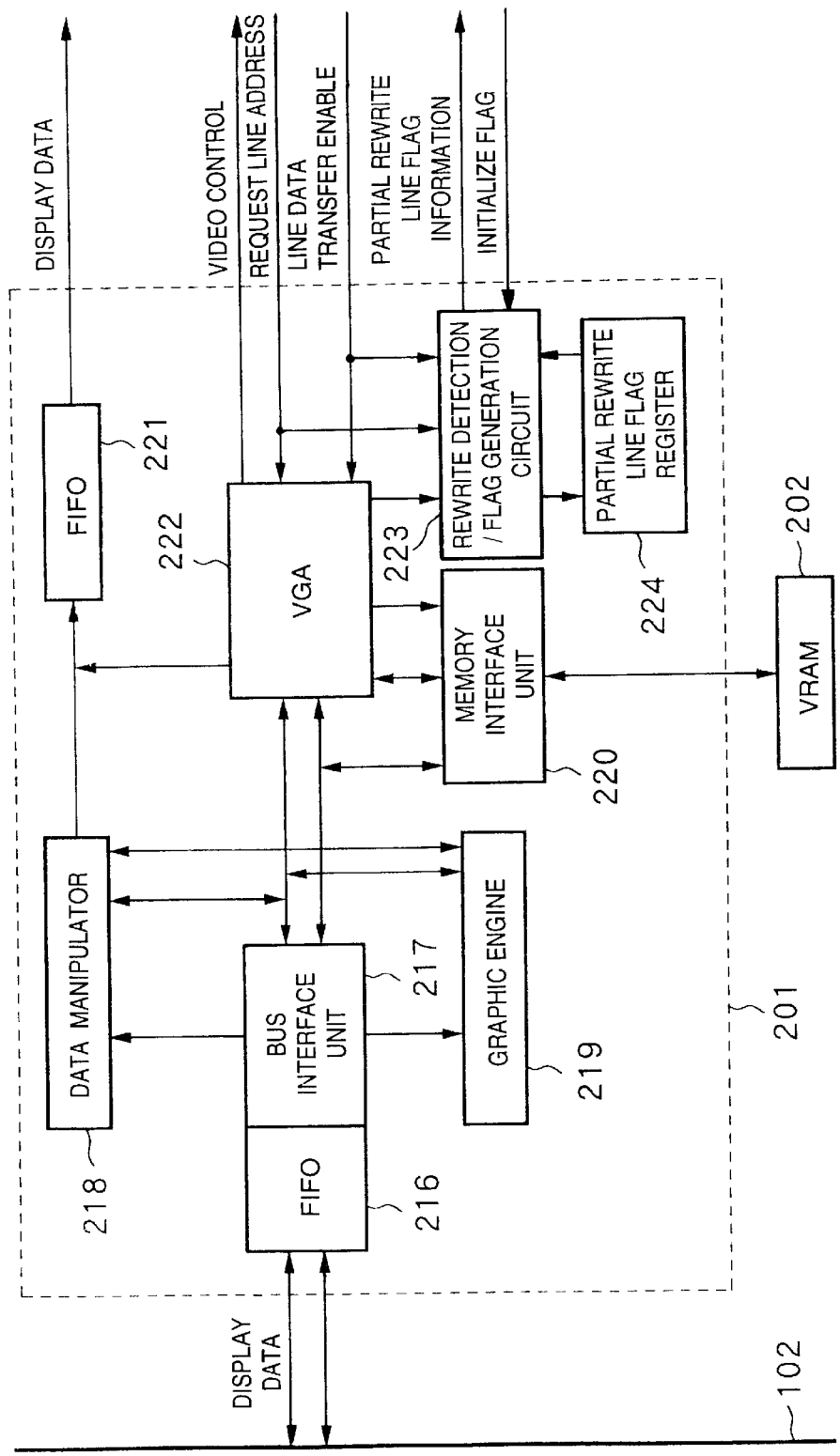
FIG. 4 is a detailed block diagram showing the arrangement of an SVGA according to the first embodiment of the present invention.

FIG. 4 is a detailed block diagram showing the arrangement of the SVGA according to the first embodiment of the present invention.

Referring to FIG. 4, for example, display data, which is to be rewritten in a window area of a display memory of the display controller 112 and is to be displayed, is transferred to the display controller 112 via the PCI bus 102 under the control of the host CPU 101, and is temporarily stored in a FIFO 216. Also, bank address data for mapping the window area of the display memory onto an arbitrary area in a VRAM is transferred to the display controller 112 via the PCI bus 102.

Data such as commands, the above-mentioned bank address data, control information, and the like from the host CPU 101 are transferred as register set data to the SVGA 201. Also, data indicating the status of the SVGA 201 is transferred as register get data from the SVGA 201 to the host CPU 101 (see FIG. 3).

The register set data and display data stored in the FIFO 216 are sequentially output from the FIFO 216, and is set in the respective registers in a bus interface unit 217 or VGA 222 in correspondence with the types of data. The VGA 222 can detect the bank address data and its display data, and data such as control commands and the like in accordance with the states of data set in these registers.

The VGA 222 generates the corresponding VRAM address in a VRAM 202 on the basis of the address of the window area of the display memory and the bank address data. Based on this VRAM address, strobe signals RAS and CAS, a chip-select signal CS, and a write enable signal WE as memory control signals are transferred to the VRAM 202 via a memory interface unit 220. With these signals, the display data can be written at that VRAM address. At this time, the display data to be rewritten is transferred to the VRAM 202 via the memory interface unit 220 in the same procedure.

On the other hand, the VGA 222 reads out display data in the VRAM 202, which is specified by the request line address transferred from a line address generation circuit 204 (FIG. 3; to be described later), from the VRAM 202 in accordance with a line data transfer enable signal similarly transferred from the circuit 204, and stores the readout data in a FIFO 221. The FIFO 221 outputs the display data toward the FLCDs 2 in the storage order.

The SVGA 201 comprises a data manipulator 218 providing an accelerator function, and a graphics engine 219. For example, when the host CPU 101 sets data associated with a circle and its center and radius in the registers of the bus interface unit 217, and issues a circle drawing instruction, the graphics engine 219 generates display data for drawing that circle, and the data manipulator 218 writes this data in the VRAM 202 via the memory interface unit 220.

Figure 5:
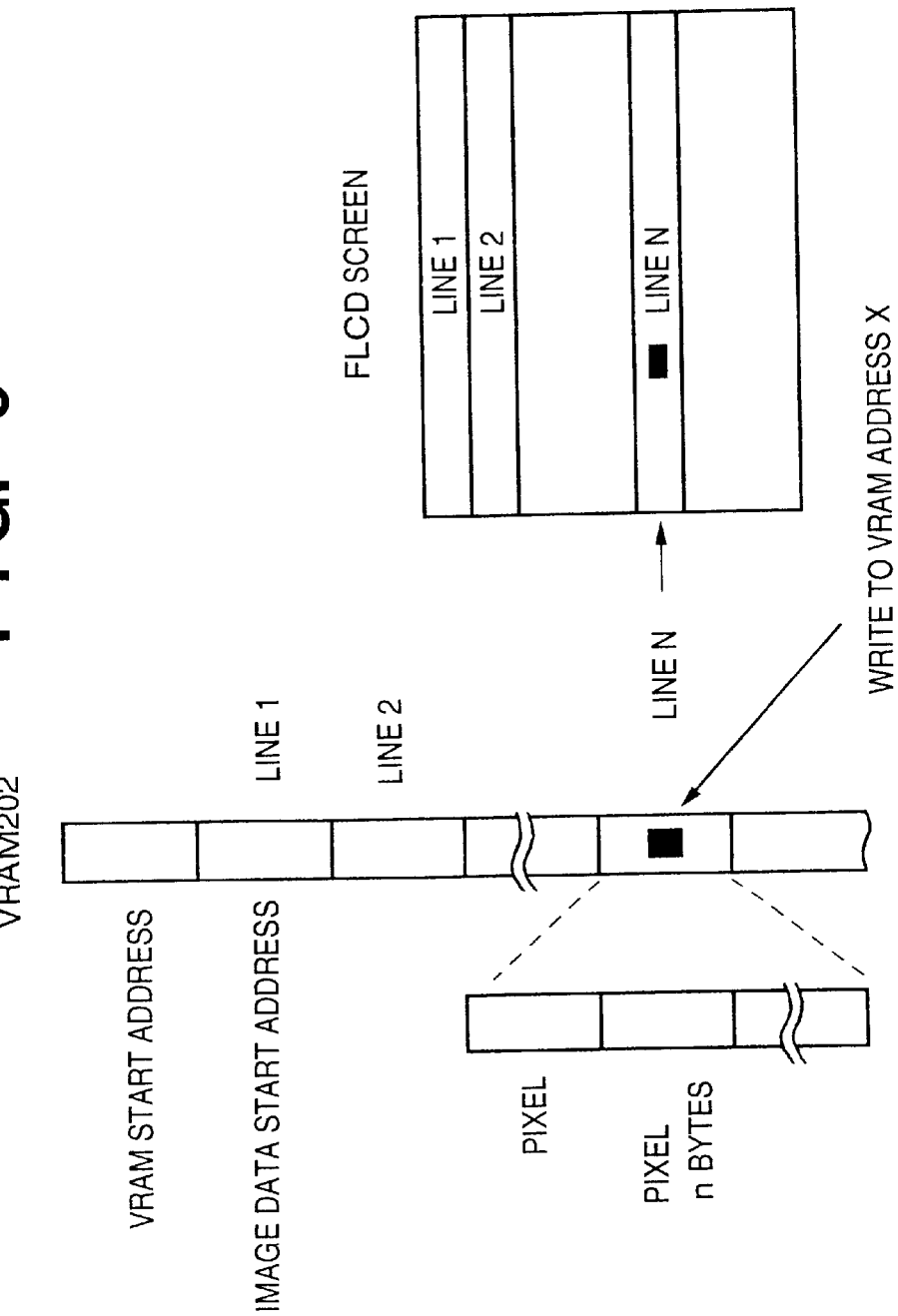
FIG. 5 is a view for explaining the principle of calculating a line address according to the first embodiment of the present invention.

A rewrite detection/flag generation circuit 223 monitors the VRAM address generated by the VGA 222, and fetches the VRAM address at the time when the display data in the VRAM 202 has been rewritten (written), i.e., when the write enable signal and chip-select signal have changed to "1". Then, the circuit 223 calculates the line address on the basis of this VRAM address, and data such as a VRAM address offset, the total number of lines, and the total number of line bits obtained from the host CPU 101. FIG. 5 shows the principle of this calculation.

FIG. 5 is a view for explaining the principle of calculating the line address according to the first embodiment of the present invention.

As shown in FIG. 5, a pixel indicated by address X on the VRAM 202 corresponds to line N on the FLCD screen. Each line is formed by a plurality of pixels, and each pixel consists of a plurality of (n) bytes. The line address (line number N) at that time is calculated by:

$$N=1+\{\text{VRAM address: }X)-(\text{display start address})\}/(\text{number of pixels per line})\times(\text{number of bytes per pixel: }n)$$

Figure 6:
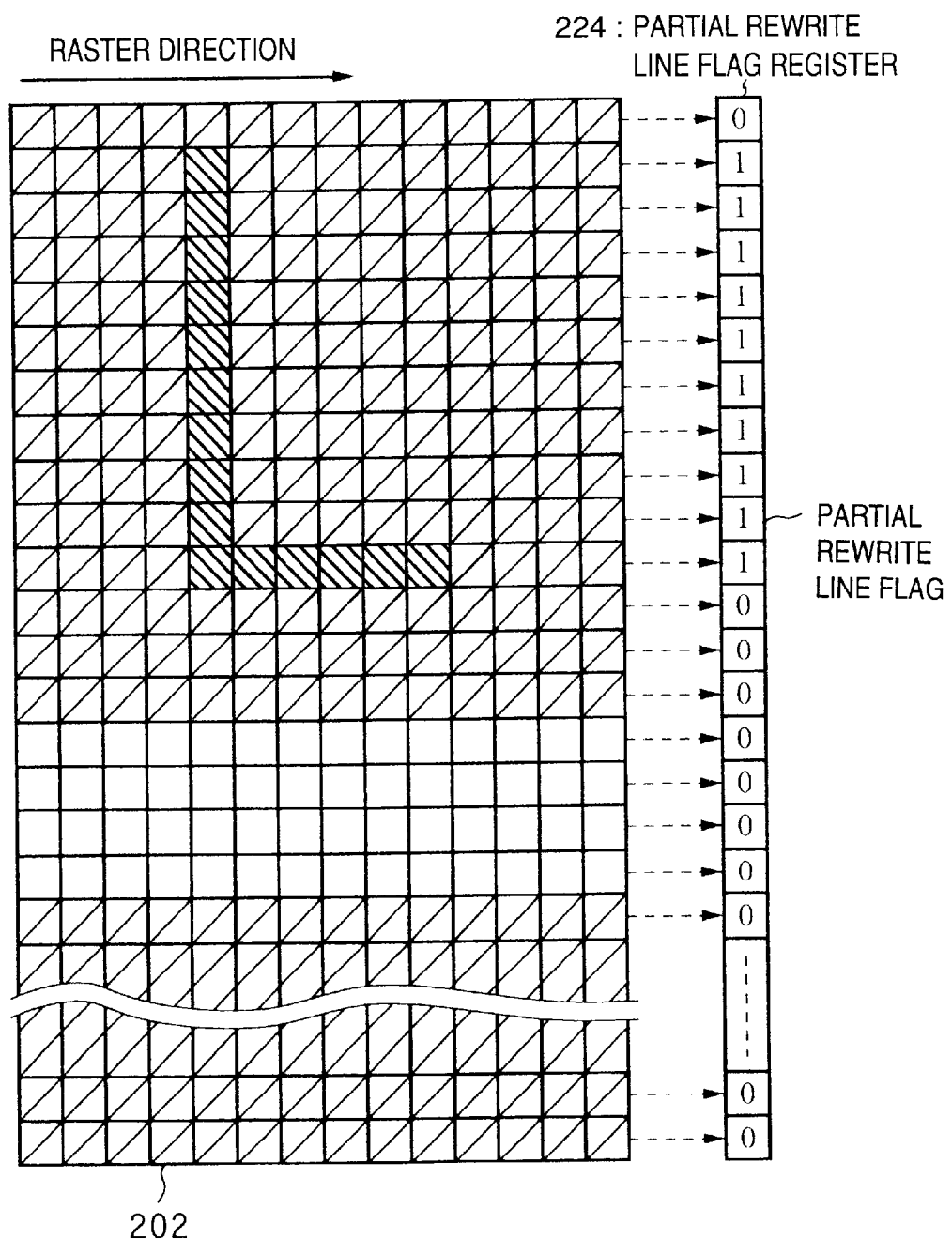
FIG. 6 is a view showing the relationship between the contents of a VRAM and partial rewrite line flag register according to the first embodiment of the present invention.

The rewrite detection/flag generation circuit 223 sets a flag in a partial rewrite line flag register 224 in accordance with the calculated line address. FIG. 6 shows the relationship between the contents of the VRAM 202 and partial rewrite line flag register 224 at that time.

FIG. 6 is a view showing the relationship between the contents of the VRAM and partial rewrite line flag register according to the first embodiment of the present invention.

As shown in FIG. 6, when the corresponding addresses on the VRAM 202 are rewritten to display, e.g., letter "L", the rewritten line addresses are detected by the above calculation. Partial rewrite line flags ("1") are set in the bits corresponding to these addresses in the partial rewrite address flag register 224.

The description will return to that of FIG. 3.

A CPU 203 reads the contents of the partial rewrite line flag register 224 via the line address generation circuit 204, and outputs the line addresses set with the partial rewrite line flags to the SVGA 201. At this time, the line address generation circuit 204 outputs a line data transfer enable signal in correspondence with the line address data to make the SVGA 201 (FIFO 221 thereof) transfer the display data at the addresses to a binary halftone processing circuit 206.

Figure 7:
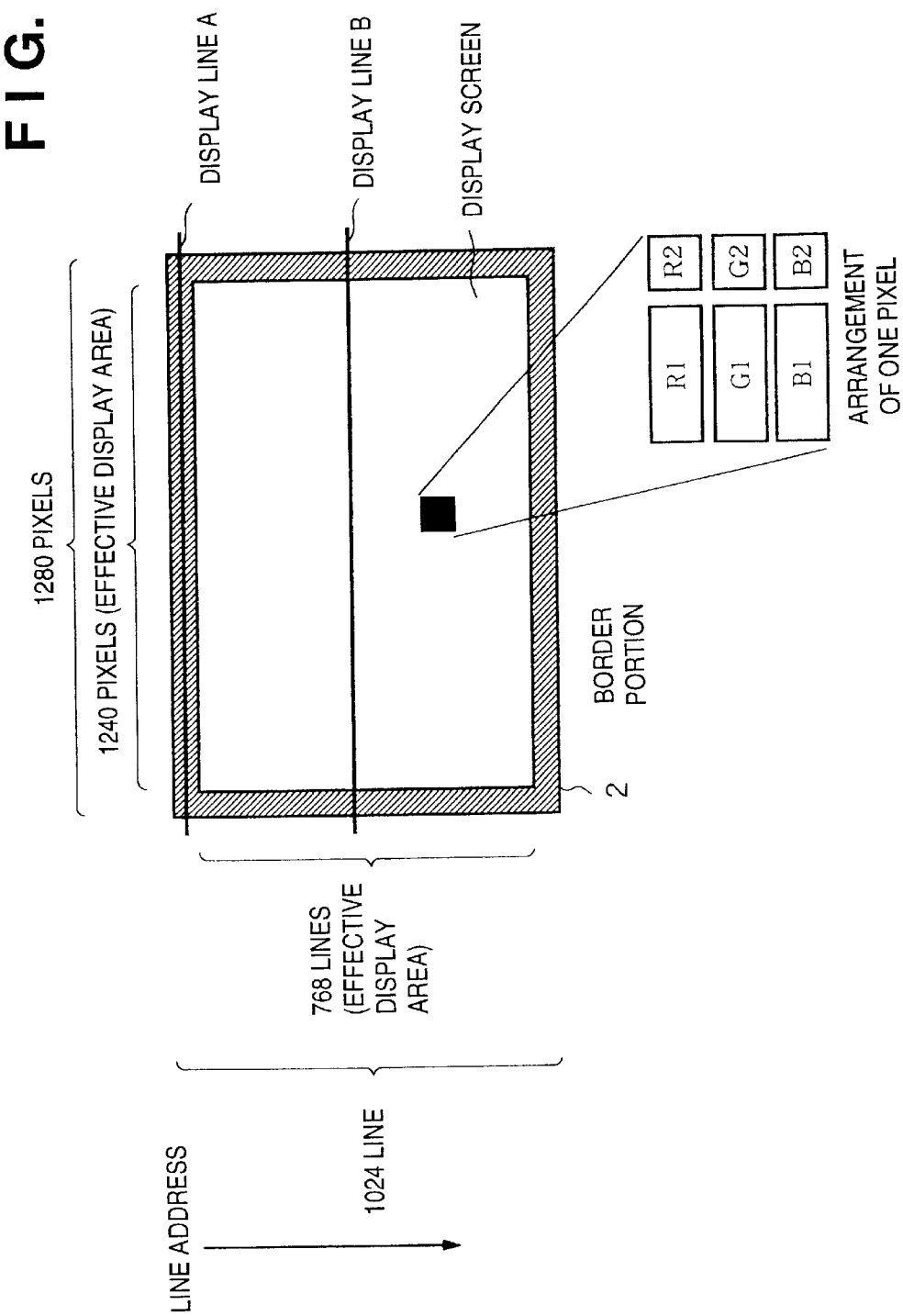
FIG. 7 is a view showing the display screen of an FLCD according to the first embodiment of the present invention.

The binary halftone processing circuit 206 converts multi-valued display data expressed by R, G, and B (5 bits each: 32K colors), R (3 bits), G (3 bits), and B (2 bits) (total of 256 colors), or R, G, B, and I (luminance (1 bit each; 16 colors) into binary pixel data corresponding to individual pixels on the display screen of each FLCD 2. Note that one pixel on the display screen of the first embodiment has display cells having different areas in units of colors, as shown in FIG. 7. Each FLCD 2 has a display area defined by 1,280 pixels in the horizontal direction×1,024 lines in the vertical direction, and 1,024 pixels×768 lines of this display area, except for the hatched border portion, serve as an effective display area.

The data format of display data will be described below with reference to FIGS. 8A and 8B.

Figure 8:
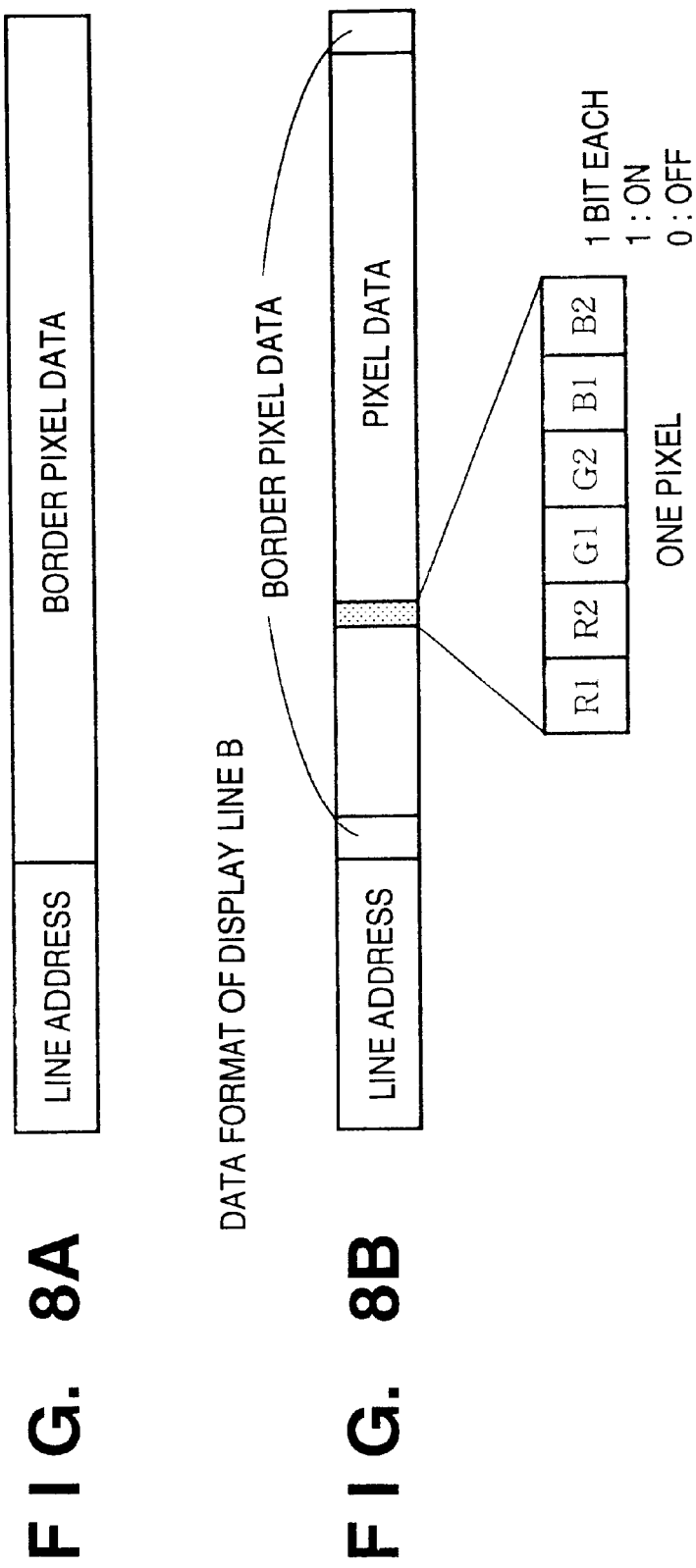
FIG. 8A shows the data format of display data according to the first embodiment of the present invention.
FIG. 8B shows the data format of display data according to the first embodiment of the present invention.

FIGS. 8A and 8B show the data format of display data according to the first embodiment of the present invention.

FIG. 8A shows the data format of display line A shown in FIG. 7. In FIG. 8A, the line address is added at the beginning of the line, and the entire pixel data field of that display line includes border pixel data. FIG. 8B shows the data format of display line B shown in FIG. 7. In FIG. 8B, the line address is added at the beginning of the line, and the pixel data field of that display line includes pixel data to be actually displayed and border pixel data at the two ends of the field. Each pixel data to be displayed has 2 bits for each color (R1, R2, G1, G2, B1, and B2). Hence, the binary halftone processing circuit 206 converts 15-, 8-, or 4-bit R, G, and B display data into 2-bit R, G, and B data (i.e., each of R, G, and B colors is expressed by 4-valued pixel data).

Note that this binary halftone processing circuit 206 can use a known binary halftone processing technique, such as error diffusion, average density, dither, and the like.

The description will return again to that of FIG. 3.

A border generation circuit 205 generates pixel data of the border portion on the display screen of each FLCD 2. More specifically, the display screen of the FLCD 2 has 1,024 lines each consisting of 1,280 pixels, as shown in FIG. 7, and of this display screen, the border portion (hatched portion) which is not used for display is formed to border the display screen. Pixel data for the border portion generated by the border generation circuit 205 are serially synthesized with those from the binary halftone processing circuit 206 by a synthesizing circuit 207. Furthermore, the synthesized pixel data are synthesized with the display line addresses from the line address generation circuit 204 by a synthesizing circuit 208. Then, the synthesized data are output to each FLCD 2 via a driver 209.

The transfer timings of the display line addresses and pixel data to each FLCD 2 will be explained below with reference to FIG. 9.

Figure 9:
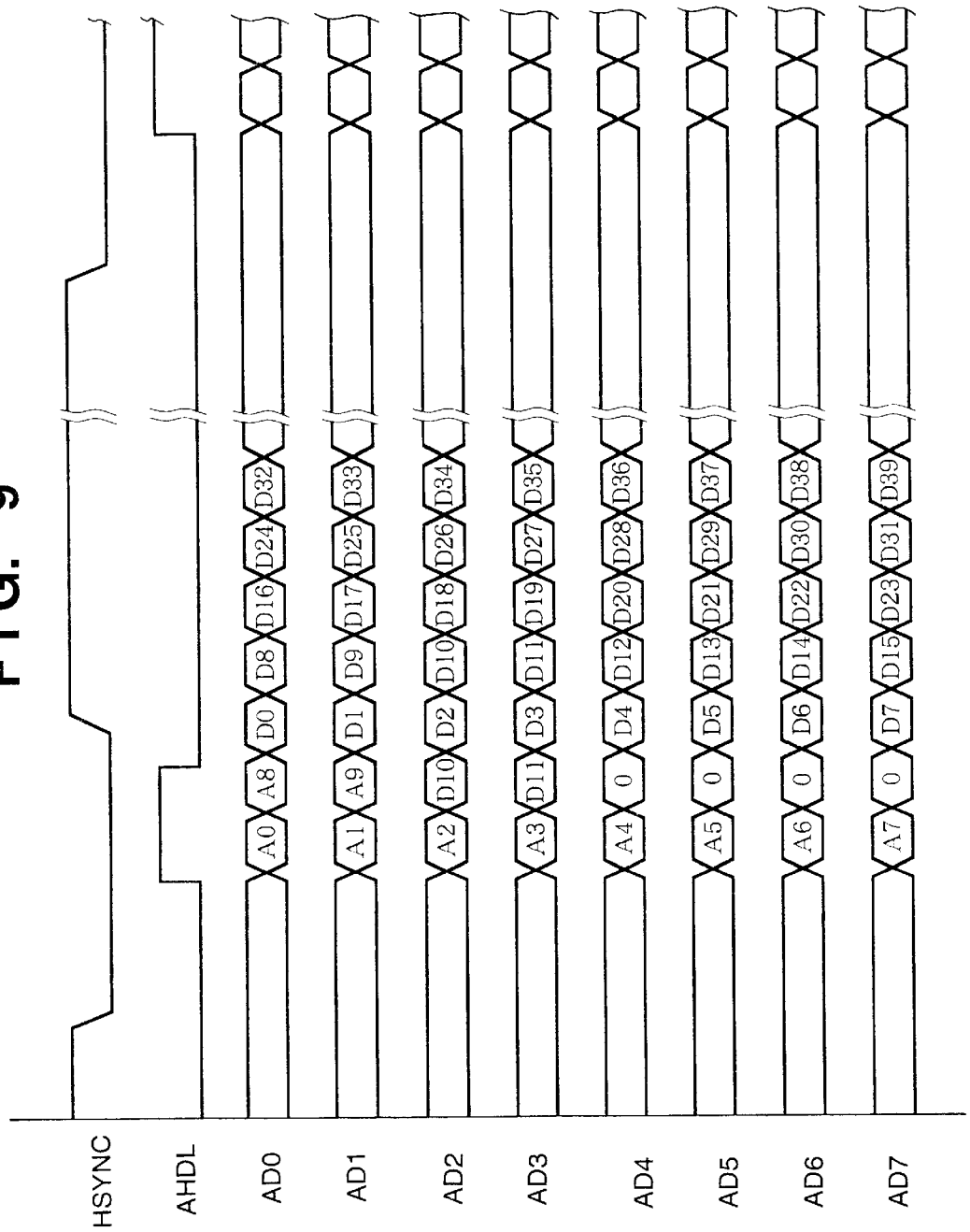
FIG. 9 is a timing chart showing the display line addresses and the transfer timing of pixel data to the FLCD according to the first embodiment of the present invention.

FIG. 9 is a timing chart showing the transfer timings of the display line addresses and pixel data to each FLCD according to the first embodiment of the present invention.

Assume that the display line addresses and pixel data are transferred as 8-bit parallel data consisting of bits AD0 to AD7 to each FLCD 2 in FIG. 9.

The FLCD 2 sends a sync signal HSYNC indicating a data transmission request to the line address generation circuit 204 via a receiver 213. The line address generation circuit 204 outputs request line addresses to the SVGA 201. Note that the sync signal HSYNC is a negative logic signal which represents a data transmission request when it is LOW level "0".

The SVGA 201 outputs display data corresponding to the request line addresses. At the same time, the line address generator 204 sets an identification signal AHDL that identifies the display line address and pixel data at HIGH level "1", and outputs it to the FLCD 2 via a driver 210, and also transfers the display line address to the FLCD 2.

Upon completion of transfer of the display line address to the FLCD 2, the circuit 204 sets the identification signal AHDL at LOW level "0", and outputs it to the FLCD 2 via the driver 210. At the same time, pixel data supplied from the SVGA 201 via the binary halftone processing circuit 206 and synthesizing circuits 207 and 208 are transferred to the FLCD 2 via the driver 209. Note that the identification signal AHDL indicates that the display line addresses are being output onto signal lines AD0 to AD7 when it is HIGH level "1". Also, the signal AHDL indicates that pixel data are being output onto signal lines AD0 to AD7 when it is LOW level "0".

The CPU 203 attains the above-mentioned control operations of the arrangement of the display controller 112. More specifically, the CPU 203 receives information such as the total number of lines, the total number of pixels, and cursor information of the FLCD 2 from the host CPU 101. Also, the CPU 203 outputs data such as a VRAM address offset, the total number of lines, and the total number of pixels to the rewrite detection/flag generation circuit 223. Furthermore, the CPU 203 initializes the partial rewrite line flag register 224. Moreover, the CPU 203 outputs data such as the display start line address, the number of continuous display lines, the total number of lines, the total number of pixels, and the border portion to the line address generation circuit 204 to obtain partial rewrite line flag information therefrom. The CPU 203 then outputs data such as the bandwidth, the total number of pixels, and the processing mode to the binary halftone processing circuit 206, and border pattern data to the border generation circuit 205. The CPU 203 outputs a reset signal for initializing the FLCD 2 to the FLCD 2 via a driver 212. Also, the CPU 203 outputs a command for setting the FLCD 2 in a static state as a standby state, and a command for turning off the backlight of the FLCD 2 to set a sleep state to the FLCD 2 via a driver 211.

To restate, a given drawing command is sent from the host CPU 101 to the display controller 112 via the high-speed bus 102. Every time the FLCD 2 outputs a sync signal HSYNC representing a data transmission request, the display-updated display line addresses and display data are output onto signal lines AD0 to AD7, and are transferred to the FLCD 2 via an FLCD interface connector 214. The FLCD interface connector 214 is a connector that bundles the signal lines for controlling the FLCD 2 mentioned above. The display controller 112 and FLCD 2 are connected via this FLCD interface connector 214. Also, a signal BOX-POW that supplies a voltage (in this embodiment, 5 V) for operating each relay 3 (FIG. 1) is supplied to the FLCD 2 via the FLCD interface connector 214. Reference numeral 215 denotes a fuse for preventing overcurrents from flowing when, e.g., the signal BOXPOW short-circuits with ground voltage (ground).

In the display control system that connects a plurality of FLCDs 2, as show in FIG. 2, various control signals in the above-mentioned display controller 112 are distributed to the individual FLCDs 2 via the relays 3.

The arrangement of each relay 3 will be explained below with reference to FIG. 10.

<Description of Relay 3>

Figure 10:
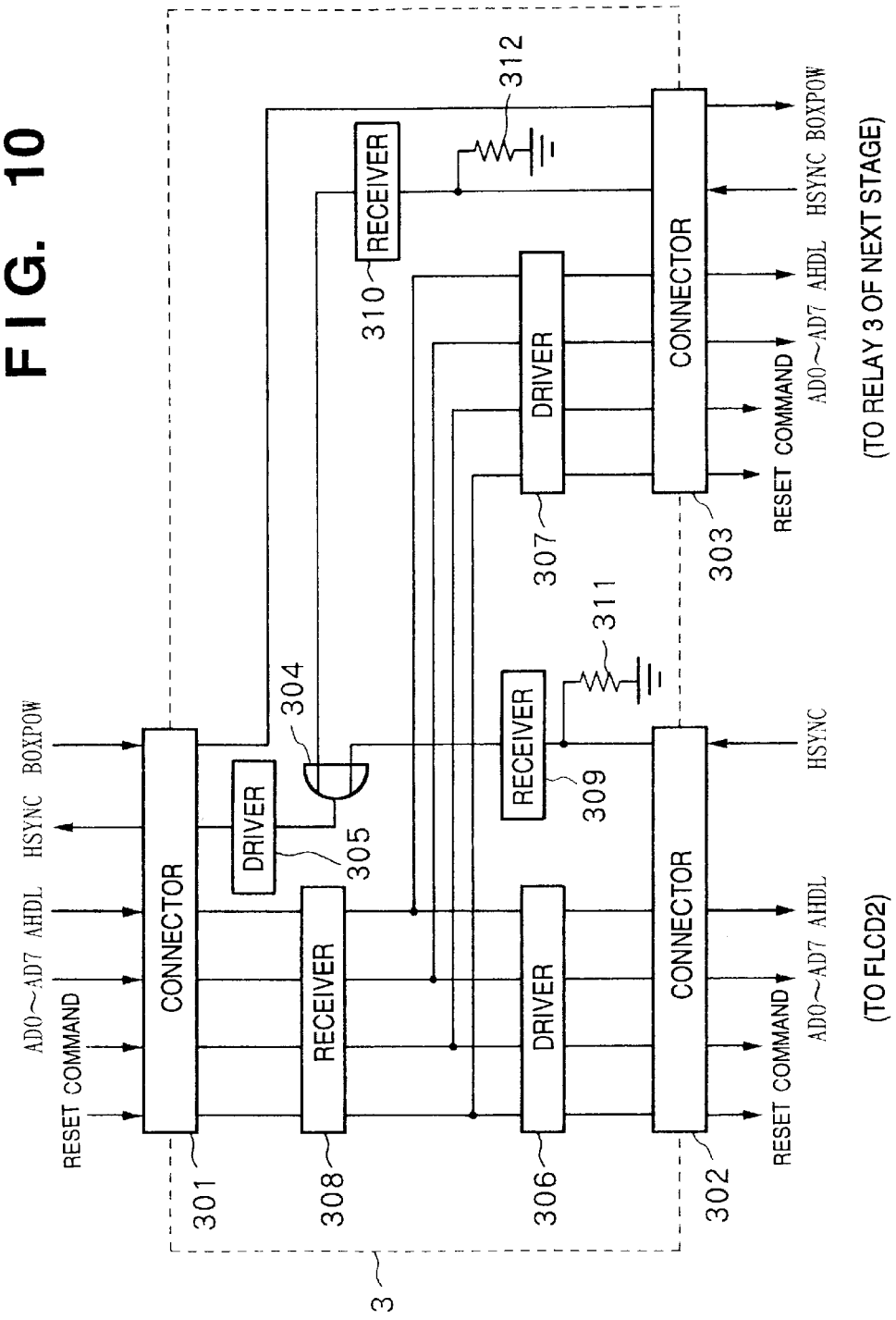
FIG. 10 is a block diagram showing the arrangement of a relay according to the first embodiment of the present invention.

FIG. 10 is a block diagram showing the arrangement of the relay according to the first embodiment of the present invention.

Referring to FIG. 10, reference numerals 301 to 303 denote connectors. The connector 301 exchanges FLCD control signals for the FLCD 2 with the host computer 1. The connector 302 exchanges FLCD control signals with the FLCD 2. The connector 303 exchanges FLCD control signals with the relay 3 of the next stage.

Reference numerals 305 to 307 denotes drivers. Signal lines AD0 to AD7, the identification signal AHDL, and reset and command signals for controlling the FLCD 2, which are output from the host computer 1 are connected to the drivers 306 and 307 via the connector and then a receiver 308. The output from the driver 306 is output to the FLCD 2 via the connector 302. Also, the output from the driver 307 is output to the relay 3 of the next stage via the connector 303.

The signal HSYNC output from the FLCD 2 is connected to one input signal line of an OR gate 304 via the connector 302 and then a receiver 309. The signal HSYNC output from the relay 3 of the next stage is connected to the other input signal line of the OR gate 304 via the connector 303 and then a receiver 310. The output from the OR gate 304 is connected to the connector 301 via the driver 305, and is then output to the host computer 1.

Reference numeral 311 denotes a resistor which forcibly sets the signal HSYNC from the FLCD 2 at LOW level "0" when the FLCD 2 is not connected to the corresponding relay 3. For this purpose, one terminal of the resistor 311 is connected to a signal line for the signal HSYNC between the connector 302 and receiver 309, and its other terminal is connected to ground voltage (ground). With this circuit, when no FLCD 2 is connected to the corresponding relay 3 or when the FLCD 2 connected to the relay 3 is OFF and is not in operation, one input signal line of the OR gate 304 connected to the output of the receiver 309 is forcibly set at LOW level "0". The output from the OR gate 304 changes in correspondence with the other input signal line, i.e., the state of the signal HSYNC output from the relay 3 of the next stage. More specifically, when the signal HSYNC output from the relay 3 of the next stage is HIGH level "1", the output from the OR gate 304 changes to HIGH level "1". On the other hand, when the signal HSYNC output from the relay 3 of the next stage is LOW level "0", the output from the OR gate 304 changes to LOW level "0".

Reference numeral 312 denotes a resistor which forcibly sets the signal HSYNC from the relay 3 of the next stage at LOW level "0" when no relay 3 is connected to the next stage. For this purpose, one terminal of the resistor 312 is connected to a signal line for the signal HSYNC between the connector 303 and receiver 310, and its other terminal is connected to ground voltage (ground). With this circuit, when no relay 3 is connected to the next stage, one input signal line of the OR gate 304 connected to the output of the receiver 310 is forcibly set at LOW level "0". The output from the OR gate 304 changes in correspondence with the other input signal line, i.e., the state of the signal HSYNC output from the FLCD 2. More specifically, when the signal HSYNC output from the FLCD 2 is HIGH level "1", the output from the OR gate 304 changes to HIGH level "1". On the other hand, when the signal HSYNC output from the FLCD 2 is LOW level "0", the output from the OR gate 304 changes to LOW level "0".

The signal BOXPOW output from the host computer 1 supplies electric power to the OR gate 304, drivers 305 to 307, and receivers 308 to 310 that construct the relay 3. The signal BOXPOW is connected to the relay 3 via the connector 301, and is directly output to the relay 3 of the next stage via the connector 303.

When the aforementioned relays 3 are connected to a plurality of FLCDs 2, a plurality of FLCDs 2 can be connected to the single host computer 1.

The transfer timings of the display line addresses and pixel data to a plurality of FLCDs 2 will be explained below with reference to FIG. 11.

Figure 11:
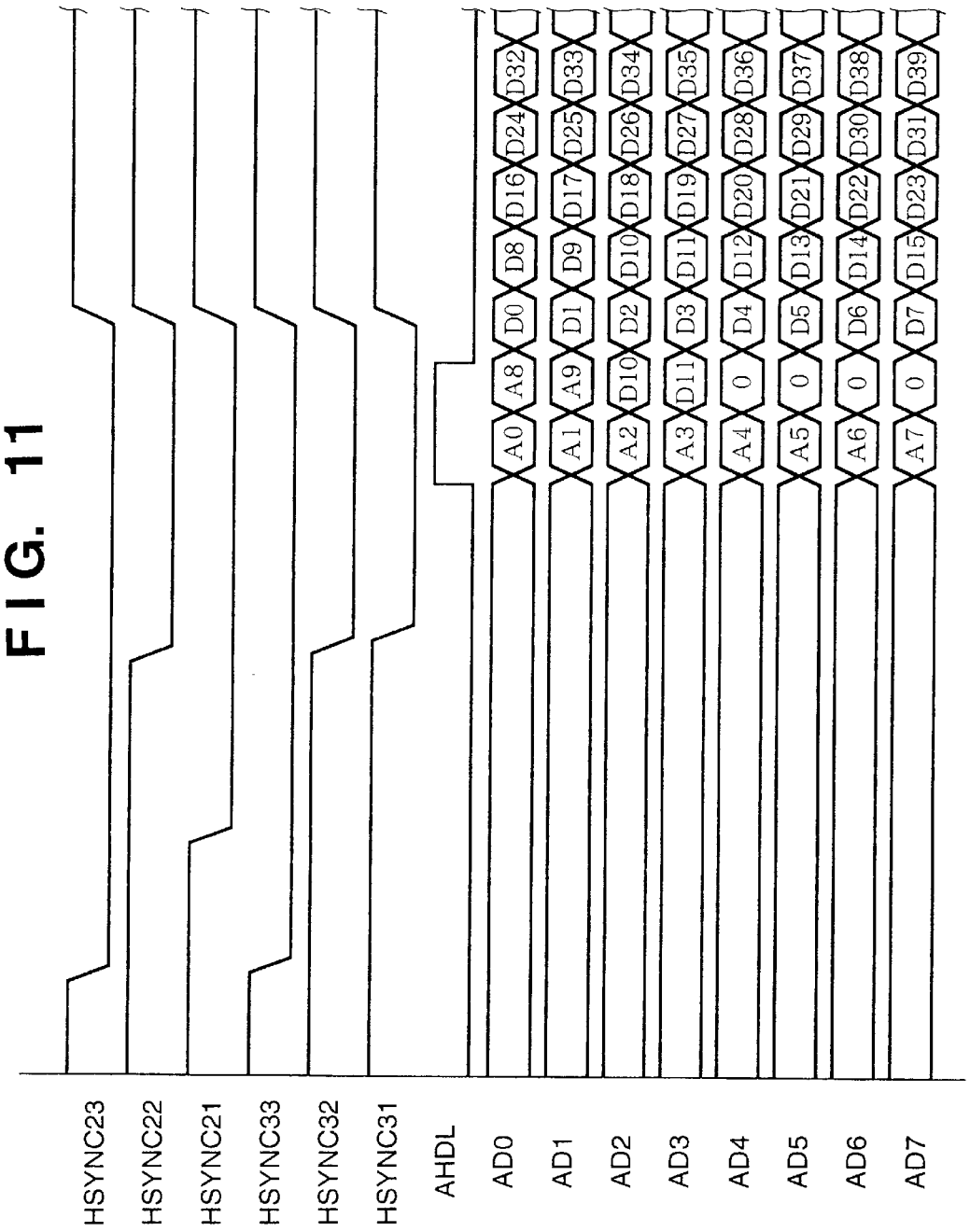
FIG. 11 is a timing chart showing the display line addresses and the transfer timings of pixel data to a plurality of FLCDs according to the first embodiment of the present invention.

FIG. 11 is a timing chart showing the transfer timings of the display line addresses and pixel data to a plurality of FLCDs according to the first embodiment of the present invention.

Figure 12:
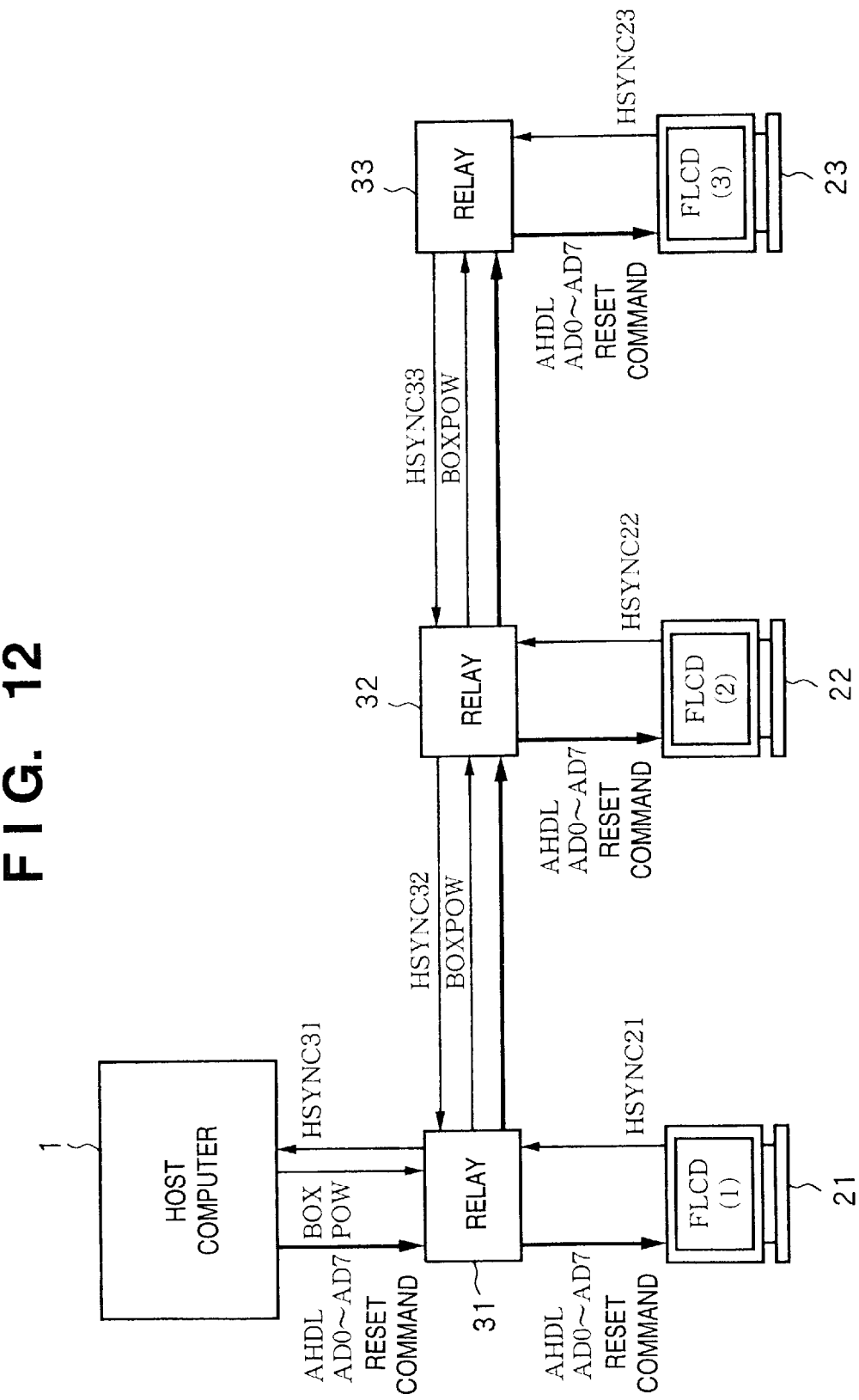
FIG. 12 is a block diagram showing an example of the arrangement of a display control system according to the first embodiment of the present invention.

Note that FIG. 11 will be explained taking a display control system that connects three FLCDs 2, as shown in FIG. 12, as an example.

As shown in FIG. 12, FLCDs 21, 22, and 23 respectively asynchronously output sync signals HSYNC21, HSYNC22, and HSYNC23 which represent data transmission requests. No relay 3 is connected to the output side of a relay 33. For this reason, when the sync signal HSYNC23 output from the FLCD 23, which is connected to the relay 33, changes to LOW level "0", the relay 33 sets a signal HSYNC33 at LOW level "0", and outputs it to a relay 32 of the previous stage.

When the sync signal HSYNC33 output from the relay 33, which is connected to the next stage, changes to LOW level "0", and the sync signal HSYNC22 output from the FLCD 22 connected to the relay 32 changes to LOW level "0", the relay 32 sets a sync signal HSYNC32 at LOW level "0", and outputs it to a relay 31 of the previous stage.

Similarly, when the sync signal HSYNC32 output from the relay 32, which is connected to the next stage, changes to LOW level "0", and the sync signal HSYNC21 output from the FLCD 21 connected to the relay 31 changes to LOW level "0", the relay 31 sets a sync signal HSYNC31 at LOW level "0", and outputs it to the host computer 1.

When the host computer 1 has detected that the signal HSYNC31 is LOW level "0", it sets the identification signal AHDL that identifies the display line addresses and pixel data at HIGH level "1", and transfers the display line addresses to the relay 31. Upon completion of transfer of the display line addresses, the host computer 1 sets the identification signal AHDL at LOW level "0", and transfers pixel data to the relay 31. In this way, data on signal lines AD0 to AD7 and the identification signal AHDL output from the host computer 1 are output to the FLCDs 21, 22, and 23 via the relays 31, 32, and 33. Subsequently, when the pixel data are output from the host computer 1, identical image information is simultaneously displayed on the display screens of the FLCDs 21, 22, and 23.

The sync signals HSYNC21, HSYNC22, and HSYNC23 output from the FLCDs 21, 22, and 23 are reset to HIGH level "1", when the corresponding FLCDs 21, 22, and 23 detect pixel data output from the host computer 1. After the pixel data for one line are output from the host computer 1, the FLCDs 21, 22, and 23 set their sync signals HSYNC21, HSYNC22, and HSYNC23 at LOW level "0" again, thus repetitively outputting pixel data form the host computer 1. In this fashion, identical image information can be repetitively displayed on the display screens of the FLCDs 21, 22, and 23.

The outline of the processing executed by the display control system of the first embodiment will be described below with reference to FIG. 13.

Figure 13:
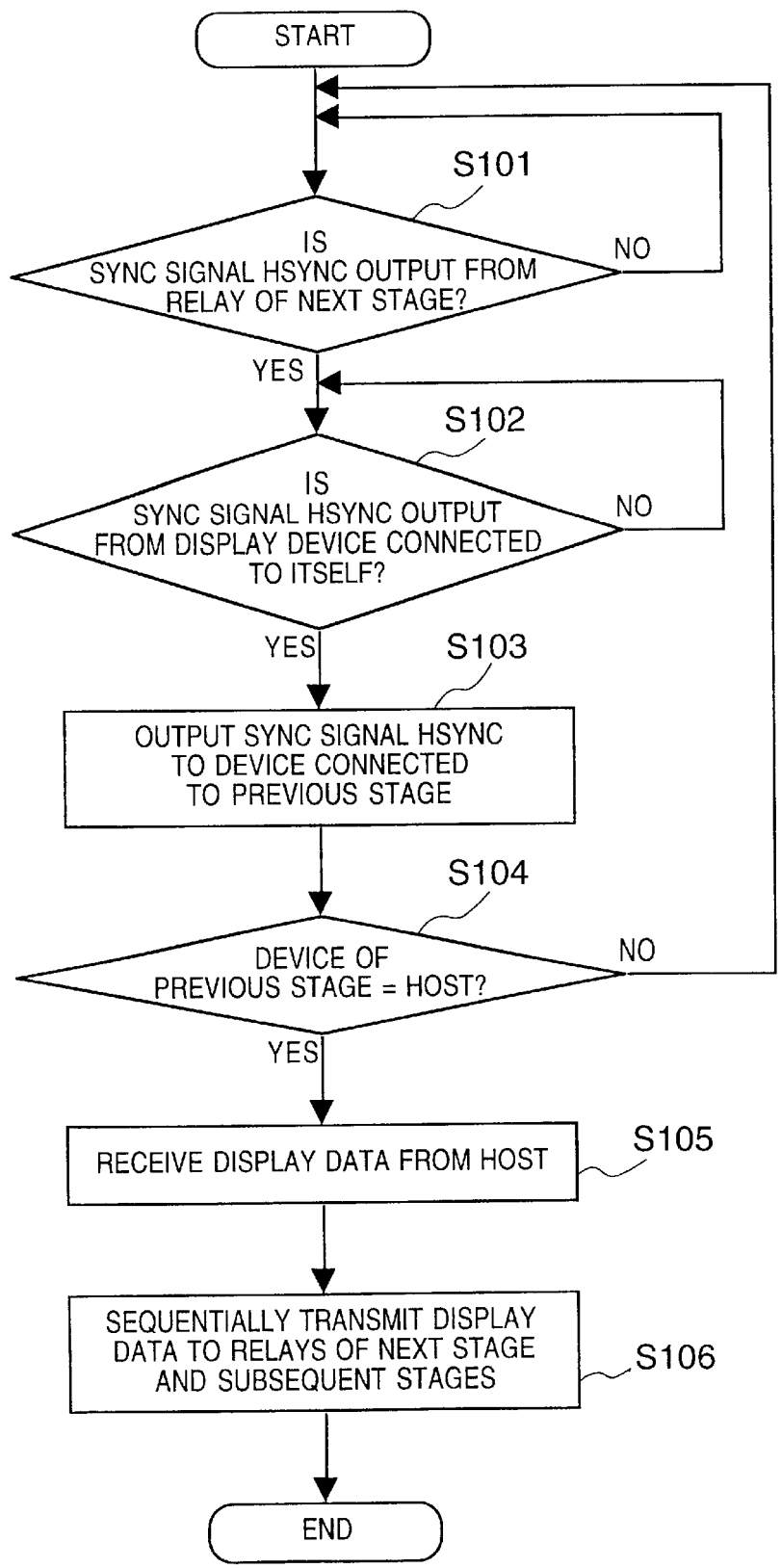
FIG. 13 is a flow chart showing the overall control according to the first embodiment of the present invention.

FIG. 13 is a flow chart showing the processing executed in the first embodiment of the present invention.

In step S101, a given relay checks if a sync signal HSYNC is output from the relay connected to the next stage. If the sync signal HSYNC is not output (NO in step S101), the relay waits until the signal HSYNC is output. On the other hand, if the sync signal HSYNC is output (YES in step S101), the flow advances to step S102.

The relay checks if a sync signal HSYNC is output from a display device to which the relay itself is connected (step S102). If the sync signal HSYNC is not output from the display deice (NO in step S102), the relay stands by until the signal HSYNC is output. On the other hand, if the sync signal HSYNC is output (YES in step S102), the flow advances to step S103.

The relay outputs the sync signal HSYNC to a device connected to the previous stage (step S103). The relay then checks if the device connected to the previous stage is a host computer (step S104). If the device is not a host computer (NO in step S104), the flow returns to step S101. On the other hand, if the device is a host computer (YES in step S104), the flow advances to step S105.

Then, the relay receives display data from the host computer (step S105). The relay sequentially transmits the received display data to the relays connected to the next stage and the subsequent stages (step S106).

As described above, according to the first embodiment, since a relay, which monitors the presence/absence of image information request signals output from one display device and display devices connected after that display device, and can distribute image information output from a display controller to all the display devices on the basis of the monitoring result, is arranged, a plurality of display devices can be connected to a single display controller, and an identical display image can be simultaneously displayed on the plurality of display devices. In this fashion, identical image information can be simultaneously displayed on a plurality of display devices set in a broad site such as a presentation site, demonstration site, and the like.

<Second Embodiment>

In the second embodiment, a display control system which can display different image information contents on a plurality of display devices using a single display controller will be explained.

Figure 14:
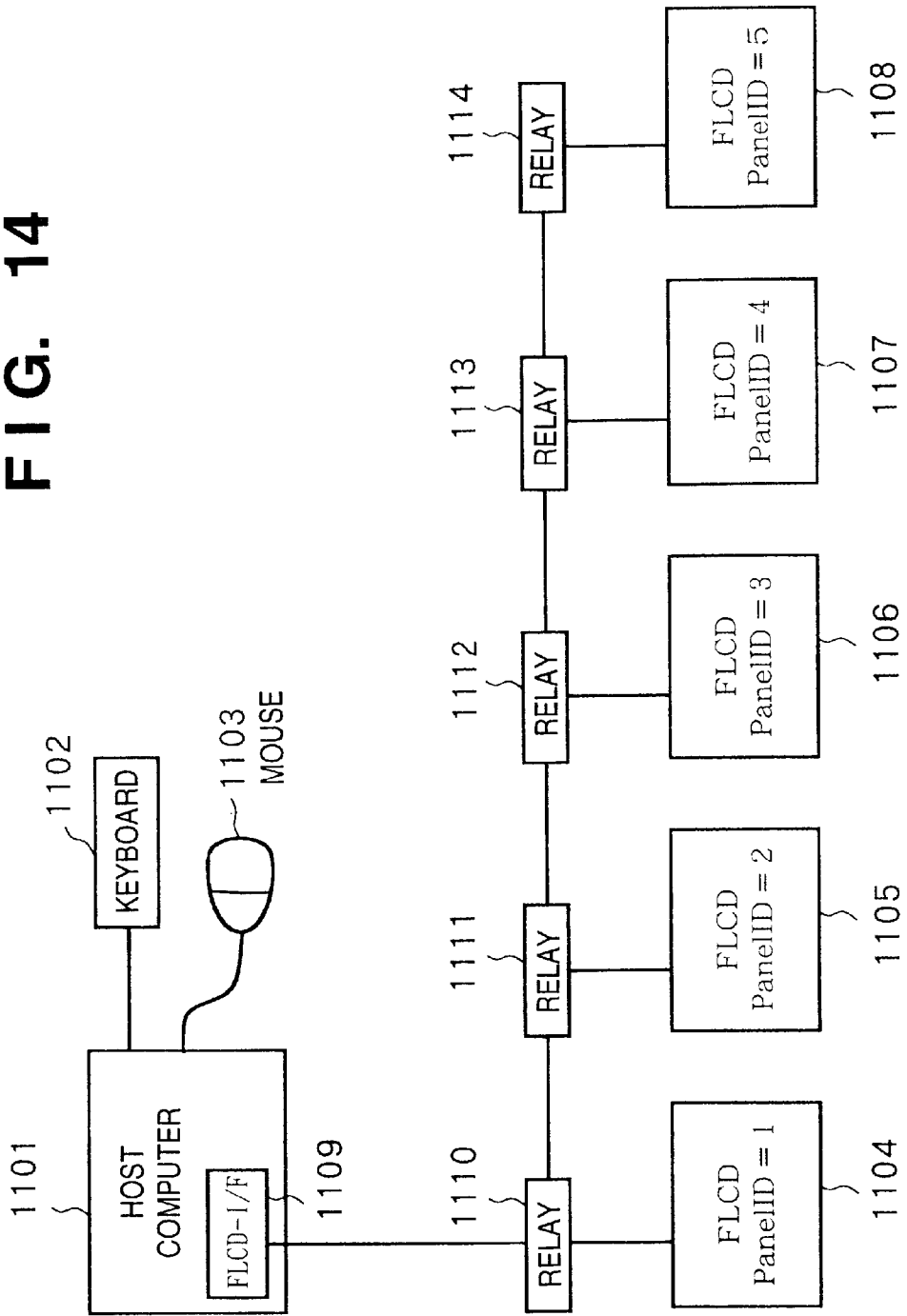
FIG. 14 is a schematic block diagram showing the arrangement of a display control system according to the second embodiment of the present invention.

FIG. 14 is a schematic block diagram showing the arrangement of a display control system according to the second embodiment of the present invention.

Referring to FIG. 14, reference numeral 1101 denotes a host computer, which controls the entire display control system. Reference numeral 1102 denotes a keyboard; and 1103, a mouse, which are used for inputting characters such as letters, numerals, and the like. Reference numerals 1104 to 1108 denote FLCDs, which are connected to the host computer 1101 via an FLCD-I/F 1109, and are used as display devices for displaying image information such as various letters, images, and the like output from the host computer 1101. Also, the FLCDs 1104 to 1108 are assigned unique device IDs (other than zero). Reference numerals 1110 to 1114 denote relays which connect the host computer 1101 and FLCDs 1104 to 1108 in a daisy-chain pattern.

The detailed arrangement of the FLCD-I/F 1109 will be explained below with reference to FIG. 15.

Figure 15:
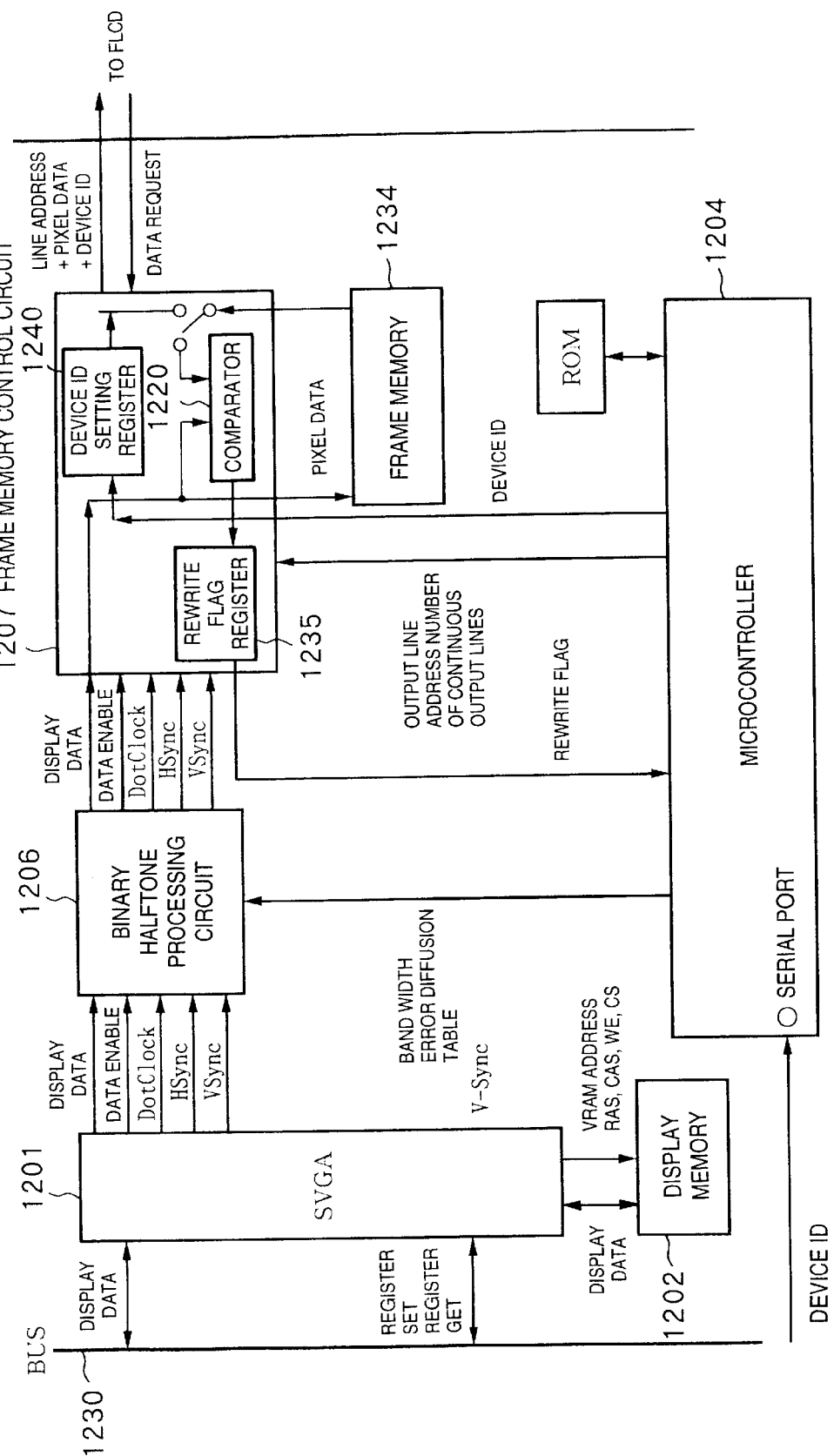
FIG. 15 is a detailed block diagram of an FLCD-I/F according to the second embodiment of the present invention.

FIG. 15 is a block diagram showing the FLCD-I/F according to the second embodiment of the present invention in detail.

Referring to FIG. 15, the internal host CPU (not shown) of the host computer 1101 informs a microcontroller 1204 of the device ID of the destination FLCD via a serial I/F. The microcontroller 1204 sets the device ID informed from the host CPU in a device ID setting register 1240 of a frame memory control circuit 1207.

Subsequently, the host CPU transfers display data to a display memory 1202 via a system bus 1230 and SVGA 1201. The display data has a 24-bit data format that expresses each of R, G, and B colors using 256 gradation levels. On the other hand, the SVGA 1201 sequentially reads out display data at the corresponding display memory addresses in the order from the left to right and from the top to bottom of the display screen from the display memory 1202, and transfers them to a binary halftone processing circuit 1206. At this time, the SVGA 1201 also transfers a data enable signal that represents the display data effective period, reference clocks DotClock, and horizontal and vertical sync signals Hsync and Vsync together with the display data.

The binary halftone processing circuit 1206 converts 256-gradation multi-valued display data, which expresses each of R, G, and B colors using 8 bits, into 16-valued pixel data corresponding to the display screen of the FLCD (not shown). In the second embodiment, one pixel of the display screen consists of four dots, i.e., R, G, B, and I. As the binary halftone processing technique to be used by the binary halftone processing circuit 1206, error diffusion (ED) that diffuses errors in units of bands (each including a plurality of lines) is used.

Pixel data generated by the binary halftone processing circuit 1206 is output to the frame memory control circuit 1207 in synchronism with the data enable signal.

The frame memory control circuit 1207 writes pixel data at that frame memory address of a frame memory 1234, which is calculated from the value indicated by a line counter (not shown) using the horizontal and vertical sync signals Hsync and Vsync. Upon writing pixel data into the frame memory 1234, the circuit 1207 reads out pixel data therefrom at the same time.

A comparator 1220 compares the written and readout pixel data. As a result of comparison, if the two pixel data are different from each other, the comparator 1220 determines that the pixel data has been rewritten, and sets a rewrite flag at the corresponding location of a rewrite flag register 1235 at "1" (ON). Note that the rewrite flag register 1235 comprises a bit sequence, each bit of which indicates the presence/absence of rewrite of the corresponding band.

The microcontroller 1204 reads out the rewrite flag from the rewrite flag register 1235 in the frame memory control circuit 1207. Then, the rewrite line of the next display frame on the FLCD is determined, and is set in the frame memory control circuit 1207. In this case, an area with ON rewrite flags is preferentially displayed.

The frame memory control circuit 1207 reads out pixel data from the output line position designated by the microcontroller 1204, and sends them to the FLCD. In this case, the circuit 1207 multiplexes the device ID and output line address designated by the microcontroller 1204 with the pixel data, and transmits them.

The FLCD designated by the device ID displays the pixel data received from the FLCD-I/F 1109 at a line position in the display screen designated by the line address. After the FLCD has received pixel data for one line and is ready to receive pixel data for the next line, it transmits a data request signal to the frame memory control circuit 1207. On the other hand, when the device ID=0 is designated, pixel data are transmitted to all the connected FLCDs.

An example of the arrangement of the display control system according to the second embodiment will be explained below with the aid of FIG. 16.

Figure 16:
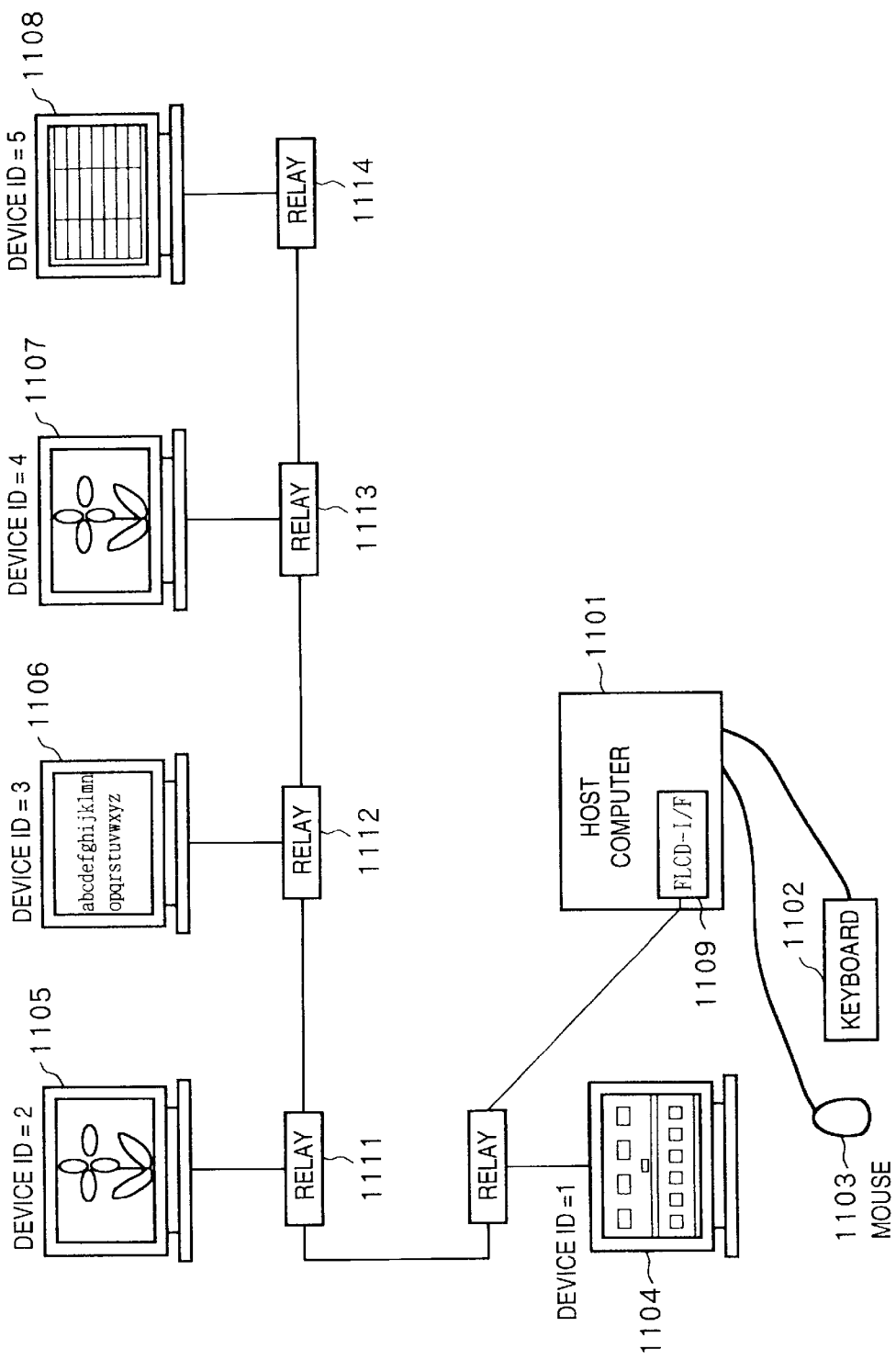
FIG. 16 is a diagram showing an example of the arrangement of the display control system according to the second embodiment of the present invention.

The FLCD 1104 shown in FIG. 16 serves as a display device for displaying the control screen used for controlling the display control system, and the user makes operations on this control screen to determine the destination FLCD and to do various setups. The FLCDs 1105 to 1108 display images on the basis of pixel data transmitted from the host computer 1101 in accordance with the setup contents at the FLCD 1104.

The control screen displayed on the FLCD 1104 will be described in detail below with reference to FIG. 17.

Figure 17:
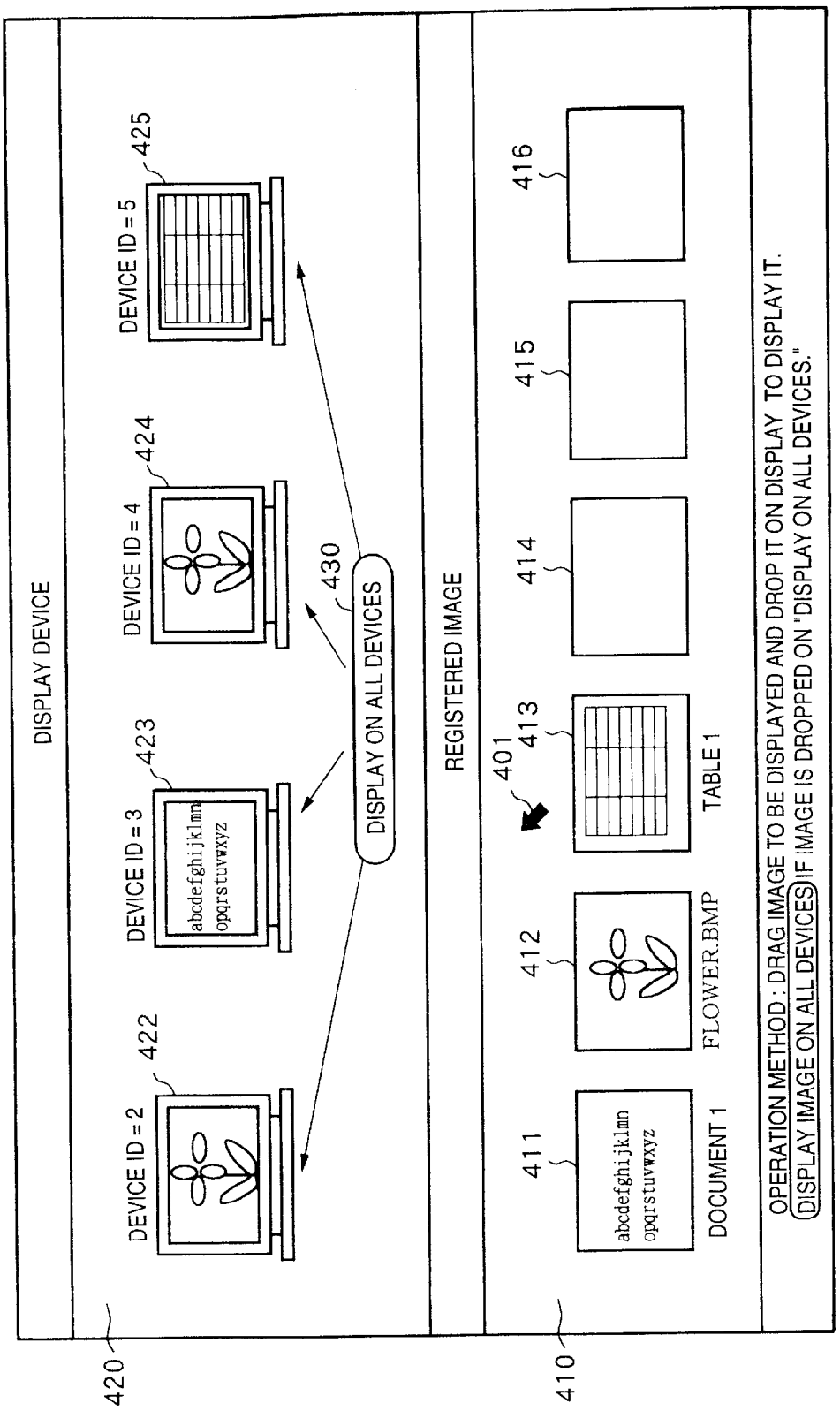
FIG. 17 is a view showing the control screen used for controlling the display control system according to the second embodiment of the present invention in detail.

FIG. 17 shows the control screen used for controlling the display control system according to the second embodiment of the present invention in detail.

Referring to FIG. 17, the user can drag & drop by moving a mouse pointer 401. A window 410 displays images registered in advance in the host computer 1101 as icons. In FIG. 17, icons 411 to 416 are displayed as the registered image files. Note that the user can additionally register a new image file or can delete a registered file on this window 410. A window 420 displays icons 422 to 425 representing the current display states of the display screens of the FLCDs 1105 to 1108 shown in FIG. 16.

When the user sets to display an image file on a destination FLCD, he or she drags the image file to be displayed from those displayed as icons on the window 410, and drops it on the destination FLCD on the window 420. When the user drops the dragged image file on an icon 430 "display on all devices" in the window 420, all the FLCDs other than the FLCD that displays the control screen serve as the destinations of that image file.

Note that the control screen shown in FIG. 17 depicts the state wherein the icon 411 is dragged and dropped on the icon 423 representing the FLCD 1106; the icon 412 on the icons 422 and 424 representing the FLCDs 1105 and 1107; and the icon 413 on the icon 425 representing the FLCD 1108.

The outline of the processing executed by the display control system of the second embodiment will be explained below using FIG. 18.

Figure 18:
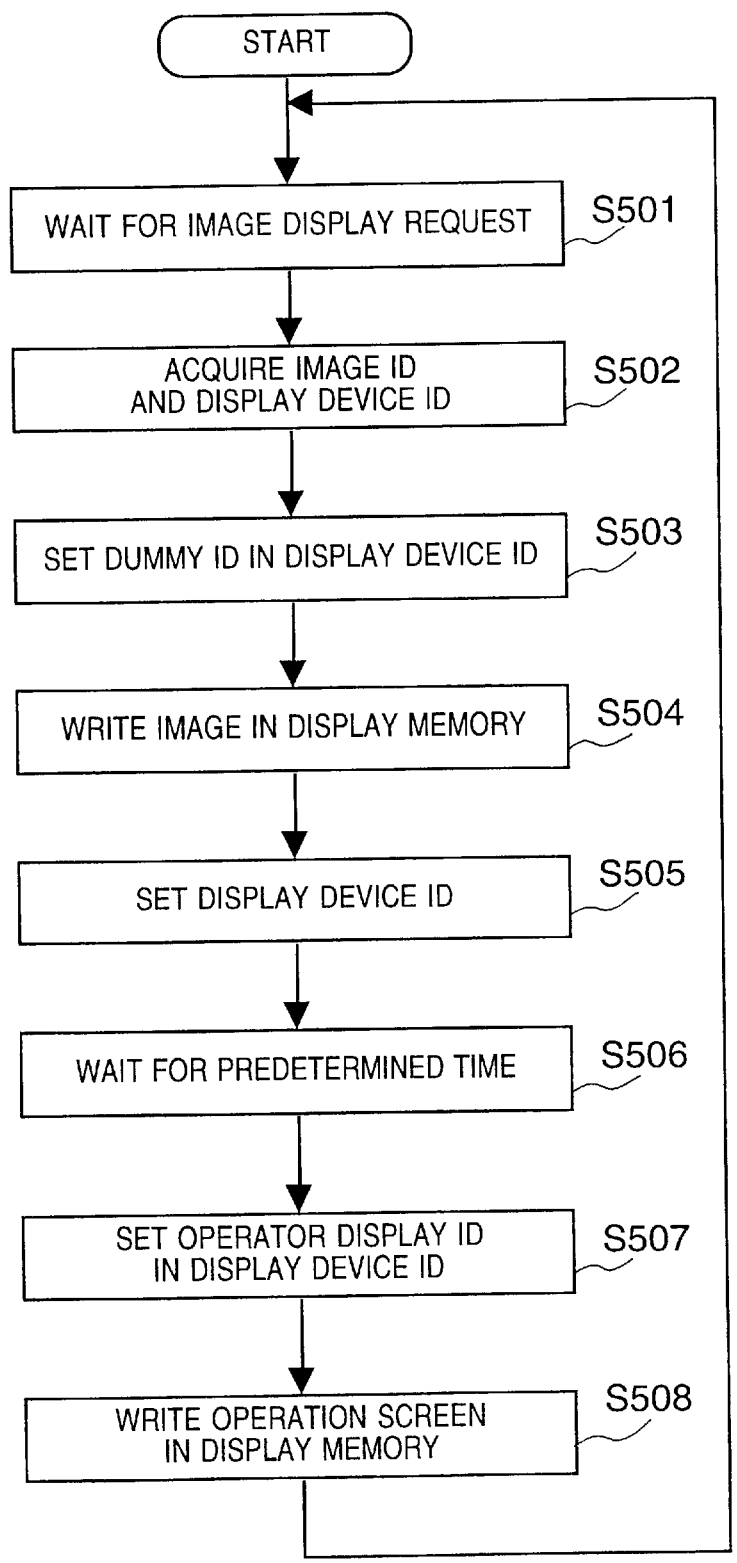
FIG. 18 is a flow chart showing the processing executed by the second embodiment of the present invention.
Figure 19:
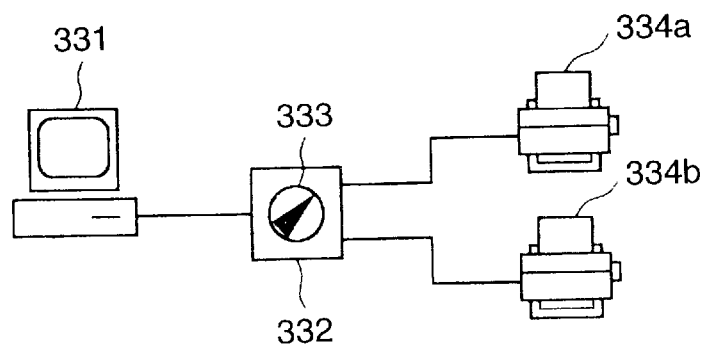
FIG. 19 is a block diagram showing an example of the arrangement of a printer switching system.
Figure 20:
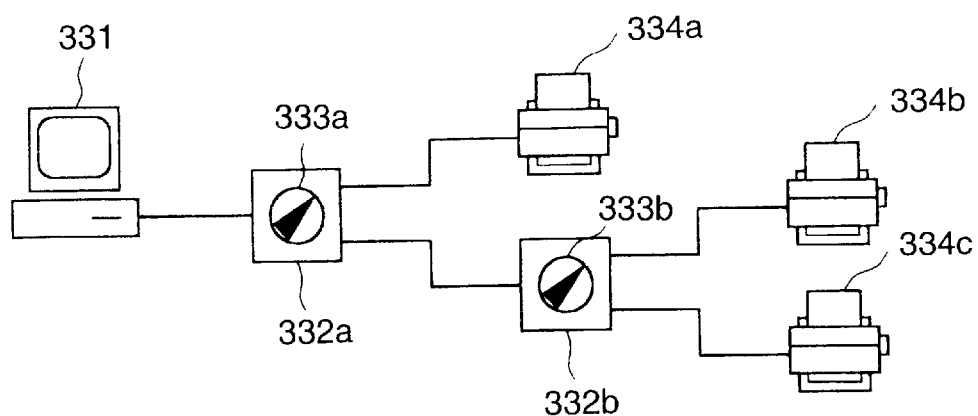
FIG. 20 is a block diagram showing another example of the arrangement of a printer switching system.
Figure 21:
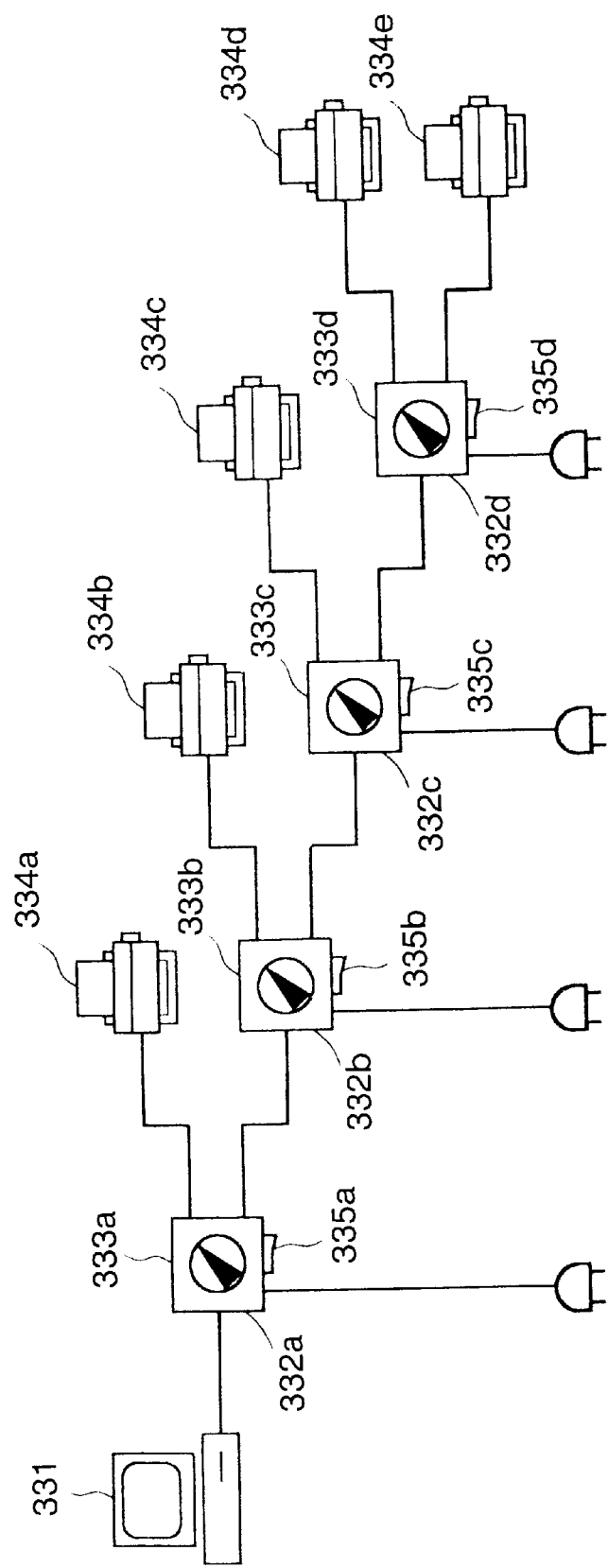
FIG. 21 is a block diagram showing still another example of the arrangement of a printer switching system.

FIG. 18 is a flow chart showing the processing executed in the second embodiment of the present invention.

Note that the processing to be executed in practice when the user requests to display a certain image on a given display device will be taken as an example.

In step S501, the control waits for an image display request input by the user. Note that the image display request is issued when the user drags the icon of a desired image file, and drops it on the icon that represents a desired FLCD. In step S502, the control acquires the image ID of the image file dragged by the user, and the device ID of the FLCD. In step S503, a dummy device ID is set as the device ID in the device ID setting register 1240 of the FLCD-I/F 1109. This is to prevent incomplete image data (odd display data which is being written) from being displayed while image data is being written in the display memory 1202 in step S504.

In step S504, the image file with the image ID acquired in step S502 is written in the display memory 1202. In step S505, the device ID acquired in step S502 is set in the device ID setting register 1240 of the FLCD-I/F 1109. After that, image display on the FLCD designated by the user starts. In step S506, the control waits for a predetermined period of time. This wait time is set to be long enough to scan one screen (one frame) by the FLCD.

In step S507, the device ID of the FLCD that displays the control screen in the device ID setting register 1240 of the FLCD-I/F 1109. In step S508, the contents on the control screen are written in the display memory 1202, thus restoring the control screen. After that, the flow returns to step S501 to wait for the next image display request by the user.

As described above, according to the second embodiment, a display control system which can control a single host computer and a plurality of display devices to display can be realized. Hence, a low-cost flexible display control system, which does not limit the number of display devices connected, can be provided.

As described above, according to the first and second embodiments, a display control system which can perform display control of a plurality of display devices to display by a single display controller, and does not limit the number of display devices connected, and its control method can be provided.

<Third Embodiment>

Figure 22:
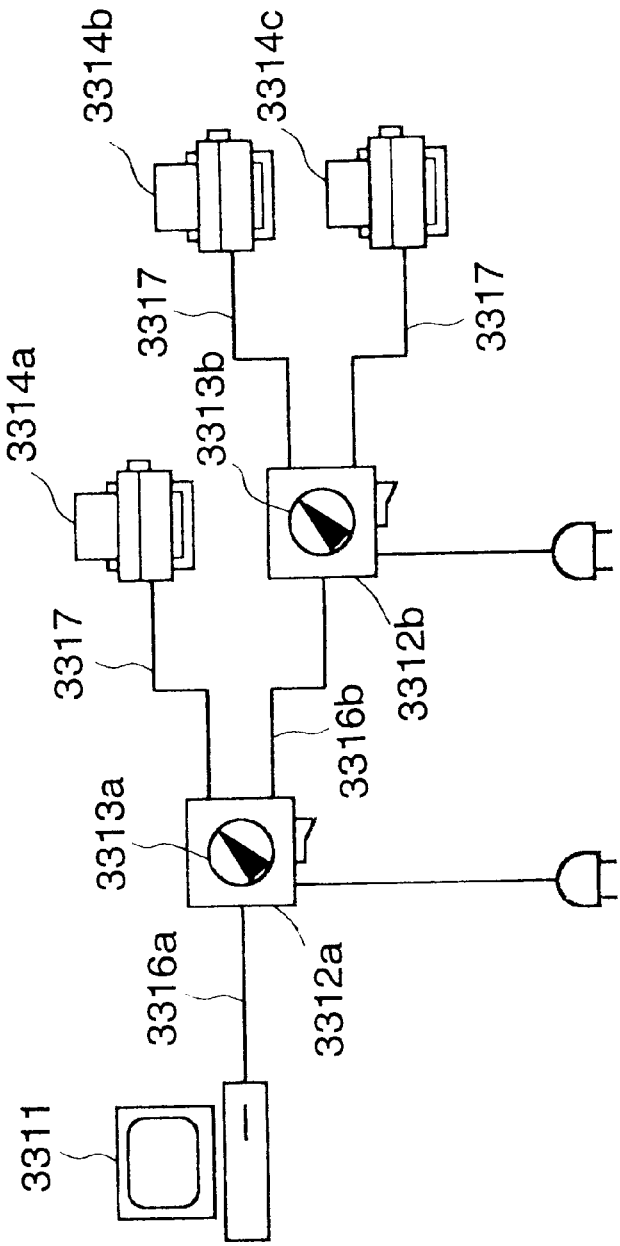
FIG. 22 is a block diagram showing an example of the arrangement of a printer switching system according to the third embodiment of the present invention.

FIG. 22 is a block diagram showing the arrangement of a switching system according to the third embodiment of the present invention.

Referring to FIG. 22, reference numeral 3311 denotes a host computer; 3312a and 3312b, switching devices; and 3314a to 3314c, printers. Reference numerals 3316a, 3316b, and 3317 denote cables which respectively connect between the host computer and the switching devices, between the two switching devices, and between the switching devices and printers.

In the switching system of the third embodiment, the device connected to each switching device is a printer, but may be a display device or any other devices.

The interface specifications between adjacent devices use a Centronics interface known as a typical printer interface. Hence, each of the cables 3316a, 3316b, and 3317 includes a strobe signal line, data bus signal line, acknowledge signal line, busy signal line, and ground line (none of them are shown). In this embodiment, each of the cables 3316a, 3316b, and 3317 includes a power supply status signal line indicating whether the power supply is ON or OFF. Note that the power supply status line outputs "H" level when the corresponding device is ON, and "L" level when it is OFF.

In each cable 3317, the strobe and data bus signal lines are input lines, and the acknowledge and busy signal lines are output lines when viewed from the printer (3314a to 3314c). Also, the power supply status signal line is an output line, and indicates the power supply status of a corresponding one of the printers 3314a to 3314c. In each of the cables 3316a and 3316b, the strobe and data bus signal lines are input lines, and the acknowledge and busy signal lines are output lines when respectively viewed from the switching devices 3312a and 3312b. Also, the power supply status signal line is an output line, and indicates the power supply status of a switching device closer to the printer.

Figure 23:
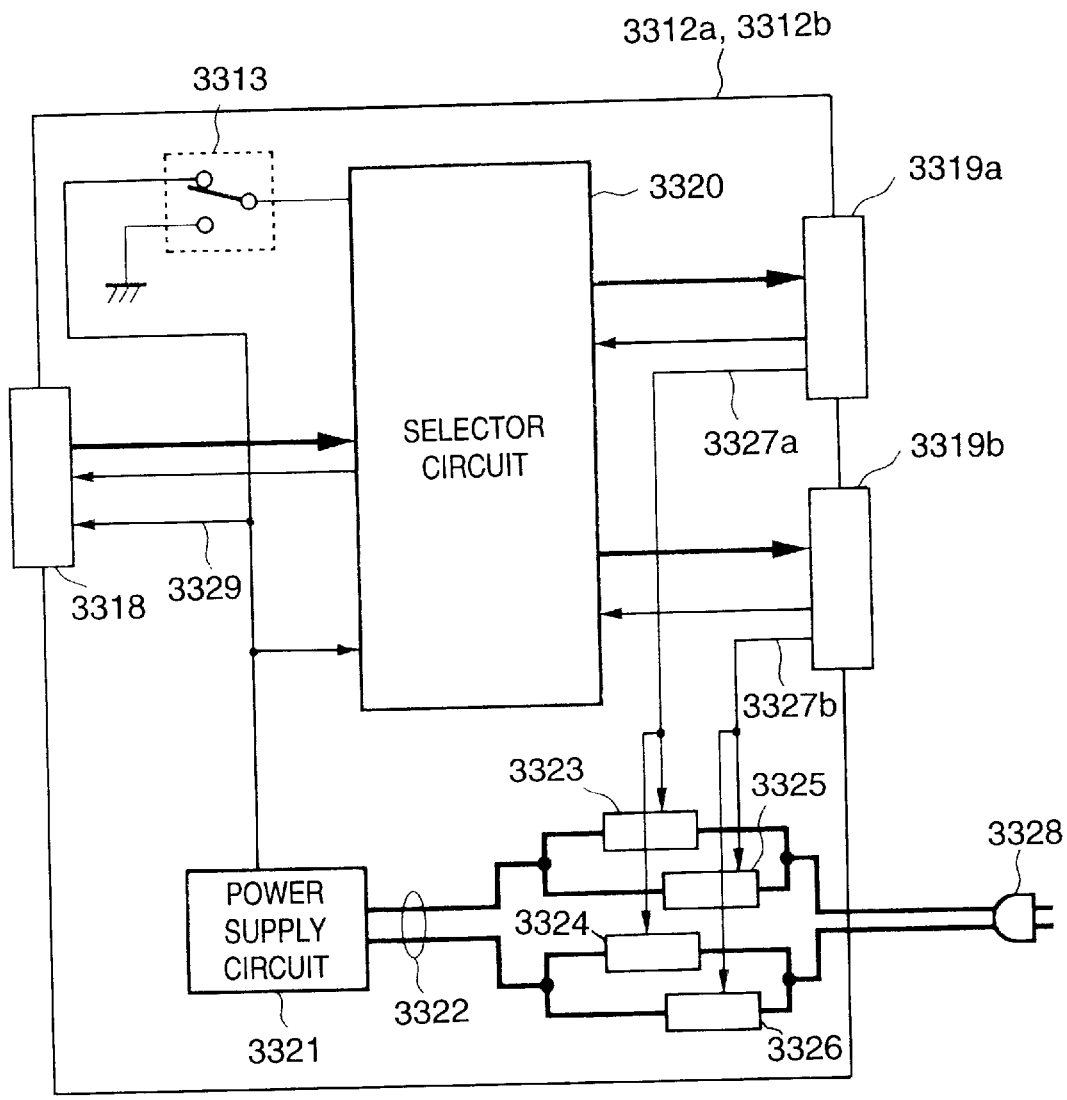
FIG. 23 is a block diagram showing the arrangement of a switching device according to the third embodiment of the present invention.

FIG. 23 is a block diagram showing the arrangement of the switching device according to the third embodiment.

Referring to FIG. 23, reference numeral 3318 denotes a connector, which is connected to the host computer 3311 or the switching device of the previous stage (the switching device on the host computer side). Reference numerals 3319a and 3319b denote connectors, each of which is connected to the printer or the switching device of the next stage (the switching device on the printer side). Reference numeral 3320 denotes a selector circuit which enables one of data communication paths between the connectors 3318 and 3319a and between the connectors 3318 and 3319b. The selection circuit will be described in detail later with reference to FIG. 24. Note that whether the path between the connectors 3318 and 3319a or between the connectors 3318 and 3319b is enabled is set by the user via a switch 3313.

Figure 24:
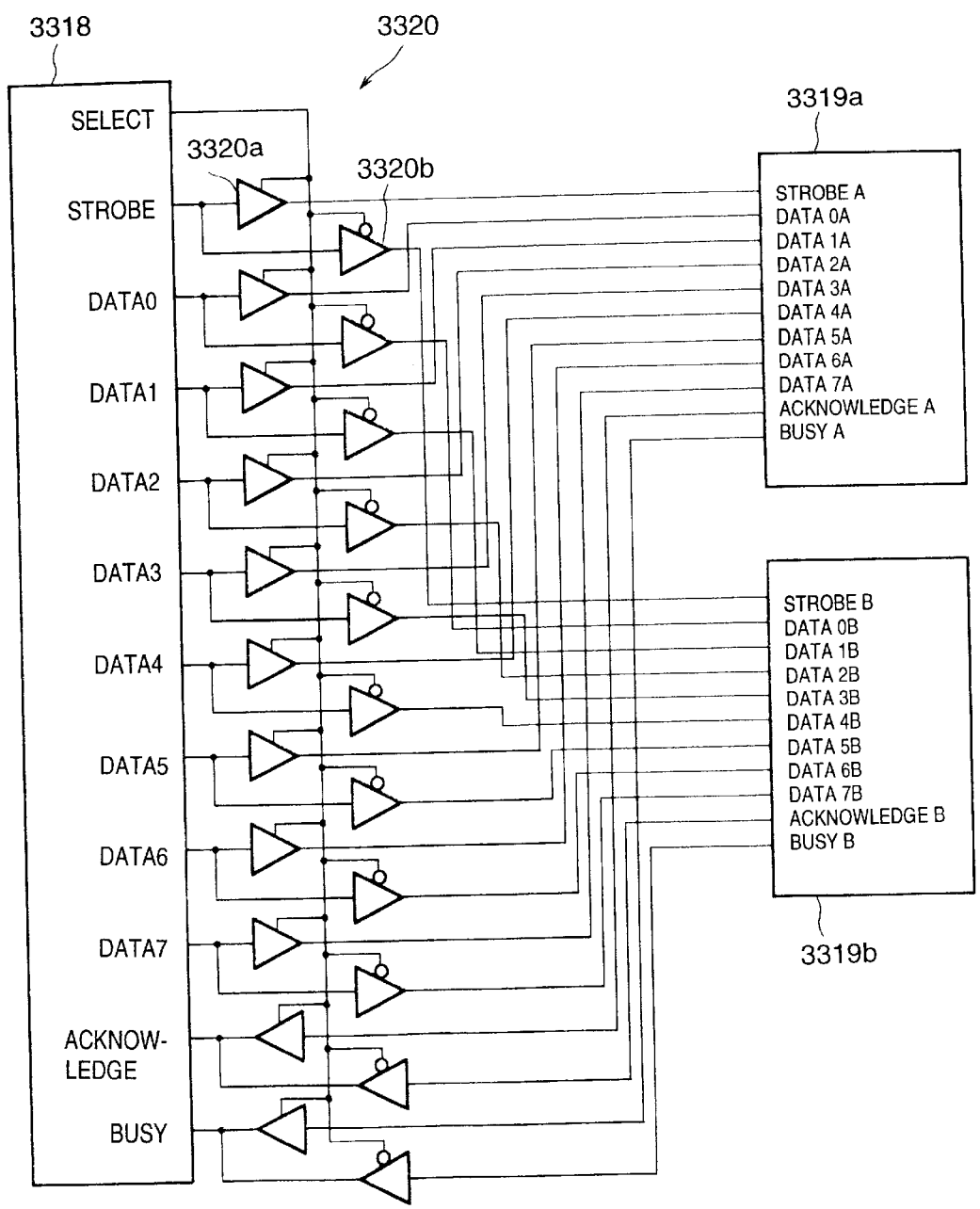
FIG. 24 is a circuit diagram showing an example of the arrangement of a selector circuit.

FIG. 24 shows an example of the arrangement of the selector circuit.

Referring to FIG. 24, reference numeral 3320a denotes tristate buffers, each of which directly outputs the input signal when the select signal is "H", or is set in a high-impedance state when the select signal is "L". Reference numeral 3320b denotes tristate buffers, each of which directly outputs the input signal when the select signal is "L", or is set in a high-impedance state when the select signal is "H". Hence, the path of the strobe, data bus, acknowledge, and busy signals can be switched to one of those "between the connectors 3318 and 3319a" and "between the connectors 3318 and 3319b" depending on whether the select signal from the switch 3313 is "H" or "L".

Reference numeral 3321 denotes a power supply circuit which generates a voltage of 5 V required for the selector circuit 3320 when an AC voltage of 100 V is applied to power supply lines 3322. Reference numerals 3323, 3324, 3325, and 3326 denote relays, each of which enables or disables the path between its input and output depending on the potential at its control terminal. Assume that each of the relays 3323, 3324, 3325, and 3326 is enabled when its control terminal is "H", and is disabled when its control terminal is "L". The relays 3323, 3324, 3325, and 3326 make ON/OFF control of the power supply as one characteristic feature of this embodiment.

Reference numerals 3327a and 3327b denote power supply status signal lines, which respectively represent the power supply status of the printer or switching device connected to the connectors 3319a and 3319b. The power supply status signal line 3327a is connected to the control terminals of the relays 3323 and 3324, and the power supply status signal line 3327b to those of the relays 3325 and 3326. When the power supply of the printer or switching device connected to the connector 3319a is ON, the power supply status signal line 3327 changes to "H" level. For this reason, the relays 3323 and 3324 are enabled, an AC voltage of 100 V applied via a plug 3328 is applied to the power supply lines 3322 via the relays 3323 and 3324. In this way, the power supply circuit 3321 operates and supplies a power supply voltage of 5 V to the selector circuit 3320, thus starting operation. In other words, the power supply of this switching device is turned on to start operation. Similarly, when the power supply of the printer or switching device connected to the connector 3319b is ON, this switching device starts operation via the relays 3325 and 3326.

Reference numeral 3329 denotes a power supply status signal line. The DC power supply voltage of 5 V as the output from the power supply circuit 3321 is directly output to the connector 3318, and is connected to the switching device of the previous stage connected to the connector 3318. Needless to say, the power supply status line 3329 changes to "H" level when the power supply is ON and to "L" level when it is OFF.

With the above-mentioned arrangement, for example, when the printer 3314b (FIG. 22) is turned on, the switching device 3312b operates, and a power supply status signal output from the switching device 3312b changes to "H" level. In response to this signal, the switching device 3312a operates independently of the power supply status of the printer 3314a, and the host computer 3311 can direct the printer 3314b to print. Similarly, when the printer 3314c is turned on, the switching devices 3312a and 3312b operate, and the host computer 3311 can command the printer 3314c to print. Furthermore, when the printers 3314b and 3314c are simultaneously turned on, the host computer 3311 can use the printer 3314b or 3314c to print.

Moreover, in any of the above-mentioned cases, when the power supply of the printer 3314a is ON, since the switching device 3312a operates, the printer 3314a is available to print. When the printer 3314a is ON and the printers 3314b and 3314c are OFF, since the printer 3314a is ON, the switching device 3312a operates, and the printer 3314a becomes available to print. At this time, since both the printers 3314b and 3314c are OFF, the switching device 3312b does not operate, thus reducing consumption power.

<Fourth Embodiment>

Figure 25:
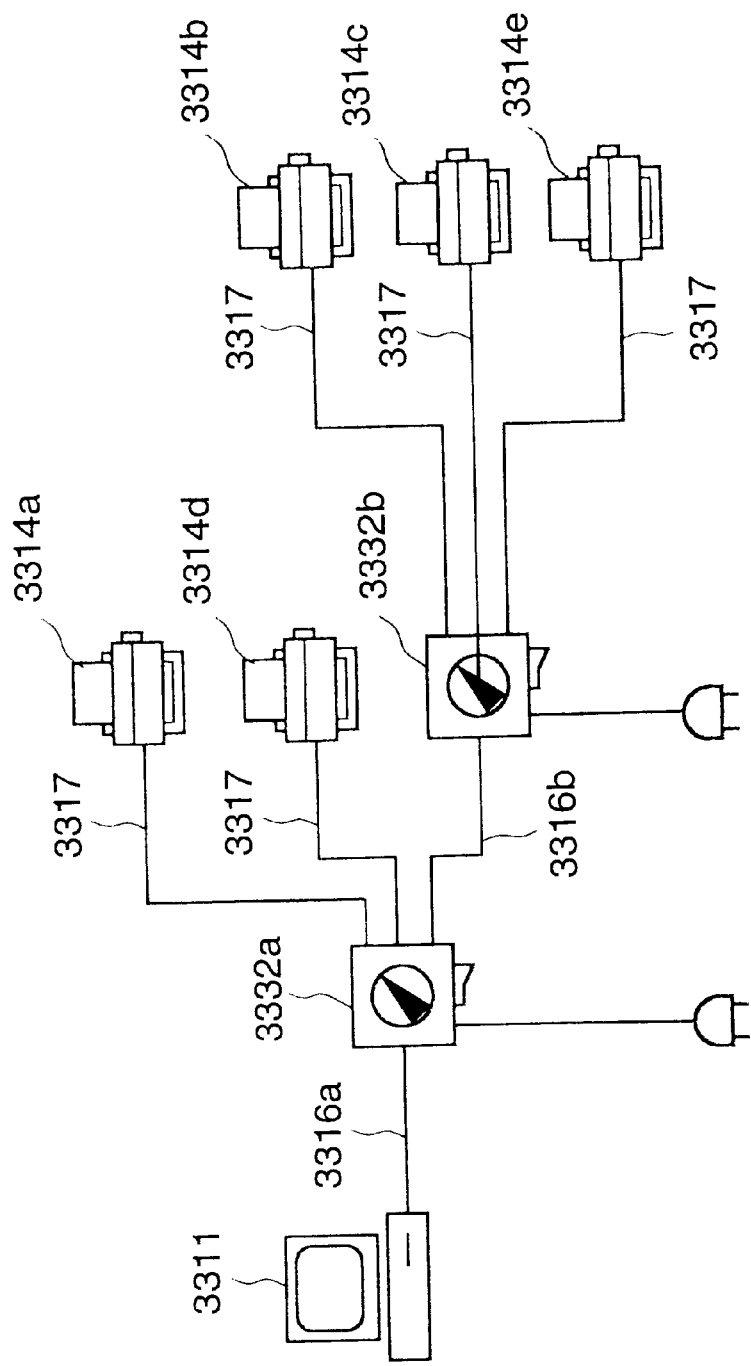
FIG. 25 is a block diagram showing a printer system according to the fourth embodiment of the present invention.

The fourth embodiment will be explained below. FIG. 25 is a diagram showing a printer system according to the fourth embodiment of the present invention.

The arrangement shown in FIG. 25 is substantially the same as that shown in FIG. 22, except that each of switching devices 3332a and 3332b can select one of three printers or switching devices. Note that the power supply status signal lines in cables 3316a, 3316b, and 3317 output "H" level when the corresponding device is ON, and are set in a high-impedance state when it is OFF.

Figure 26:
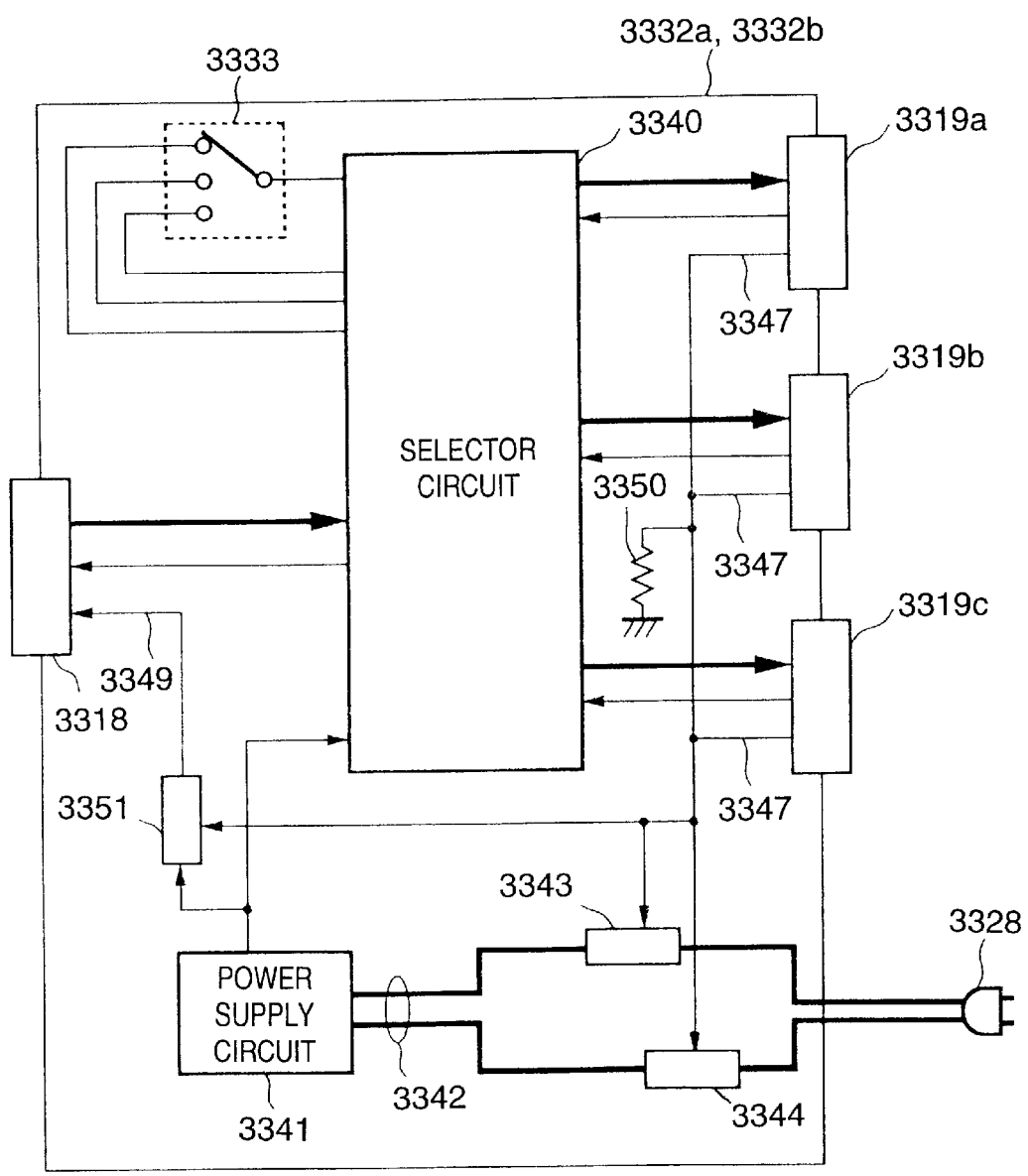
FIG. 26 is a block diagram showing an example of the arrangement of a switching device according to the fourth embodiment of the present invention.

FIG. 26 is a block diagram showing an example of the arrangement of the switching device according to the fourth embodiment.

In this embodiment, a selector circuit 3340 selects one of three printers and has an arrangement different from that of the selector circuit 3320 (FIG. 24) of the third embodiment. However, since this circuit 3340 can be built using a known technique, a detailed description thereof will be omitted.

As a power supply status signal line 3347 changes to "H" level when the power supply is ON or is set in a high-impedance state when it is OFF, three power supply status signal lines 3347 are connected in this device, are pulled down by a resistor 3350 to form a wired OR, and are connected to the control terminals of relays 3351, 3343, and 3344. Hence, the voltage levels at the control terminals of the relays 3351, 3343, and 3344 are "L" if the power supplies of all the printers or switching devices connected to connectors 3319a to 3319c are OFF.

Reference numeral 3349 denotes a power supply status signal line. In this case, a voltage of 5 V, as the output from a power supply circuit 3341 is output to a connector 3318 via the relay 3351, and is connected to the switching device of the previous stage connected to the connector 3318. Since the control terminal of the relay 3351 is connected to the same signal line as those of the relays 3343 and 3344 that ON/OFF-control the power supply, the power supply status signal line 3349 changes to "H" level when the power supply is ON, and is set in a high-impedance state when it is OFF.

With the above-mentioned arrangement, when at least one of printers 3314b, 3314c, and 3314e shown in FIG. 25 is turned on, the switching device 3332b operates, and a power supply status signal output from the switching device 3332b changes to "H" level. In response to this signal, the switching device 3332a operates irrespective of the power supply status of printers 3314a and 3314d, and a host computer 3311 can use the printer 3314b, 3314c, or 3314e to print. When the power supply of the printer 3314a or 3314d is ON, since the switching device 3332a operates, either the printer 3314a or 3314d is available to print.

When the printer 3314a is ON, the printer 3314d is OFF, and all the printers 3314b, 3314c, and 3314e are OFF, since the printer 3314a is ON, the switching device 3332a operates, and the printer 3314a becomes available to print. At this time, since all the printers 3314b, 3314c, and 3314e are OFF, the switching device 3332b does not operate, thus reducing consumption power.

On the other hand, when the printer 3314a is OFF, the printer 3314d is ON, and all the printers 3314b, 3314c, and 3314e are OFF, since the printer 3314d is ON, the switching device 3332*a* operates, and the printer 3314*d* becomes available to print. At this time, since all the printers 3314*b*, 3314*c*, and 3314*e* are OFF, the switching device 3332*b* does not operate, thus reducing consumption power.

Furthermore, when the printers 3314*a* and 3314*d* are ON and the printers 3314*b*, 3314*c*, and 3314*e* are OFF, since the printer 3314*a* or 3314*d* is ON, the switching device 3332*a* operates, and the printer 3314*a* or 3314*d* becomes available to print. At this time, since all the printers 3314*b*, 3314*c*, and 3314*e* are OFF, the switching device 3332*b* does not operate, thus reducing consumption power.

As described above, according to the third and fourth embodiments, the power supply of the required switching device can be automatically turned on in correspondence with the power supply states of the printers connected. Furthermore, the power supply of the switching device, which need not be turned on, is kept OFF, thus achieving power savings. Also, the ON switching device or devices is or are automatically turned off when it or they becomes or become unnecessary.

<Fifth Embodiment>

The fifth embodiment will be described below.

Figure 27:
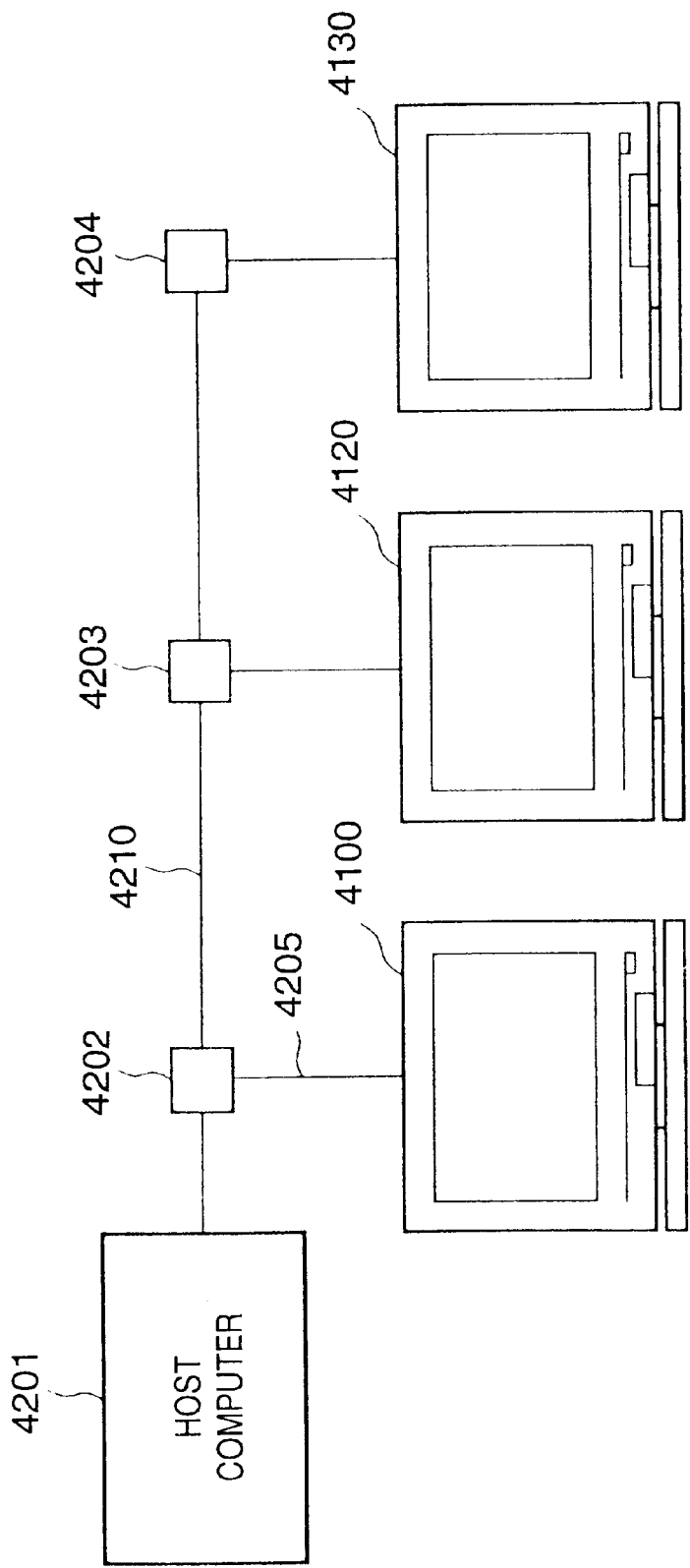
FIG. 27 is a block diagram showing the overall arrangement of a display system which connects a plurality of display devices and controls them to display.

FIG. 27 is a diagram showing the overall arrangement of a display system which connects a plurality of display devices to display.

Referring to FIG. 27, branch connectors 4202, 4203, and 4204 connect displays 4100, 4120, and 4130 connected thereto to a host computer 4201, and perform power supply control of the corresponding displays. The display system shown in FIG. 27 will be explained in detail later.

Figure 28:
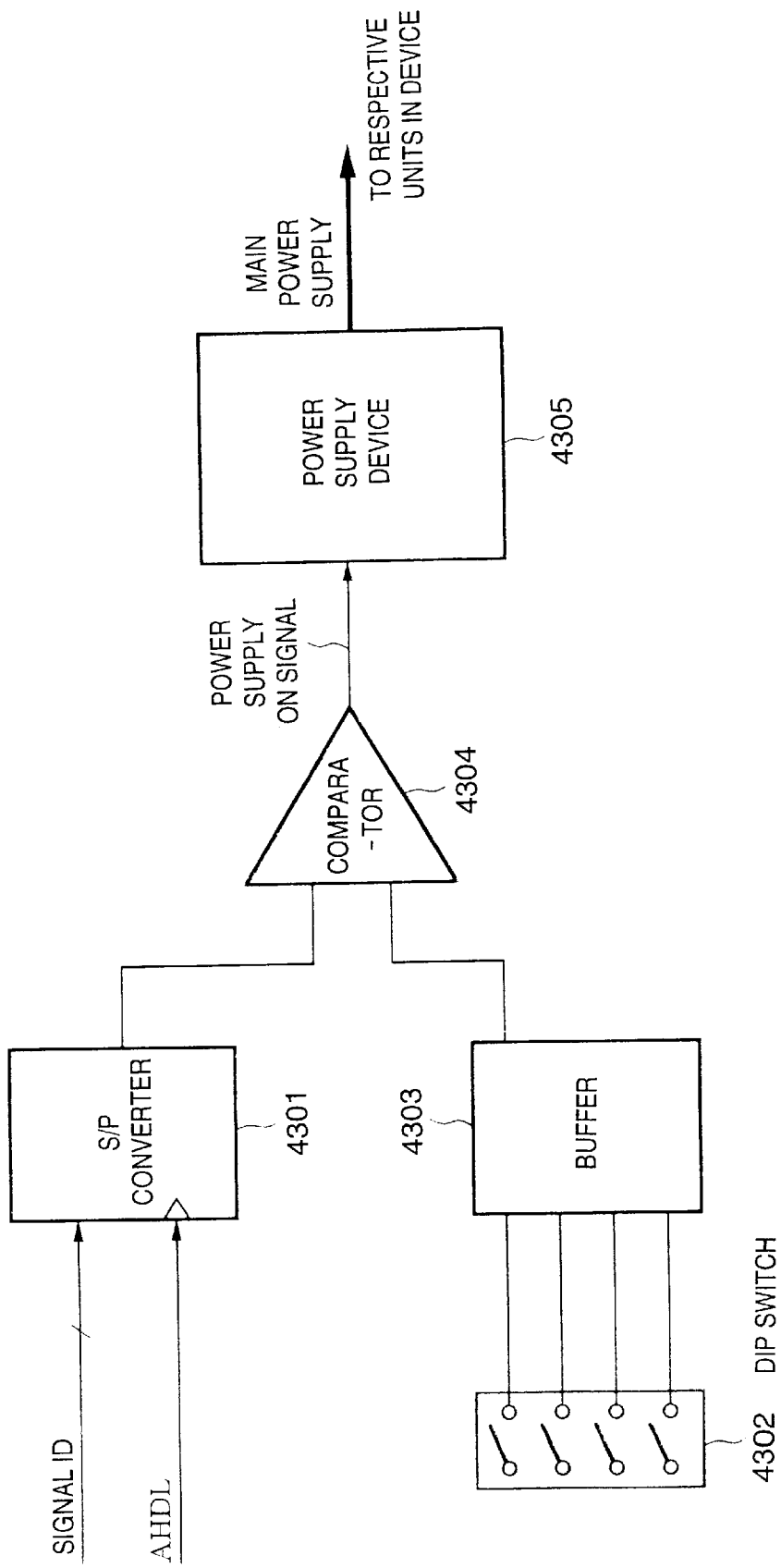
FIG. 28 is a block diagram showing the arrangement pertaining to power supply control of a branch device according to the fifth embodiment of the present invention.

FIG. 28 is a block diagram showing the arrangement that pertains to power supply control of a branch device according to the fifth embodiment of the present invention.

A serial-to-parallel (S/P) converter 4301 receives signals ID and AHDL, which are sent from a host computer serving as an image source via a communication I/F cable 4210. The signal ID discriminates and selects a display device that should display image data following this signal ID. The signal AHDL informs of the beginning of transfer of image data. The S/P converter 4301 converts the signal ID into a serial signal in synchronism with the signal AHDL.

Figure 33:
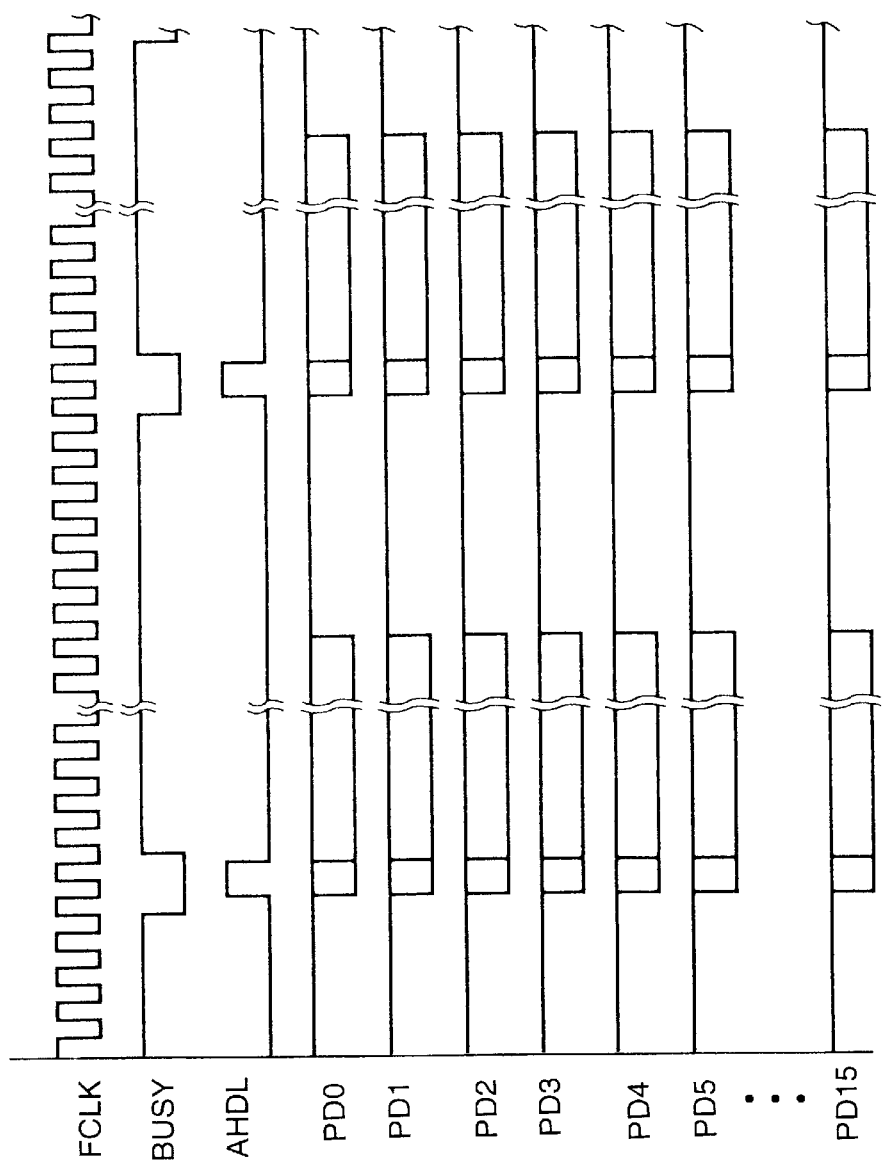
FIG. 33 is a timing chart showing the transfer timing of image data sent from a host apparatus to a display via a branch connector.

As will be described in detail later, as shown in FIGS. 33 and 34, the signal ID and address data are sent from the host onto a data bus in synchronism with the leading edge of the signal AHDL. Hence, by latching data on the data bus in response to the trailing edge of the signal AHDL, the signal ID and address data can be read out. The S/P converter 4301 used in the fifth embodiment extracts the signal ID alone, and outputs it to one input of a comparator 4304.

On the other hand, the setup value of a dip switch 4302 used for setting the ID of each device is supplied to the other input of the comparator 4304 via a buffer 4303. Hence, the signal ID in image data sent from the host computer and the ID value set by the dip switch 4302 are input to the comparator 4304, and their comparison result is supplied to a power supply device 4305. The comparator 4304 outputs a power supply ON signal when the two ID values match.

The generated power supply ON signal is sent to the power supply device 4305, which starts power supply upon reception of the power supply ON signal. The power supply device 4305 starts power supply to individual units and devices (the individual units of the branch device main body and the display device connected to that branch device) other than a power supply controller.

Figure 29:
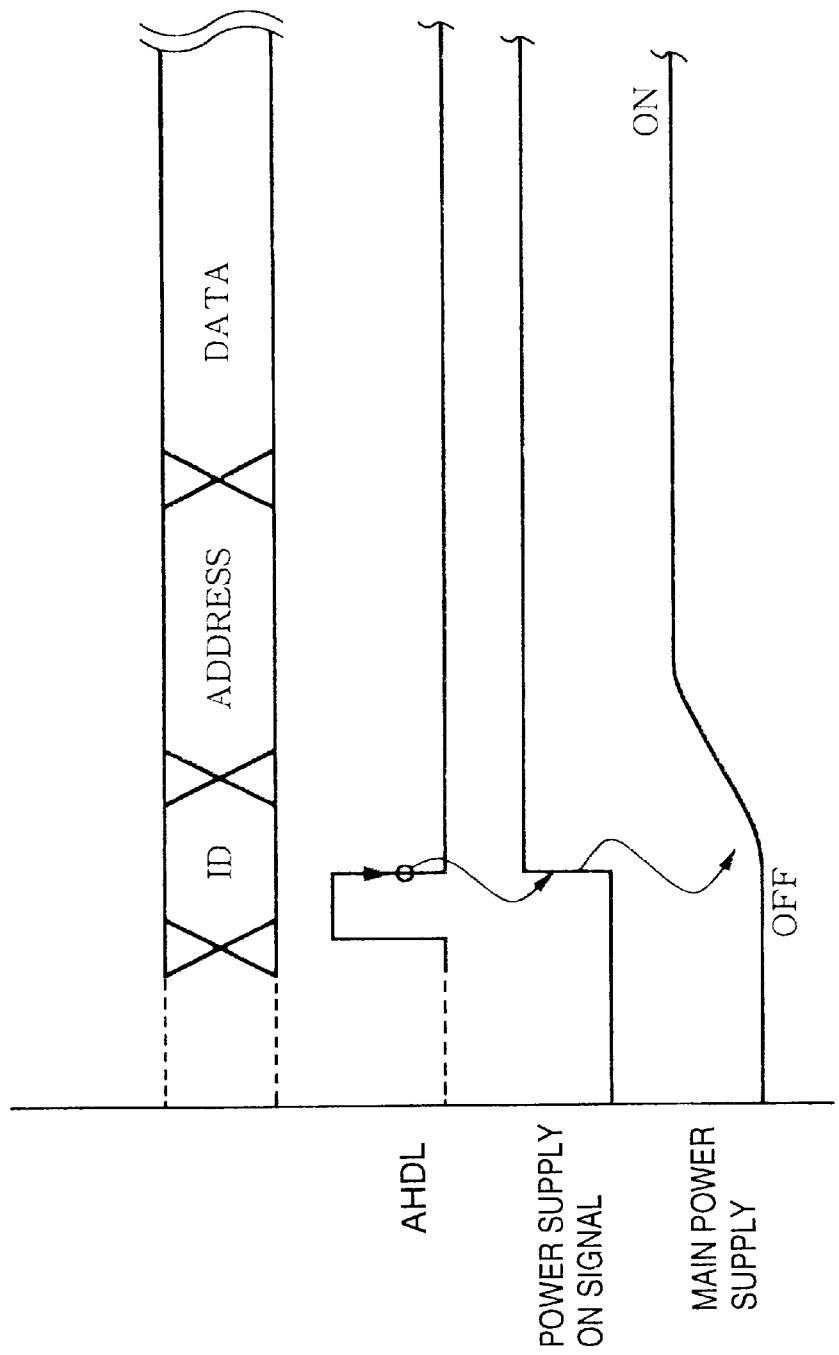
FIG. 29 is a timing chart for explaining the timing of power supply control according to the fifth embodiment of the present invention.

FIG. 29 is a timing chart for explaining the timing of power supply control according to the fifth embodiment.

As described above, or as shown in FIG. 29, the signal ID is latched by latching signals on the data bus in response to the trailing edge of the signal AHDL, and is converted by the S/P converter 4301 into a serial signal. The comparator 4304 compares the ID value set by the dip switch 4302 and that obtained via the S/P converter 4301, and turns on the power supply signal when the two values match.

Note that a power supply device which can ON/OFF-control its output in response to an externally input control signal is known to those who are skilled in the art, and a detailed description thereof will be omitted.

As will be described in detail later, when a reflection ferroelectric liquid crystal display without any backlight is used as a display device, the power supply device may control a main power supply.

The overall arrangement of the display system of the fifth embodiment, which connects a plurality of display devices to display, will be described below.

Figure 30:
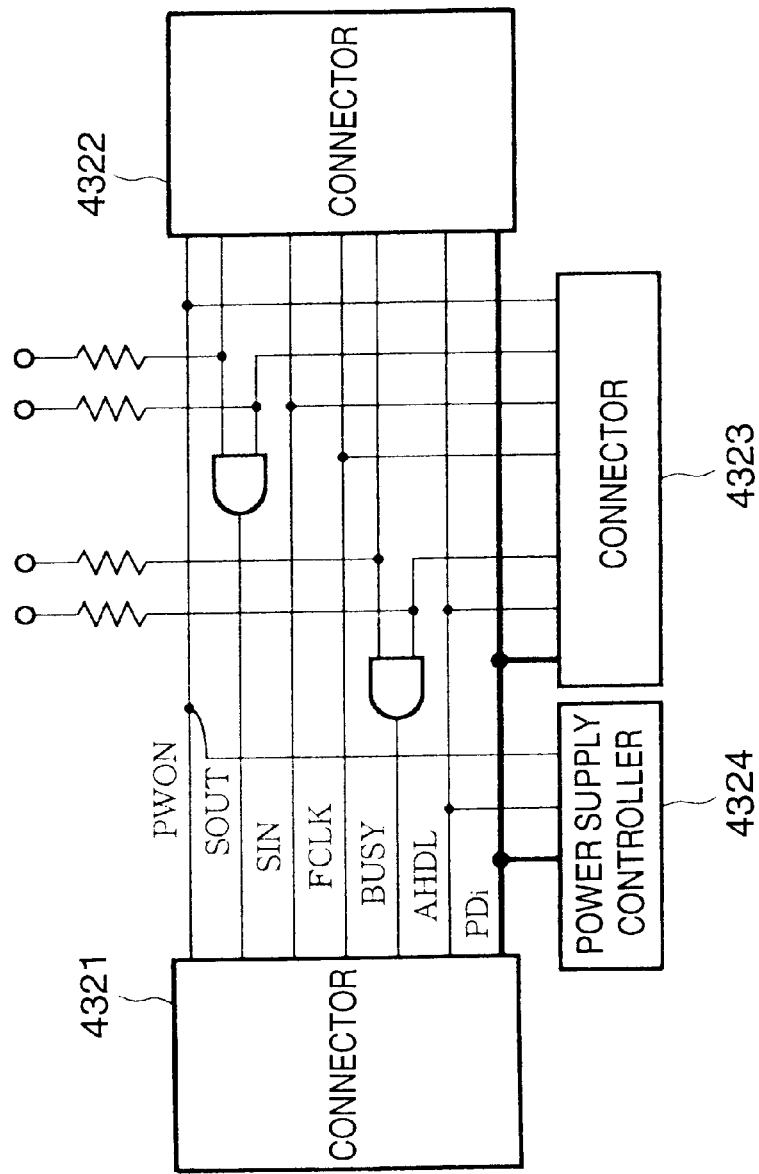
FIG. 30 is a circuit diagram showing the internal arrangement of a branch connector according to the fifth embodiment of the present invention.

FIG. 30 is a circuit diagram showing the internal arrangement of the branch connector according to the fifth embodiment.

Referring to FIG. 30, reference numeral 4324 denotes a power supply controller described above with reference to FIG. 28. Reference numeral 4321 denotes a connector which receives a cable 4210 connected to the host or the branch connector of the previous stage; 4322, a connector which receives a cable 4210 connected to the branch connector of the next stage; and 4323, a connector which receives a cable 4205 connected to the display 4100.

A signal SOUT output from the connector 4321 to the branch connector of the previous stage or host is the AND of a signal SOUT supplied from the branch connector of the next stage via the connector 4322, and that supplied from the display via the connector 4323. When the power supply of the branch connector of the next stage or display is turned off or the branch connector of the next stage or display is disconnected, and no signal SOUT is input, such signal SOUT is pulled up to H inside the branch connector.

Similarly, a signal BUSY output from the connector 4321 to the branch connector of the previous stage or host is the AND of a signal BUSY supplied from the branch connector of the next stage via the connector 4322, and that supplied from the display via the connector 4323. When the power supply of the branch connector of the next stage or display is turned off or the branch connector of the next stage or display is disconnected, and no signal BUSY is input, such signal BUSY is pulled up to H inside the branch connector.

Figure 31:
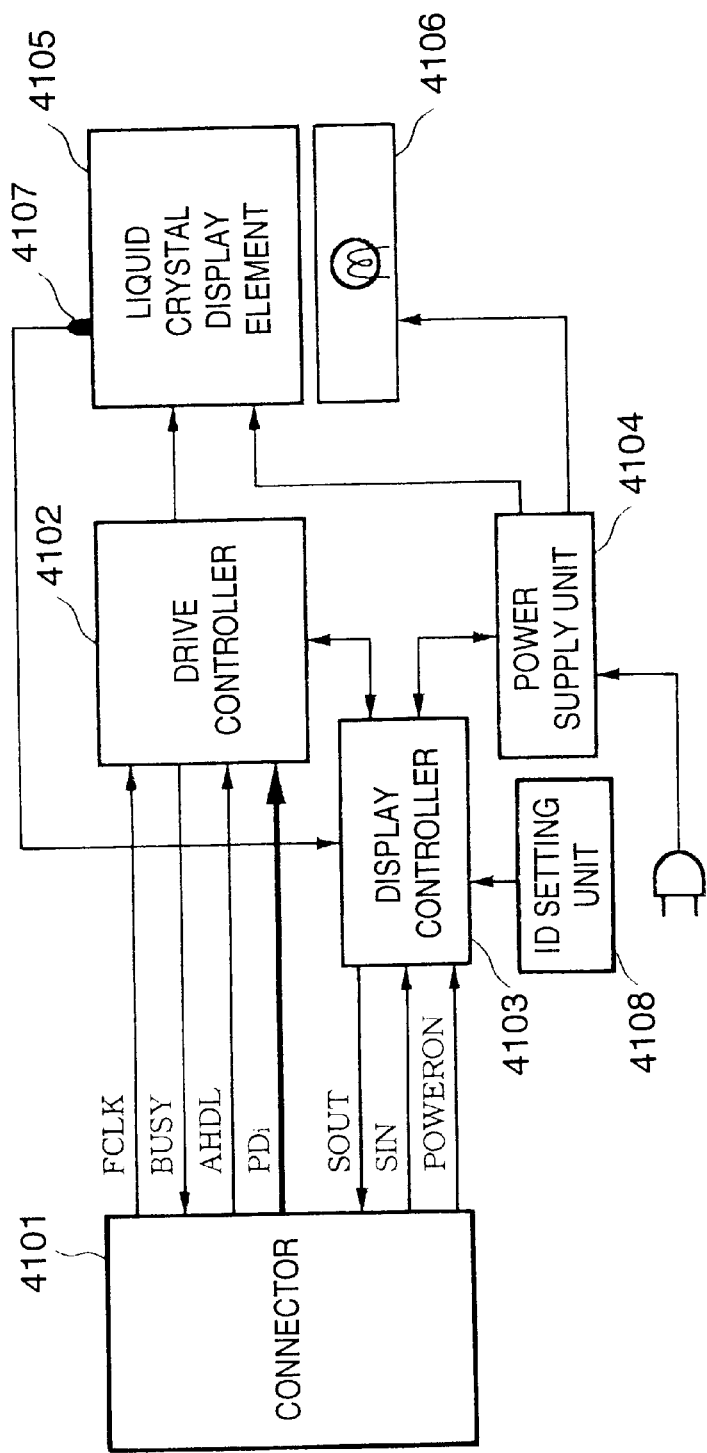
FIG. 31 is a block diagram showing the internal arrangement of a display according to the fifth embodiment of the present invention.

FIG. 31 is a block diagram showing the internal arrangement of the display according to the fifth embodiment.

Reference numeral 4101 denotes a connector which receives the cable 4210; 4105, a liquid crystal display element using a ferroelectric liquid crystal; 4102, a drive controller for receiving display data and controlling the liquid crystal display element 4105; 4106, a backlight including a lighting circuit and a lamp; 4104, a power supply unit for supplying a power supply voltage to the liquid crystal display element 4105 and backlight 4106; 4107, a temperature sensor for detecting the temperature near the liquid crystal display element 4105; and 4103, a display controller for controlling the entire display by controlling the drive controller 4102 and power supply unit 4104 and making serial communications with the host computer 4201.

Reference numeral 4108 denotes an ID setting unit for setting a unit ID used for distinguishing the displays 4100, 4120, and 4130 from each other. Note that the above-mentioned branch connector is set with the same ID value as that set by the ID setting unit 4108. In this embodiment, assume that the ID setting units 4108 of the displays 4100, 4120, and 4130 are respectively assigned ID=1 h, 2 h, and 3 h.

The liquid crystal display element 4105 is a display panel using a ferroelectric liquid crystal, and displays 1,280×1,024 pixels each defined by R, G, B, and W cells. The liquid crystal material used is a mixture containing biphenyl- and phenylpyrimidine-based materials as major components. The phase transition temperature of that liquid crystal material is:

Cryst→(−10° C.)→Sm→(63° C.)→SmA→(72° C.)→Ch→(91° C.)→Iso

The optimal drive conditions of the display element 4105 using a ferroelectric liquid crystal change depending on temperature.

Figure 32:
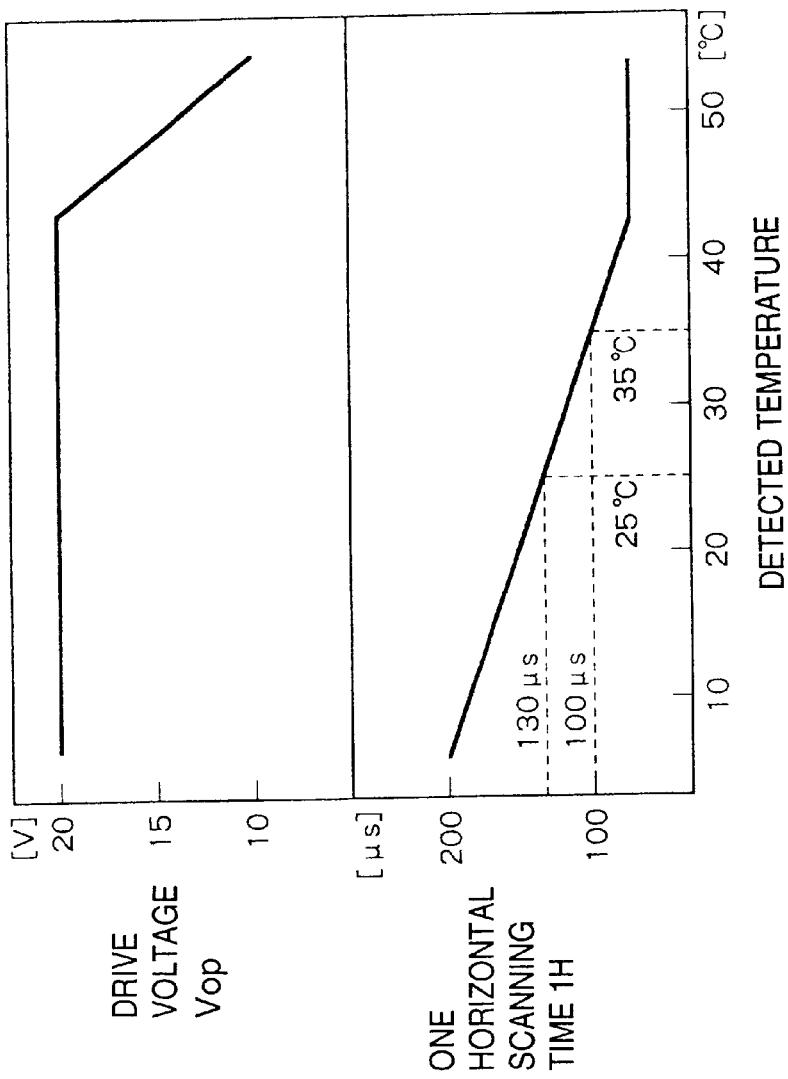
FIG. 32 is a graph for explaining the relationship between the drive condition for a ferroelectric liquid crystal display element and temperature.

FIG. 32 is a graph for explaining the relationship between the drive conditions of the ferroelectric liquid crystal display element and temperature.

The drive conditions in this embodiment include a drive voltage (Vop) as a voltage of a drive waveform applied to the liquid crystal, and one horizontal scanning time (1H) as a time required for driving one drive line. As shown in FIG. 32, the optimal drive conditions change so that the product of Vop and 1H decreases with increasing temperature. The display controller 4103 selects optimal drive conditions in accordance with the temperature near the liquid crystal display element 4105, and sets one horizontal scanning time (1H) in the drive controller 4102 and Vop in the power supply unit 4104. The drive controller 4102 adjusts the time 1H, requests display data at a timing corresponding to the adjusted time 1H, and supplies data to a driver circuit (not shown) of the liquid crystal display element 4105. The power supply unit 4104 generates a liquid crystal drive voltage corresponding to Vop, and supplies it to the driver circuit of the liquid crystal display element 4105.

FIG. 33 shows the transfer timings of image data from the host apparatus to the display via the branch connector.

For the sake of simplicity, a description of FIG. 33 will be given paying attention to only the host computer 4201 and display 4100.

A signal PDi (i=0 to 15) indicates image data, and image data for one scanning line are transferred in synchronism with transfer clocks FCLK together with scanning line addresses. A signal AHDL indicates whether the contents of the signal PDi (i=1 to 15) are image data or a scanning line address. A signal BUSY indicates whether or not the display is ready to receive image data. An L signal BUSY output from the drive controller 4102 of the display 4100 serves as a data transfer request. More specifically, when the display 4100 sets the signal BUSY at L to output an image data transfer request, the host computer 4201 sets the signal AHDL at H for one block FCLK, outputs a scanning line address synchronously, and then transfers image data for one scanning line.

FIG. 34 shows the format of image data to be transferred.

As described above, a 12-bit scanning line address is output first, and 1,280×4 bits image data (DO to D5119) follow. The upper 4 bits of the scanning line address include a unit ID (UnitID, U3 to U0). The unit ID indicates a display which receives and displays the image data for one scanning line.

The operations from when the power supply of the display 4100 is turned on until its driving starts will be explained below with reference to the flow charts in FIG. 35 and FIGS. 41 to 43, which show the control sequence of the display controller 4103.

Figure 35:
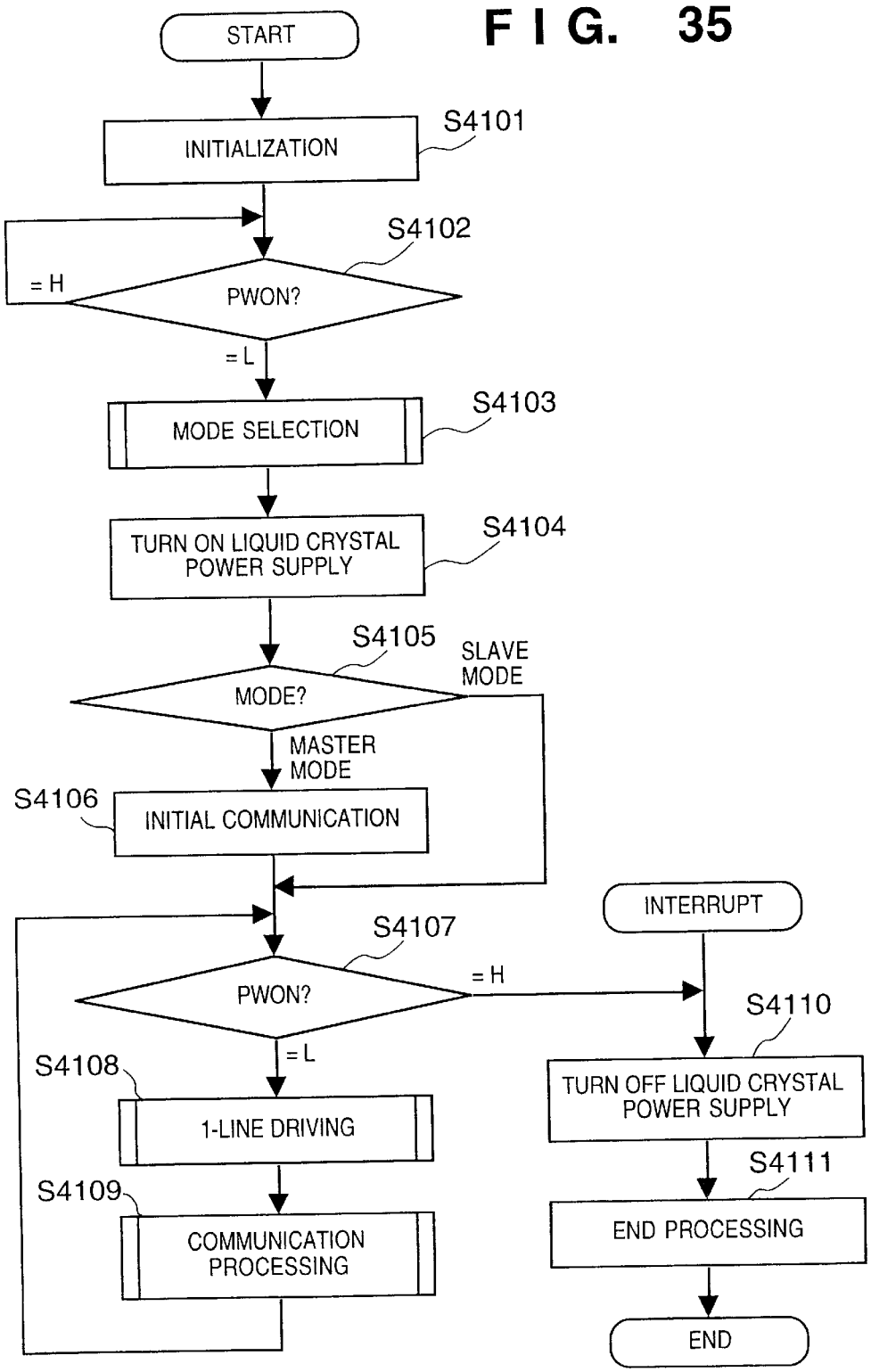
FIG. 35 is a flow chart showing the overall operation of a display controller.

FIG. 35 is a flow chart showing the overall operation of the display controller 4103.

When the power supply of the display 4100 is turned on, the display controller 4103 initializes itself, the drive controller 4102, power supply unit 4104, and the like as needed (step S4101), and waits until a signal PWON goes L (step S4102). The signal PWON informs the display controller 4103 that the power supply of the host computer 4201 is turned on, has completed preparation for transferring image data, and is ready to start display on the connected displays. Upon detecting PWON=L, the display controller 4103 determines the operation mode (master or slave mode) in accordance with the operation mode selection sequence (to be described later) (step S4103), and turns on the liquid crystal power supply including the backlight 4106 (step S4104).

If the master mode is selected, the display controller 4103 exchanges information pertaining to the type of host and the display with the host computer 4201 via serial communications (steps S4105 and S4106). The serial of communications are called initial communications.

Figure 36:
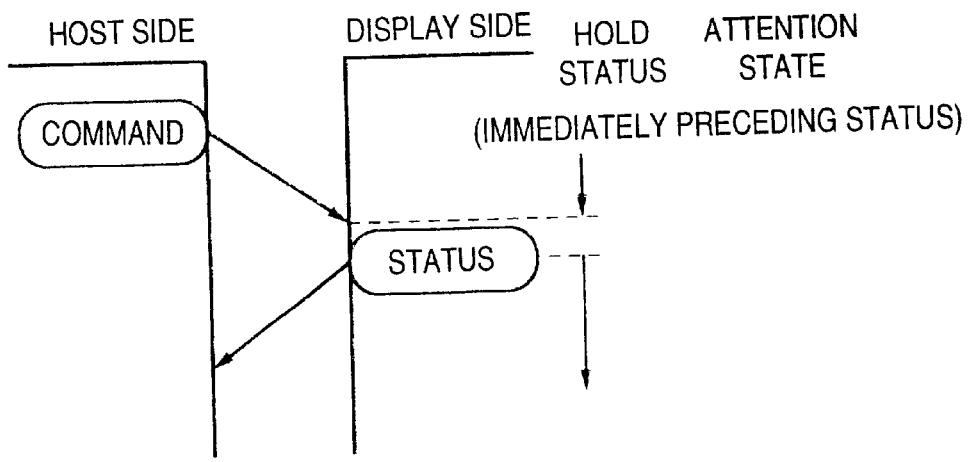
FIG. 36 is a chart for explaining the first communication protocol in the fifth embodiment.
Figure 37:
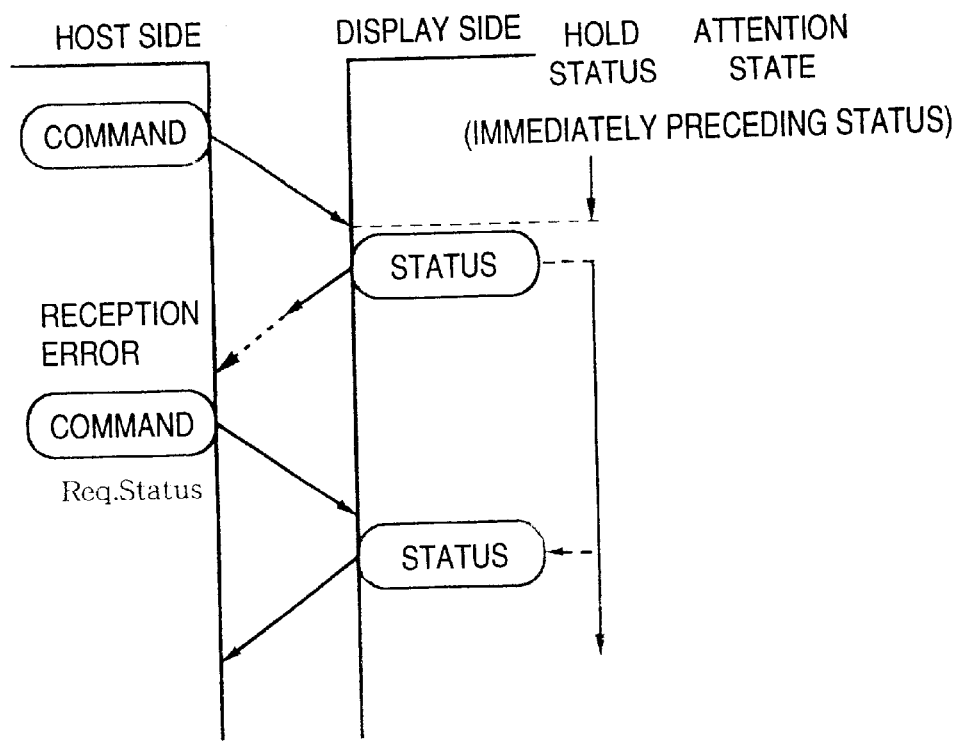
FIG. 37 is a chart for explaining the first communication protocol in the fifth embodiment.
Figure 38:
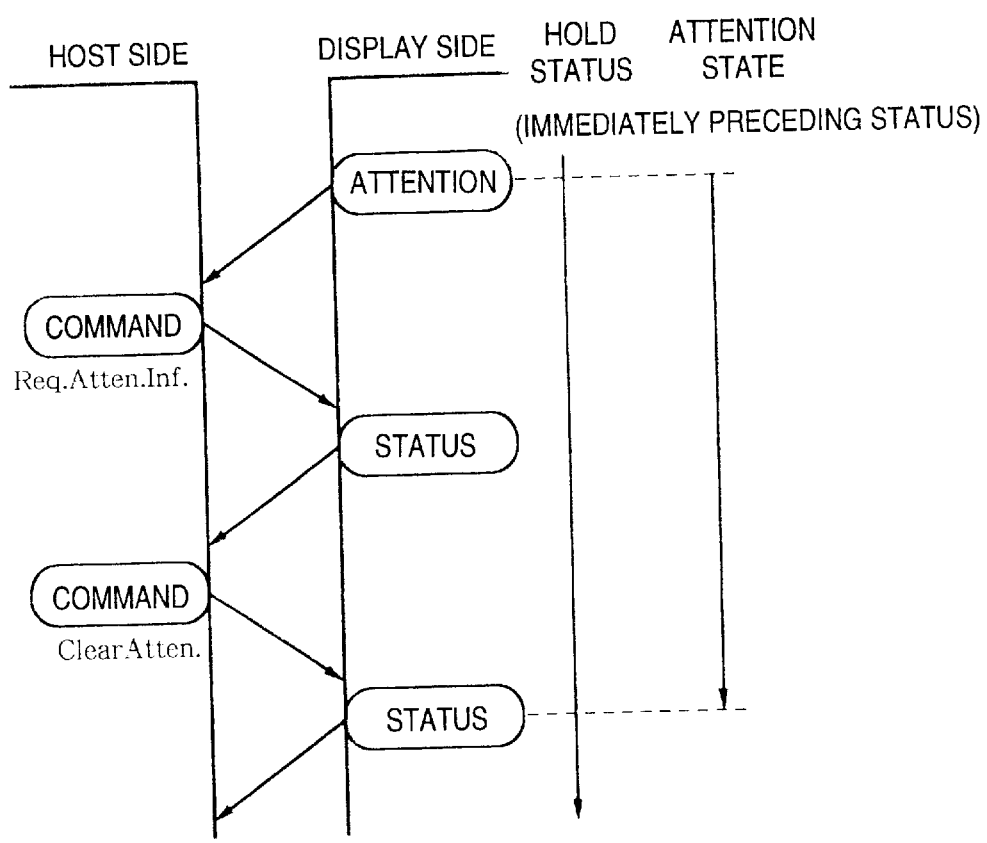
FIG. 38 is a chart for explaining the second communication protocol in the fifth embodiment.
Figure 39:
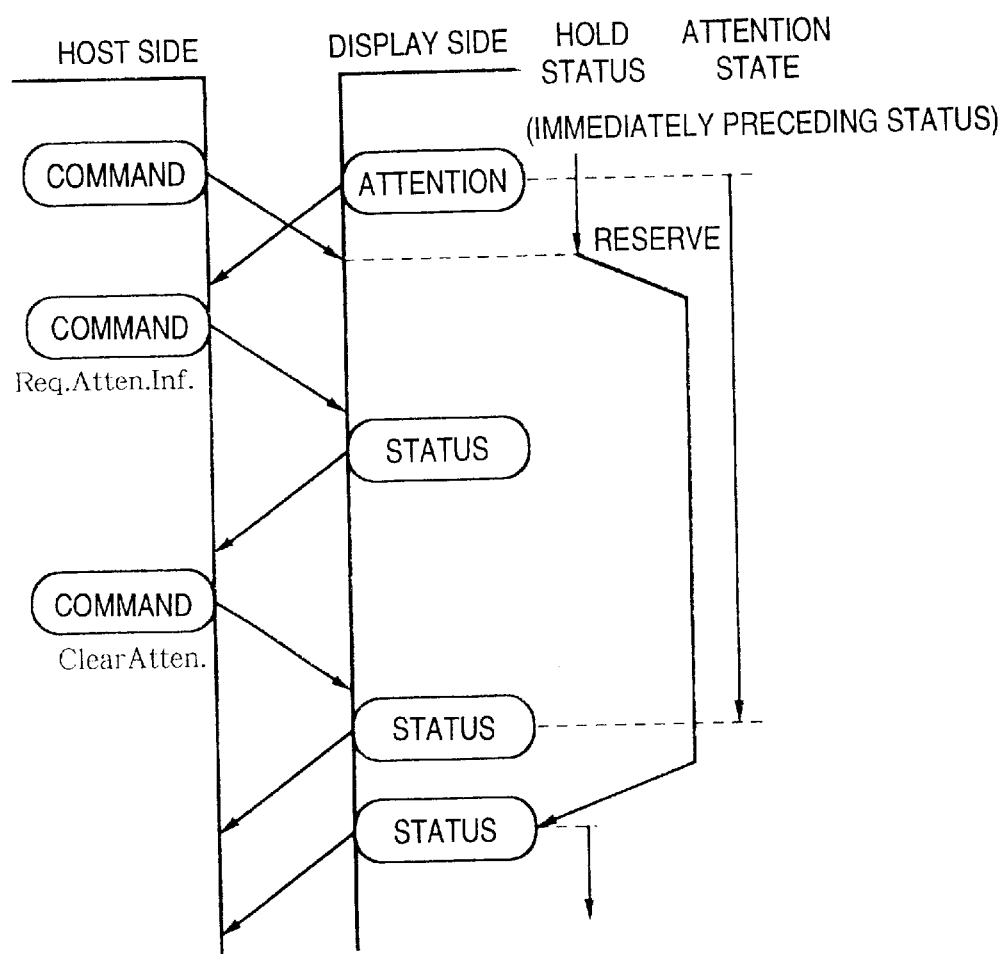
FIG. 39 is a chart for explaining the second communication protocol in the fifth embodiment.
Figure 40:
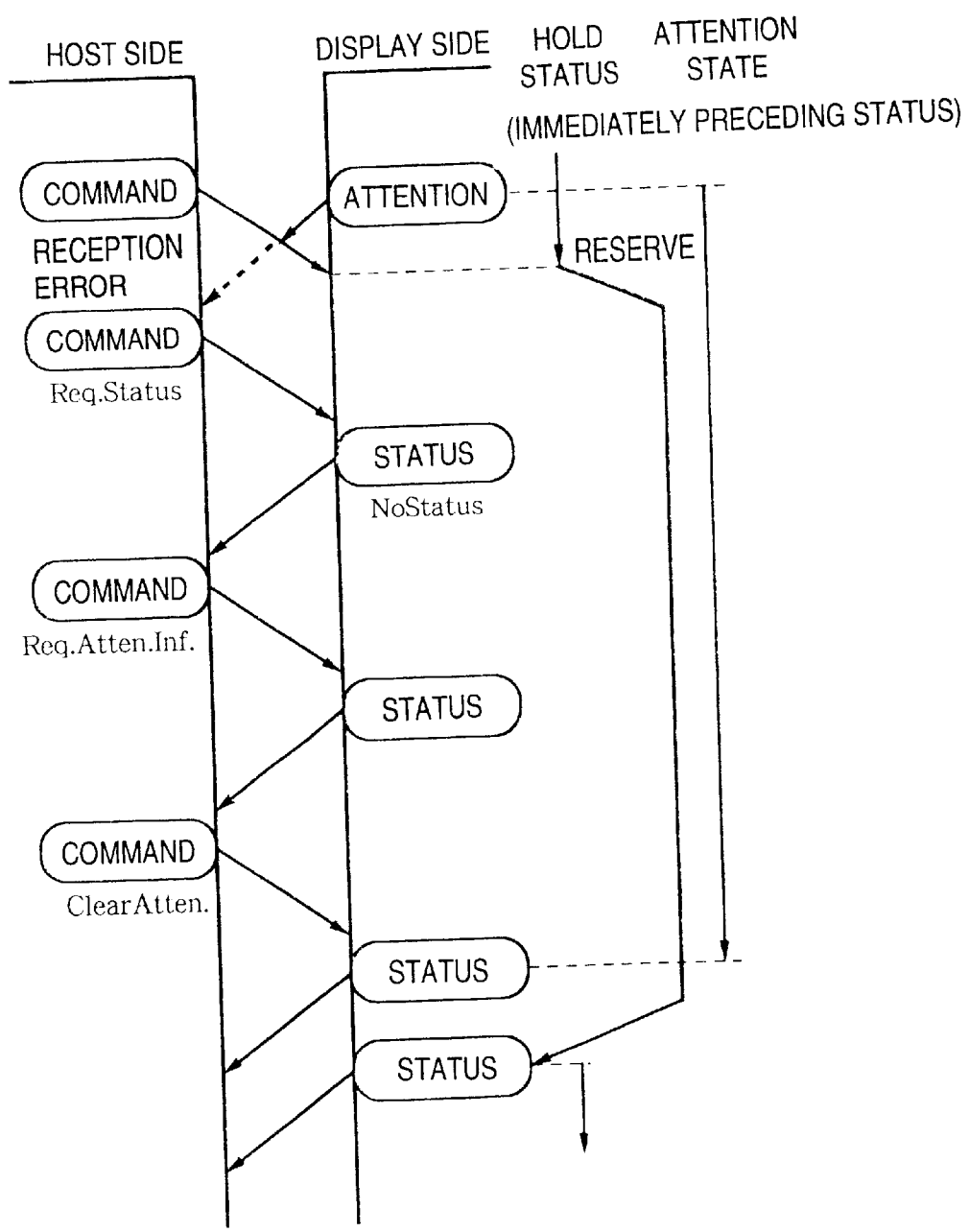
FIG. 40 is a chart for explaining the second communication protocol in the fifth embodiment.

There are two different protocols for the initial communications. FIGS. 36 and 37 are charts for explaining the first protocol in the fifth embodiment. FIGS. 38, 39, and 40 are charts for explaining the second protocol.

In the first protocol, a command is sent from the host computer (to be also simply referred to as a host hereinafter) to the display, and the display sends back its status (FIG. 36). The command is always issued by the host, which does not issue the next command until it receives the corresponding status. The display holds the issued latest status until it receives the next effective command. With this protocol, when the host cannot receive the status due to a communication error, the status can be resent in response to a command (Request Status) that inquires the immediately preceding status and is sent from the host (FIG. 37).

In the second protocol, the display issues an Attention to request communications. In response to the Attention, the host requests the contents (Attention Information) of the Attention. The display responds to this command (status), and the host issues a command (Clear Attention) to clear the Attention. After that, the display issues OK status, thus ending communications (FIG. 38).

Upon reception of the Attention, the host does not issue commands other than a request command for the Attention contents (Request Attention Information), an Attention clear command (Clear Attention), and a request command of the held status (Request Status), until it clears the Attention by the Clear Attention command (this period is called an Attention state). These three commands are called specific commands. The display does not hold status for these specific commands, and keeps holding the immediately preceding status. When the display receives a command other than the specific commands during the interval from when it issues the Attention until it receives the Clear Attention command from the host (during the Attention state), it reserves transmission of status, and issues the reserved status after the Attention is cleared (FIG. 39).

The display may also receive a command other than the specific commands during the Attention state when the host and display roughly simultaneously issue a command and Attention (FIG. 39).

If the host cannot normally receive this Attention due to a communication error, since the host originally expects status for the issued command, it issues a status resend request (Request Status) (FIG. 40). On the other hand, since the display has reserved the command received as the Attention was sent, but it has not held any immediately preceding status, it issues error status (No Status). In response to this status, the host can determine that information which failed normal reception is the Attention, and issues a request command (Request Attention Information)

for the contents of the Attention (FIG. 40). When the host suddenly receives status even though it has not issued any command, it issues "Request Status" and "Request Attention Information" according to this flow.

In mode selection in step S4103 in FIG. 35 described above, the presence of another display that is already communicating with the host is confirmed by utilizing the operation of the host upon reception of the unexpected status, and one of the master and slave modes is selected. More specifically, one and only display of those connected to the host can make serial communications with the host, and other displays do not make serial communications. The host exchanges information with the display that performs serial communications and transfers suited image data, and all the displays receive this image data. The operation mode of the display which makes serial communications with the host is called the master mode, and that of the display which does not make serial communications is called the slave mode.

Figure 41:
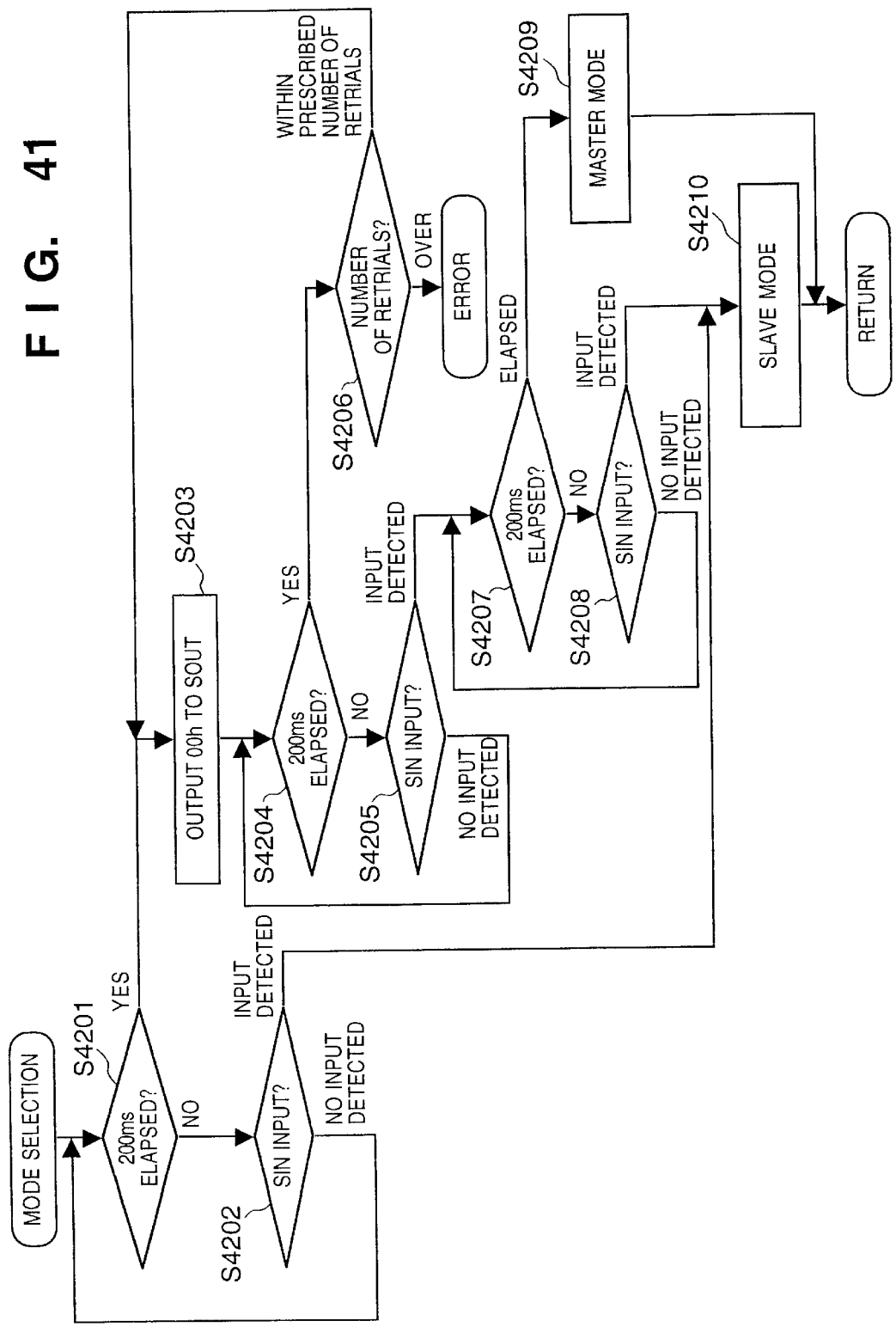
FIG. 41 is a flow chart showing mode selection.

FIG. 41 is a flow chart showing mode selection.

Initially, the presence of a command which is issued by the host to another display is confirmed. If some command is received, since another display is already communicating with the host, the slave mode that does not make serial communications is determined (steps S4201, S4202, and S4210). In this example, a signal SIN is monitored for 200 ms, and the slave mode is selected if the signal SIN is detected.

If no command (SIN input) is received, status 0h (OK) is issued, and it is checked again if a command is received (steps S4203, S4204, and S4205). The host issues a "Request Status" command for an unexpected status.

If another display is already communicating with the host, the other display in communications sends back "No Status" with respect to that "Request Status" command, and the host then issues a "Request Attention Information" command. Hence, if "Request Status" is detected as the SIN input with respect to the status issued in step S4203, and "Request Attention Information" is detected subsequently as the SIN input, since another display is already communicating with the host, the display of interest is set in the slave mode (steps S4207, S4208, and S4210). More specifically, if "Request Status" is detected within 200 ms after 0h was output onto SOUT in step S4205, and "Request Attention Information" is detected within 200 ms after that detection in step S4208, the flow advances to step S4210 to set the slave mode.

On the other hand, if no command is received after the "Request Status" command, there is no display that is communicating with the host, and the master mode in which this display makes communications is determined (step S4209).

If no signal SIN is detected within 200 ms after 0h is output onto SOUT, the 0h output onto SOUT is repeated by a prescribed number of times in step S4206. If no SIN is detected after the prescribed number of retries, since connections and the like may have some abnormalities, an error message is output.

The description will return to FIG. 35.

After the operation mode is selected by mode selection, if the selected mode is the master mode, initial communications with the host are made (steps S4105 and S4106). Then, image data reception in units of lines and driving of the liquid crystal display element (1-line driving) are repeated as long as the signal PWON is L (steps S4107 and S4108). Furthermore, in the master mode, serial communications are repeated (step S4109).

When the signal PWON goes H, this indicates that the host has issued a display stop instruction or the power supply of the host is turned off. In such case, end processing is done. For example, driving is immediately stopped, the backlight is turned off, the liquid crystal power supply is turned off, and so on (steps S4110 and S4111). When the power supply of the display is turned off, a series of end processing operations start in response to an interrupt signal output from the power supply unit 4104, and end during the output holding time of the power supply unit 4104. Although not shown, if the power supply of the display is kept ON a predetermined period of time after the end processing, the operation of the display controller 4103 returns to the beginning of FIG. 35 to wait until the signal PWON goes L after the initialization.

Figure 42:
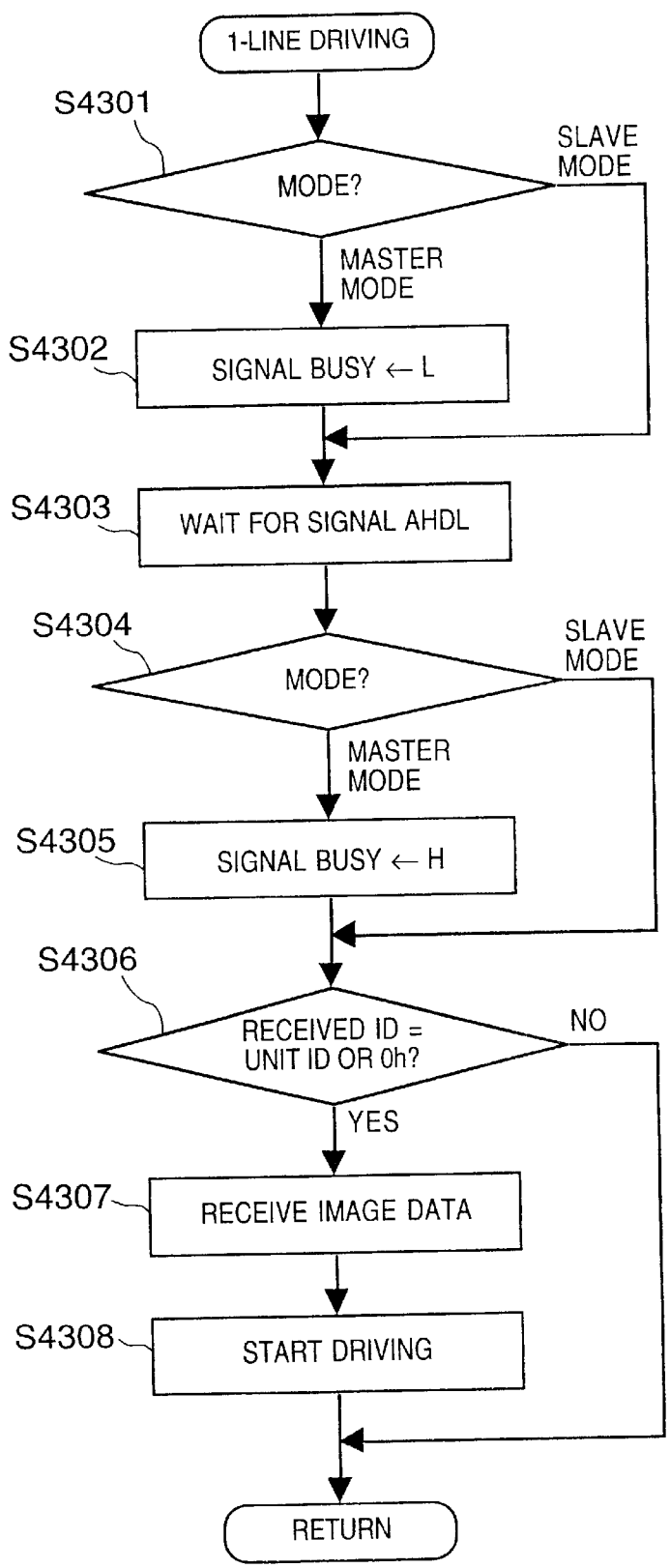
FIG. 42 is a flow chart showing 1-line driving according to the fifth embodiment.

FIG. 42 is a flow chart showing 1-line driving in the fifth embodiment.

In 1-line driving, image data for one horizontal scanning line of the liquid crystal display element are received from the host, and are transferred to the display element to drive the element. When the operation mode is the master mode, a signal BUSY is set at L to request of the host image data for one horizontal scanning line (steps S4301 and S4302). As described above with the aid of FIG. 33, the start of transfer of image data can be detected by an H signal AHDL. Upon receiving the scanning line address and unit ID together with the H signal AHDL, the signal BUSY is set at H (steps S4303 to S4305). If the received unit ID matches that set in the ID setting unit 4108, or if the received unit ID is 0h that designates all the displays, image data are received (steps S4306 and S4307). The image data are transferred to a driver circuit (not shown) of the liquid crystal display element 4105 while synchronizing the timing with the display element 4105, thus instructing to start driving for one scanning line (step S4308).

If the received unit ID neither matches that set in the ID setting unit 4108 nor is 0h, neither transfer of image data to the liquid crystal display element 4105 nor the driving start instruction for one scanning line are made. Note that the signal BUSY remains the same in the slave mode, and this will be described later.

Figure 43:
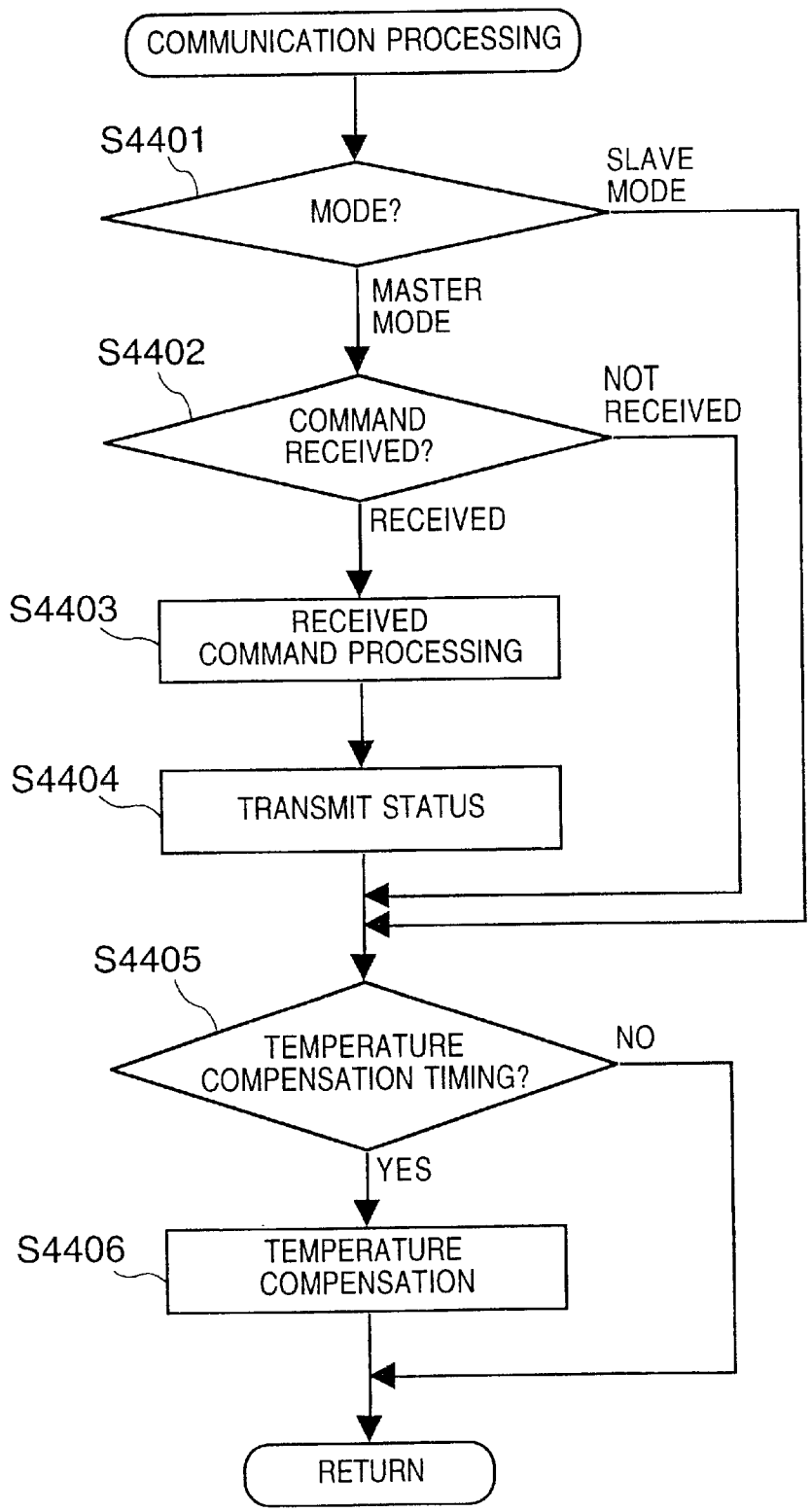
FIG. 43 is a flow chart showing communication processing.

FIG. 43 is a flow chart showing the communication processing.

In the communication processing, if the operation mode is the master mode and a command has been received (steps S4401 and S4402), processing according to the received command is done and status is transmitted (steps S4403 and S4404).

Independently of the operation mode, the temperature near the liquid crystal display element 4105 is detected by the temperature sensor 4107 at given time intervals to select optimal drive conditions according to FIG. 32, and to set 1H in the drive controller 4102 and Vop in the power supply unit 4104 (steps S4405 and S4406). This operation is called temperature compensation.

The two operation modes, i.e., the master and slave modes, will be explained below. The power supply of the display 4100 is turned on, and then, the power supply of the host is turned on. At this time, assume that the power supplies of the displays 4120 and 4130 are kept OFF.

Figure 44:
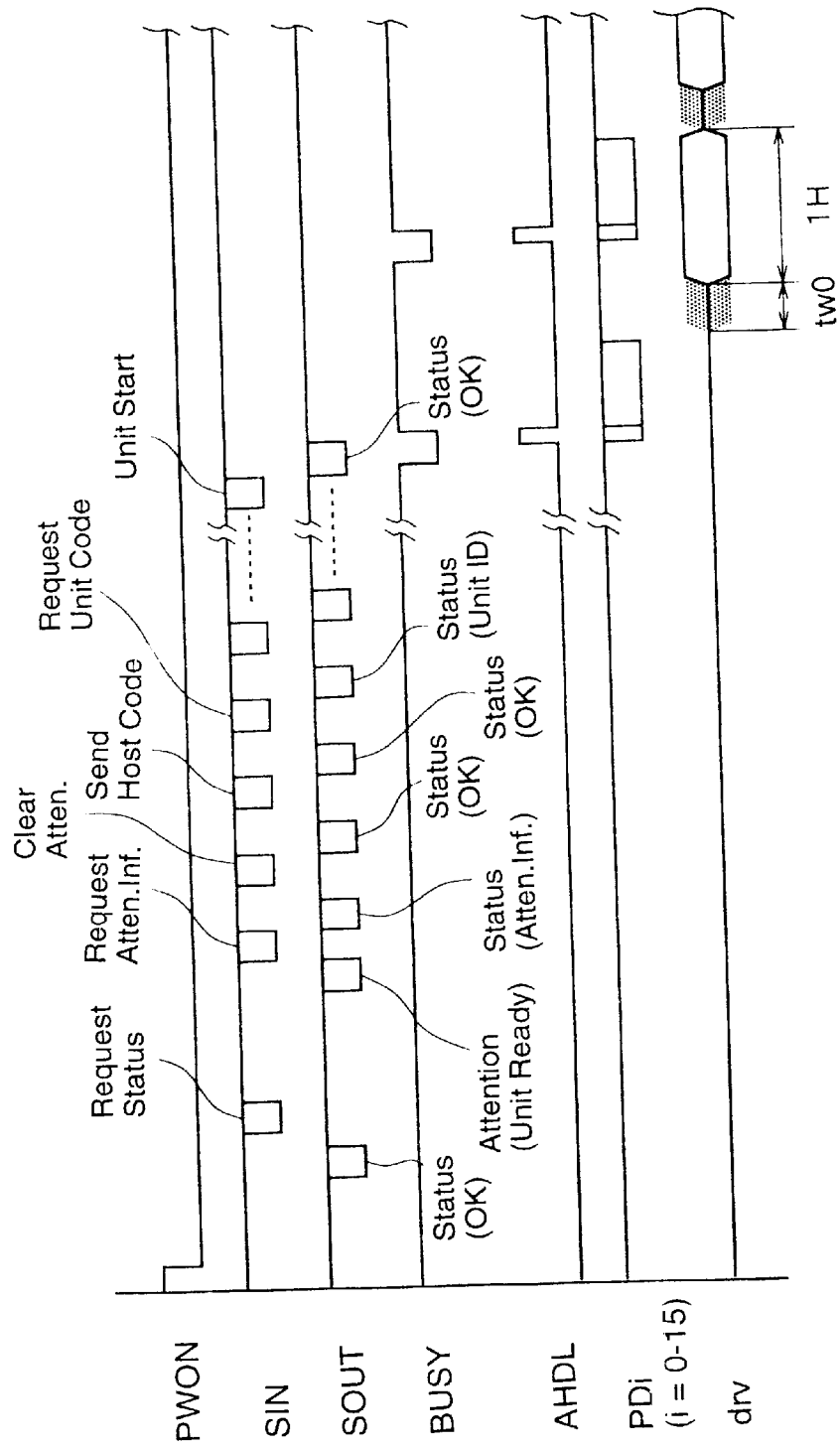
FIG. 44 is a timing chart showing the operations from when a display 4100, which is turned on prior to other displays 4120 and 4130, is turned on, until driving starts.

FIG. 44 is a timing chart showing the operations from when the power supply of the display 4100, which is turned on prior to other displays 4120 and 4130, is turned on until driving starts.

As has been described above with reference to the flow chart in FIG. 35, when the display 4100 detects an L signal PWON, it checks using a signal SIN if communications from the host computer 4201 to another display are in progress, and then outputs status 0h onto a signal SOUT. In response to this status, as a command "Request Status" is received from the host, but no subsequent command is received, it is determined that there is no display that is already communicating with the host. Hence, the display 4100 determines the master mode as its operation mode, and starts initial communications with the host computer 4201.

Hence, the display sends an Attention (Unit Ready Attention) to the host to inform that the display has completed preparation, and the host inquires the display of the contents of this Attention (Request Attention Information) and then clears the Attention (Clear Attention). Subsequently, the host informs the display of the host type (Send Host Code). The display sends back OK status if the host is a connectable one, or sends back error status if the host is a non-connectable one. The host then requests the display type (Request Unit Code). After the host inquires the display of other necessary information, and sends necessary information to the display, the host issues a data request start instruction (Unit Start). The display sends back status, and sets BUSY at L to issue an image data transfer request. Upon receiving image data for one scanning line with the scanning line address, the display compares the received unit ID with that set in the ID setting unit 4108, and starts driving of the corresponding scanning line.

Note that drv in FIG. 44 represents driving of the scanning line designated by the scanning line address. Also, tw0 in FIG. 44 represents the driving wait period. When the operation mode is the master mode, the wait time is inserted every time driving starts. Setups of the wait time tw0 will be described in detail later.

Figure 45:
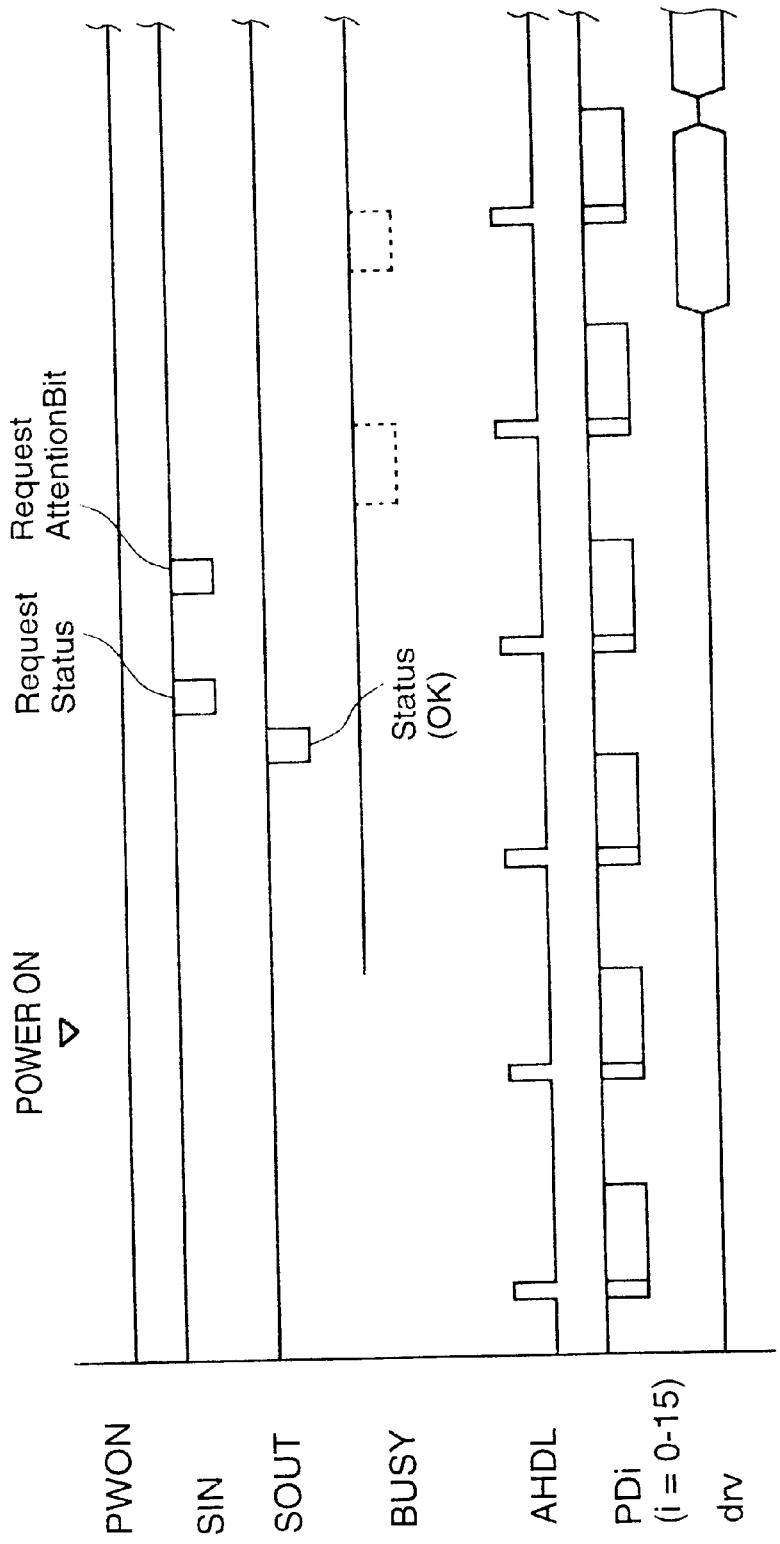

FIG. 45 is a chart for explaining the operation from when the power supply of the display 4120 is turned on after the display 4100 communicates with the host computer 4201 and starts driving, until driving starts.

When the power supply of the display 4120 is turned on and its initialization is complete, the signal PWON is already set at L, and image data transfer is in progress. The display 4120 monitors the signal SIN, and determines the slave mode as its operation mode when it receives a command transmitted from the host to another display. When no command is received, the display 4120 outputs status 0h onto the signal SOUT. In this case, the commands "Request Status" and "Request Attention Information" are received as responses to the status on the signal SOUT, and it is determined that the host is communicating with another display. In this way, the display 4120 determines the slave mode as its operation mode.

The display set in the slave mode does not make serial communications with the host. The display 4120 waits for image data transfer without setting the signal BUSY at L. When the signal AHDL goes H, the display 4120 receives image data for one scanning line with the scanning line address, and compares the unit ID with that set in the ID setting unit 4108, thus starting driving the corresponding scanning line. When the transfer timing of image data is delayed, and driving for the immediately preceding scanning line is complete, the display waits for image data transfer while suspending driving, and then starts driving. Note that drv in FIG. 45 represents driving of the scanning line designated by the scanning line address.

Furthermore, when the power supply of the display 4130 is turned on after the display 4120, the display 4130 performs the same operation as in the display 4120, and displays in the slave mode.

Figure 46:
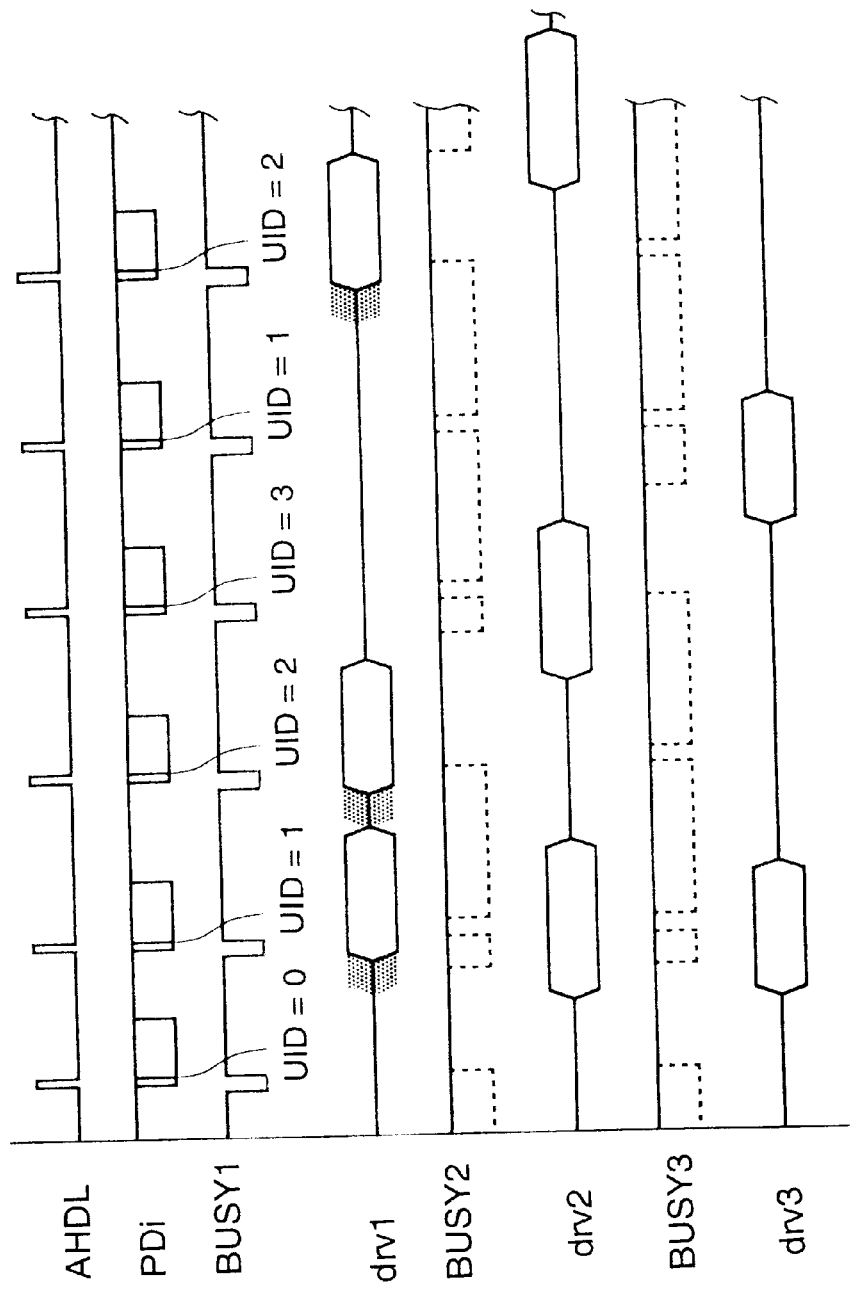
FIG. 46 is a timing chart showing the data transfer and driving timings of a display which operates in a master mode, and a display which operates in a slave mode.

The data transfer and driving timings of the display 4100 which operates in the master mode, and the displays 4120 and 4130 which operate in the slave mode will be explained below with reference to FIG. 46. Referring to FIG. 46, BUSY1 and drv1 respectively represent the signal BUSY output from the display 4100, and the driving timing of its scanning line. BUSY2 and drv2 respectively represent the signal BUSY output from the display 4120, and the driving timing of its scanning line. The dotted line of BUSY2 indicates the timing at which the display 4120 that operates in the slave mode does not output L as the signal BUSY in 1-line driving, and waits for the signal AHDL. BUSY3 and drv3 respectively represent the signal BUSY output from the display 4130, and the driving timing of its scanning line.

Upon reception of an L signal BUSY1, the host computer 4201 sets the signal AHDL at L, and outputs image data with the scanning line address. This signal AHDL and PDi (i=0 to 15) are commonly transferred to the displays 4120 and 4130. Upon reception of the image data, the display 4100 starts driving the corresponding scanning line after an elapse of the above-mentioned wait time, and issues the next data request at a timing corresponding to 1H. More specifically, the display 4100 issues data requests at periods of "1H+wait time tw0".

The wait time tw0 is set at a time that can absorb the difference in 1H that changes by heat produced by the display element at the ambient temperature of the display 4100. In FIG. 32 that shows optimal drive conditions of the liquid crystal display element 4105, 1H set when the power supply of the display 4100 is turned on at room temperature of 25° C. is about 130 $\mu$s. When driving for display continues in this environment, the temperature of the liquid crystal display element 4105 rises due to heat produced by itself and heat produced by the backlight 4106, and saturates at about 35° C. For this reason, 1H as optimal drive conditions is set at about 100 $\mu$s. The wait time tw0 is selected to be equal to 1H of the display 4120 or 4130 when the power supply of the display 4120 or 4130 is turned on while the temperature of the display 4100 has saturated, and the display 4100 is driven with the shortest 1H.

On the other hand, as optimal drive conditions for the display 4120, 1H' longer than 1H of the display 4100 is selected in FIG. 46. Such 1H is selected when the power supply of the display 4120 is turned on after the display 4100 started driving first and its internal temperature has sufficiently risen. In such case, if the connected displays are present in a single room, $$1H' \leq 1H + tw0$$

nearly holds.

The display 4120 which operates in the slave mode receives image data which are output in response to the L signal BUSY1 output from the display 4100 which operates in the master mode, starts driving drv2 of the corresponding scanning line, and waits for the next data request at a timing corresponding to its own 1H. The image data wait time is produced every 1H', but since the transfer period of image data is "1H+wait time (tw0)" of the display 4100, driving is suspended for time tw1 given by:

$$tw1 = 1H + tw0 - 1H'$$

However, the display 4120 never fails to receive the transferred image data.

Similarly, as optimal drive conditions for the display 4130, 1H equal to that of the display 4100 is selected. Such 1H is selected when the power supply of the display 4130 is turned on immediately after the ON timing of the display 4100. Likewise, the display 4130 receives image data output in response to the L signal BUSY1 output from the display

4100 which operates in the master mode, starts driving drv3 of the corresponding scanning line, and issues the next data request at a timing corresponding to its own 1H. The data request is issued at a 1H' period, but since the transfer period of image data is "1H+tw0" of the display 4100, data reception is delayed by the same wait time tw0 as that of display 4100, and driving is suspended for the same period of time.

As described above, in the apparatus of the fifth embodiment, since the display which has a communication means other than transfer of image data and communicates with the host comprises means for appropriately selecting its operation mode using the communication means other than transfer of image data prior to the beginning of display, since only one display communicates with the host in accordance with the selected operation mode and executes the operation mode for inserting the appropriately selected wait time in driving for one scanning line, or since a plurality of other displays do not perform communications in accordance with the selected operation me, a plurality of displays are connected to a single line cable to simultaneously display without arranging any additional circuit such as a new memory other than the internal arrangement of the host.

Since the wait time is inserted, the frame rate of the displayed image drops slightly as compared to a display is solely connected to the host. For example, as has already been described above, when the temperature of the liquid crystal display element has saturated in a 25° C. environment, driving can be done with 1H of about 100 $\mu$s and a frame frequency of 9.8 Hz. In this embodiment, since the wait time is inserted, the driving period becomes approximately 130 $\mu$s, and the frame frequency becomes 7.5 Hz. However, since the display device of this embodiment which uses a ferroelectric liquid crystal as that of the liquid crystal element utilizes the characteristics (memory characteristics) of the ferroelectric liquid crystal that can hold the current state after the applied voltage is removed once ON or OFF data is written in one pixel, it can be used with practically no image quality drop by a technique of preferentially rewriting any changed area of the displayed image (partial rewrite technique) or the like.

The branch connector in the above-mentioned display system has the power supply controller 4234, and performs power supply when the unit ID transmitted from the host matches the ID value set by the dip switch 4302 (FIG. 28). Hence, when the unit ID of the display to be driven in the master mode is set and display data is transferred, one display is set in the master mode. After that, by transmitting image data to other displays (by setting the unit IDs of the other displays), the power supplies of these displays are turn on in turn.

On the other hand, power supply from the branch connector may quit by monitoring the signal PWON from the host by the comparator 4304. More specifically, when the signal PWON goes H, power supply from the branch connector quits. In this case, after an elapse of a delay time required for the end processing (step S4111 (FIG. 35)) and the like of the display, the power supply is turned off.

In the display system of this embodiment, when the unit ID is 0h, it designates all the displays. Hence, the comparator 4304 may output a power supply ON signal when the input ID signal is equal to either the ID value set by the dip switch 4302 or 0h.

Furthermore, in the display system, the power supply ON signal (the output from the comparator 4304) may be output from the branch connector to the display or may be used for turning on/off the backlight of the display.

When a reflection ferroelectric liquid crystal display is used as the display, power supply may be stopped when the dip switch 4302 does not match the input ID signal.

More specifically, according to the fifth embodiment, in a multi-display system in which a plurality of display devices with unique IDs are connected on a communication I/F cable, electric power for the required portion is supplied during only a period in which image data for each display device is present on the communication I/F cable, thus reducing consumption power.

Especially, when a reflection FLCD or the like is used as the display device, the power supply of the display device itself can be turned off, and great power savings can be realized.

On the other hand, the branch connector may quit power supply when it does not receive the set ID signal for a predetermined period of time or more. With this control, a function similar to the auto power OFF mode can be realized.

As described above, according to the third to fifth embodiments, since the required power supplies are automatically turned on/off on the basis of the ON/OFF states of power supplies in peripheral devices connected, the user need not turn on branch devices according to the ON states of the peripheral devices, thus improving operability.

According to the present invention, since electric power is automatically supplied to a peripheral device designated by the host equipment, the user need not turn on the peripheral device to be used, thus improving operability.

<Sixth Embodiment>

Figure 47:
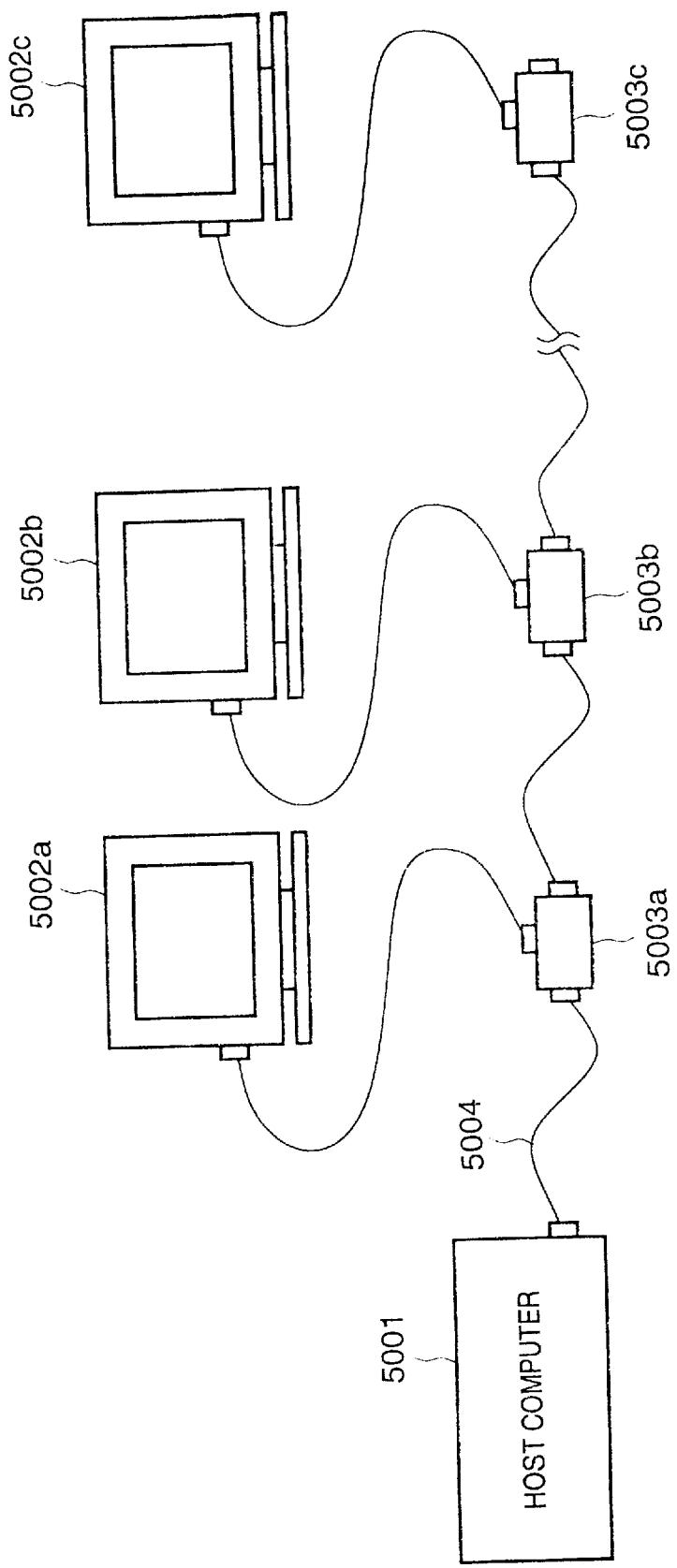
FIG. 47 is a diagram showing an example of the arrangement of a display system according to the sixth embodiment of the present invention.

FIG. 47 shows an example of the arrangement of a display system according to the sixth embodiment of the present invention.

Reference numeral 5001 denotes a host computer (to be also referred to as a host hereinafter) serving as an image source; 5002a, 5002b, and 5002c, displays with memory characteristics such as ferroelectric liquid crystal displays; 5003a, 5003b, and 5003c, branch connectors for connecting the displays in a chain pattern; and 5004, cables for connecting the host 5001, displays 5002a to 5002c, and branch connectors 5003a to 5003c. These devices build a system which supplies image data output from the single host 5001 to the displays 5002a to 5002c via the branch connectors 5003a to 5003c to simultaneously display the image data.

Figure 48:
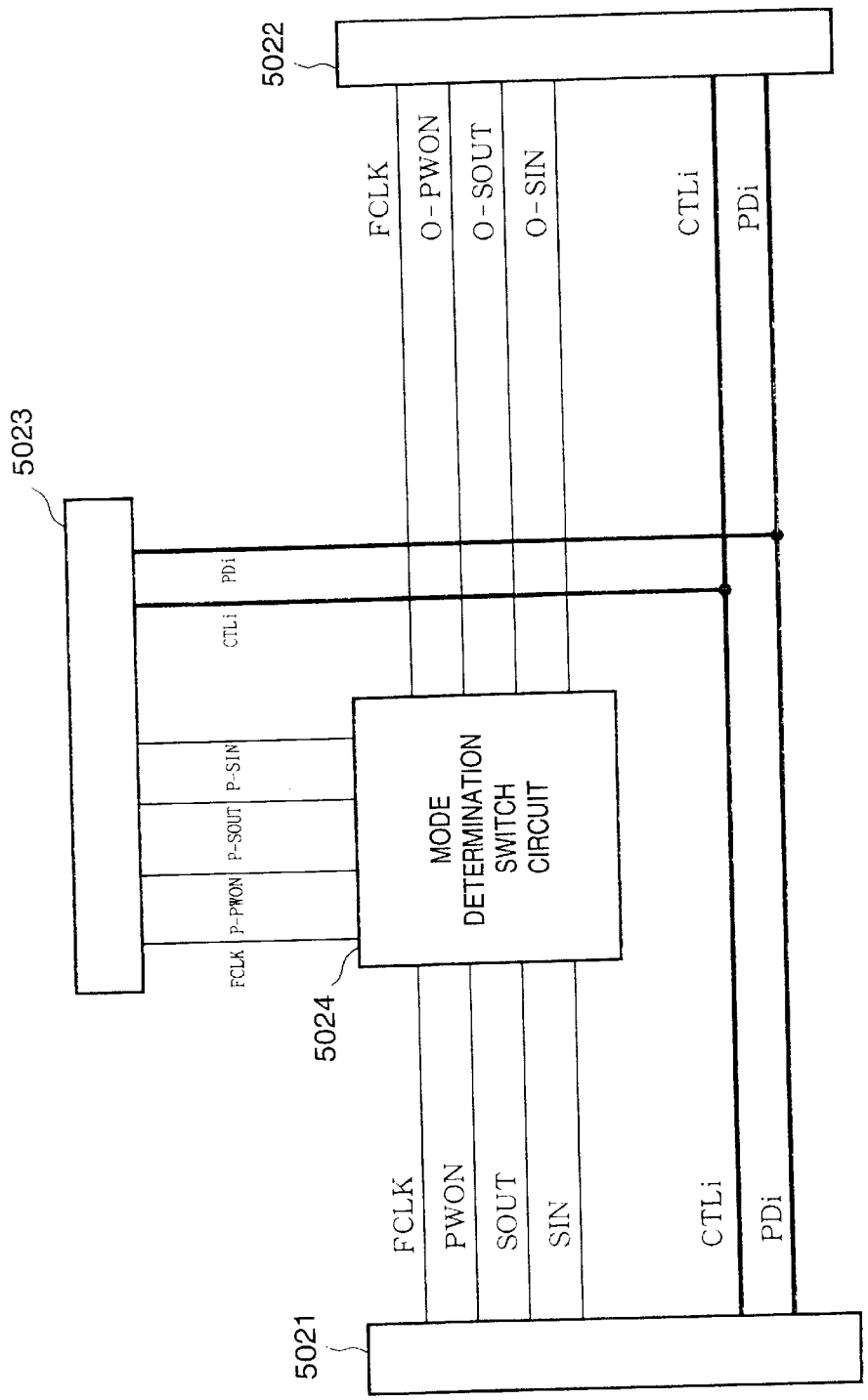
FIG. 48 is a block diagram showing the internal arrangement of each of branch devices 5003a, 5003b, and 5003c according to the sixth embodiment of the present invention.

FIG. 48 shows the internal arrangement of each of the branch connectors 5003a, 5003b, and 5003c of the sixth embodiment.

In the following description, the branch connector 5003a will be exemplified as long as otherwise specified.

In FIG. 48, reference numeral 5021 denotes a connector which receives the cable connected to the host 5001; 5022, a connector which receives the cable connected to the branch connector 5003b in the next stage side; and 5023, a connector which receives the cable connected to the display 5002a. Reference numeral 5024 denotes a mode determination switch circuit which determines if serial communications between the host 5001 and display 5002a are to be made, and switches the signal path. The mode determination switch circuit 5024 will be explained in detail later.

Signals input from the connectors 5021, 5022, and 5023 are pulled up (not shown). When the host 5001, branch connector 5003b, or display 5002a is connected to one of the connectors 5021, 5022, and 5023 or its power supply is not turned on, the corresponding signal is set at high level (Hi). Hence, for example, the branch connector 5003b cannot be used unless the power supply is input to the branch connector 5003a connected on the host side of the branch connector 5003b.

Signals at the connectors shown in FIG. 48 will be explained below. At the connector 5021, reference symbol FCLK denotes sync clocks for an image signal; PWON, a signal indicating that the host 5001 is ON; SOUT, a serial communication signal to be output to the host 5001; SIN, a serial communication signal input from the host 5001; CTLi, an image data control signal; and PDi, image data. When the branch connectors are connected to the previous and next stage sides of a given branch connector (e.g., in case of the branch connector 5003b in FIG. 47), SOUT is the serial communication signal to be output to the branch connector on the previous stage side (e.g., to the branch connector 5003a in FIG. 47), and SIN is the serial communication signal input from the branch connector on the previous stage side (e.g., from the branch connector 5003a in FIG. 47).

At the connector 5022, reference symbol FCLK denotes sync clocks for an image signal; O-PWON, a signal which informs the branch connector on the next stage side (e.g., the branch connector 5003b in FIG. 47) that the power supply of the host is ON; O-SOUT, a serial communication signal input from the branch connector on the next stage side; O-SIN, a serial communication signal output to the branch connector on the next stage side; CTLi, an image data control signal; and PDi, image data.

Furthermore, at the connector 5023, reference symbol FCLK denotes sync clocks for an image signal; P-PWON, a signal which informs the display that the power supply of the host is ON; P-SOUT, a serial communication signal input from the display 5002a; P-SIN, a serial communication signal output to the display 5002a; CTLi, an image data control signal; and PDi, image data.

Mode determination for checking if serial communications are to be made, and the switching patterns in the respective modes in the mode determination switch circuit 5024 will be explained below.

The arrangement and operation for mode determination will be explained first.

Figure 49:
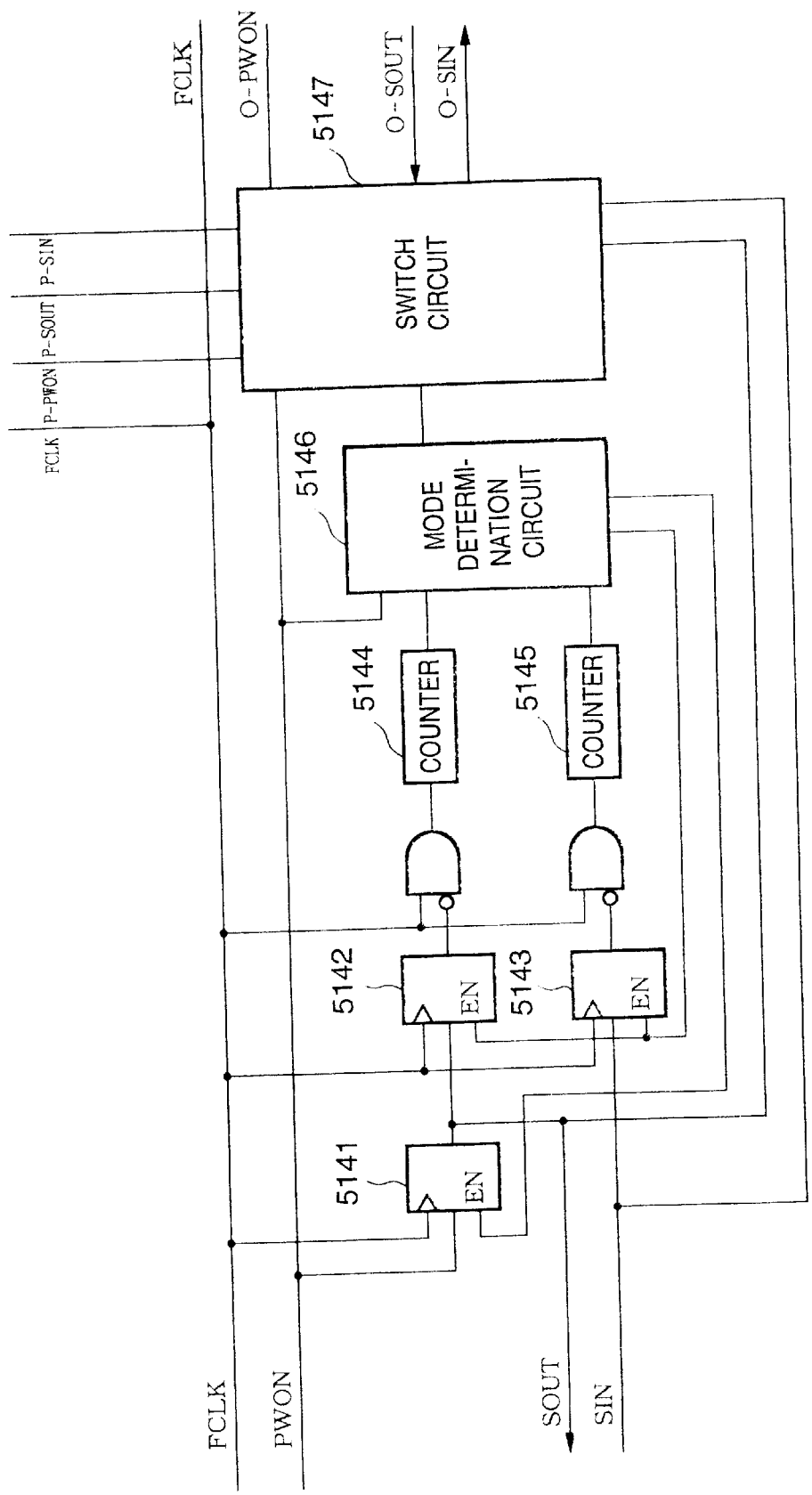
FIG. 49 is a block diagram showing an example of the arrangement of a mode determination circuit.

FIG. 49 is a block diagram showing an example of the arrangement of the mode determination switch circuit.

Reference numerals 5141, 5142, and 5143 denote latch circuits which are synchronized with the clocks FCLK and are gate-controlled by a mode determination circuit 5146. The latch circuit 5141 latches the signal PWON, the latch circuit 5142 the latch output of the latch circuit 5141, and the latch circuit 5143 the signal SIN. Reference numerals 5144 and 5145 denote counters for respectively measuring 200 ms and 100 µs by counting the clocks FCLK. Reference numeral 5146 denotes a mode determination circuit for determining whether or not serial communications between the host 5001 and display are to be made. Reference numeral 5147 denotes a switch circuit for switching the signal path by monitoring the mode determination result of the mode determination circuit 5146 and the connection state of the display 5002a. The switching states of the switch circuit 5147 in the respective modes will be explained later with reference to FIGS. 53A, 53B, and 53C.

The method of determining the master or slave mode in the mode determination circuit 5146 will be described below with reference to FIG. 49 above and FIGS. 50 and 51.

Figure 50:
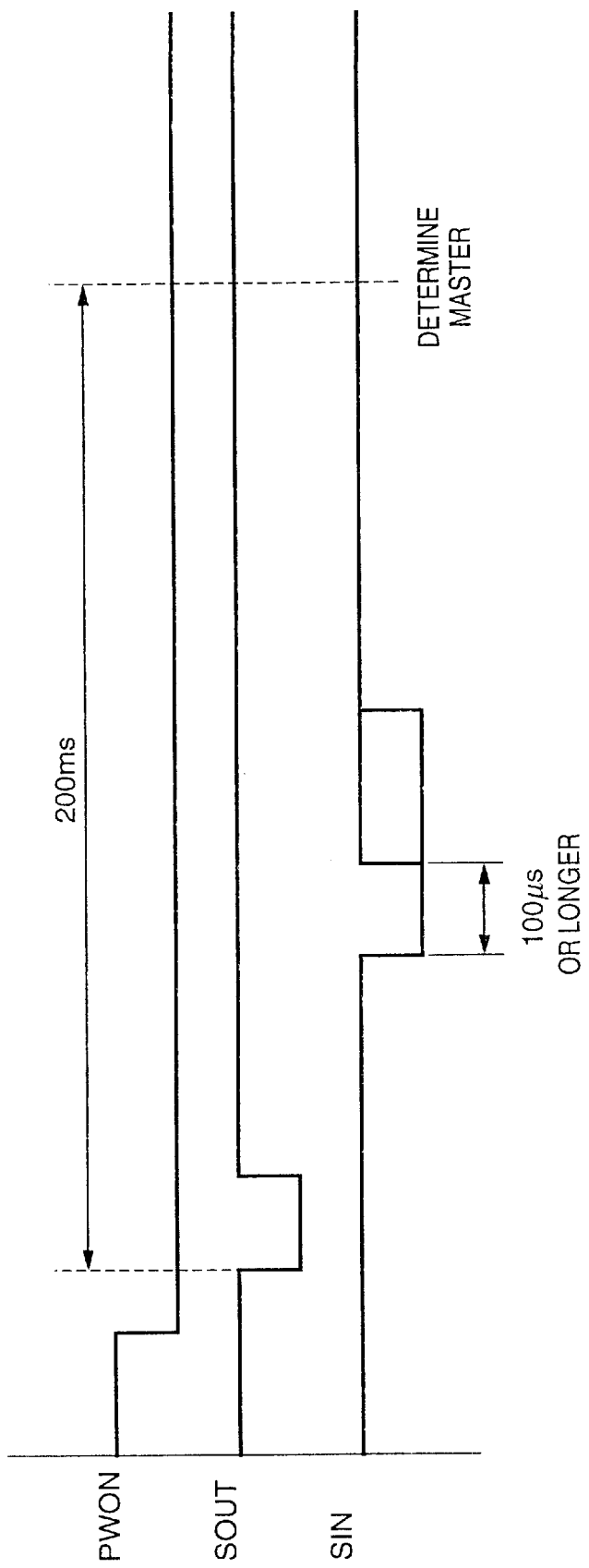
FIG. 50 is a timing chart showing the timings of the signals PWON, SIN, and SOUT.
Figure 51:
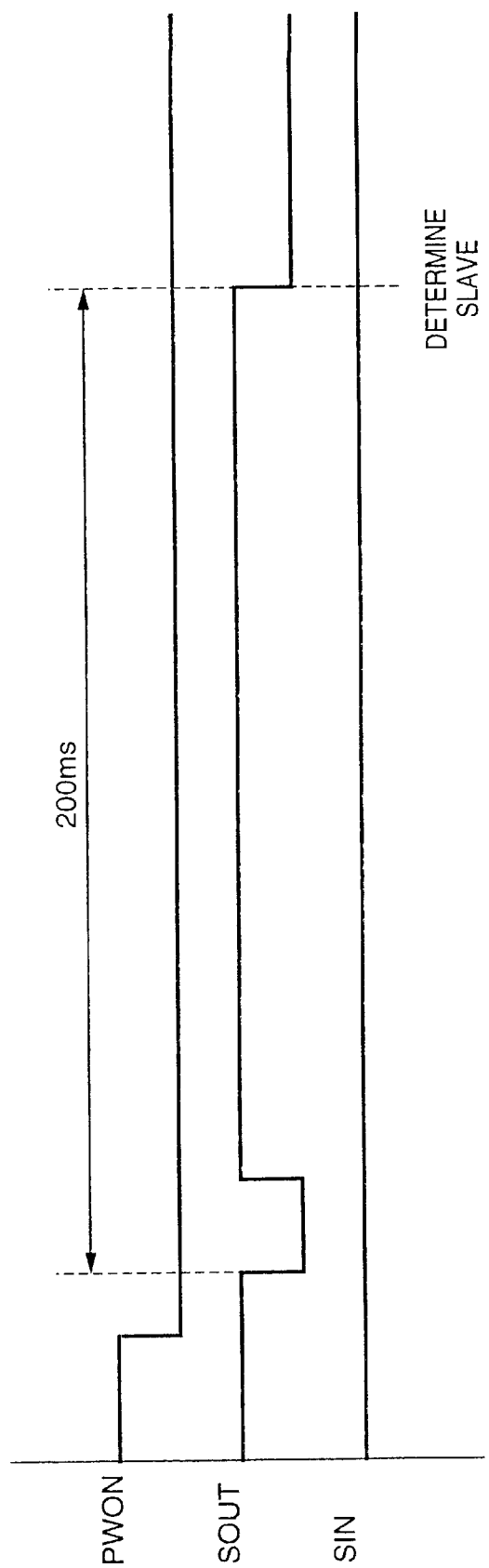
FIG. 51 is a timing chart showing the timings of the signals PWON, SIN, and SOUT.

FIG. 50 is a timing chart of the signals PWON, SIN, and SOUT when the power supply of the host 5001 is turned on while the branch connector and display are ON.

According to the communication format of this embodiment, since a pulse signal of 100 µs or more (SIN) is sent back within 200 ms after the signal SOUT was output if serial communications with the host are made, the master mode can be determined by detecting this pulse signal. FIG. 51 is a timing chart of the signals PWON, SIN, and SOUT when the power supplies of the branch connector and display are turned on while a given display that operates in the master mode already exists on the previous stage side. When the branch connector which operates in the master mode exists on the previous stage side, the signal SIN maintains Hi with respect to the output SOUT. As a result, the branch connector of interest is set in the slave mode.

Note that 200 ms and 100 µs are set based on the communication protocol of the serial communications used in this embodiment. Hence, if other communication protocols are used, such time setups are changed according to the protocols used.

Figure 52:
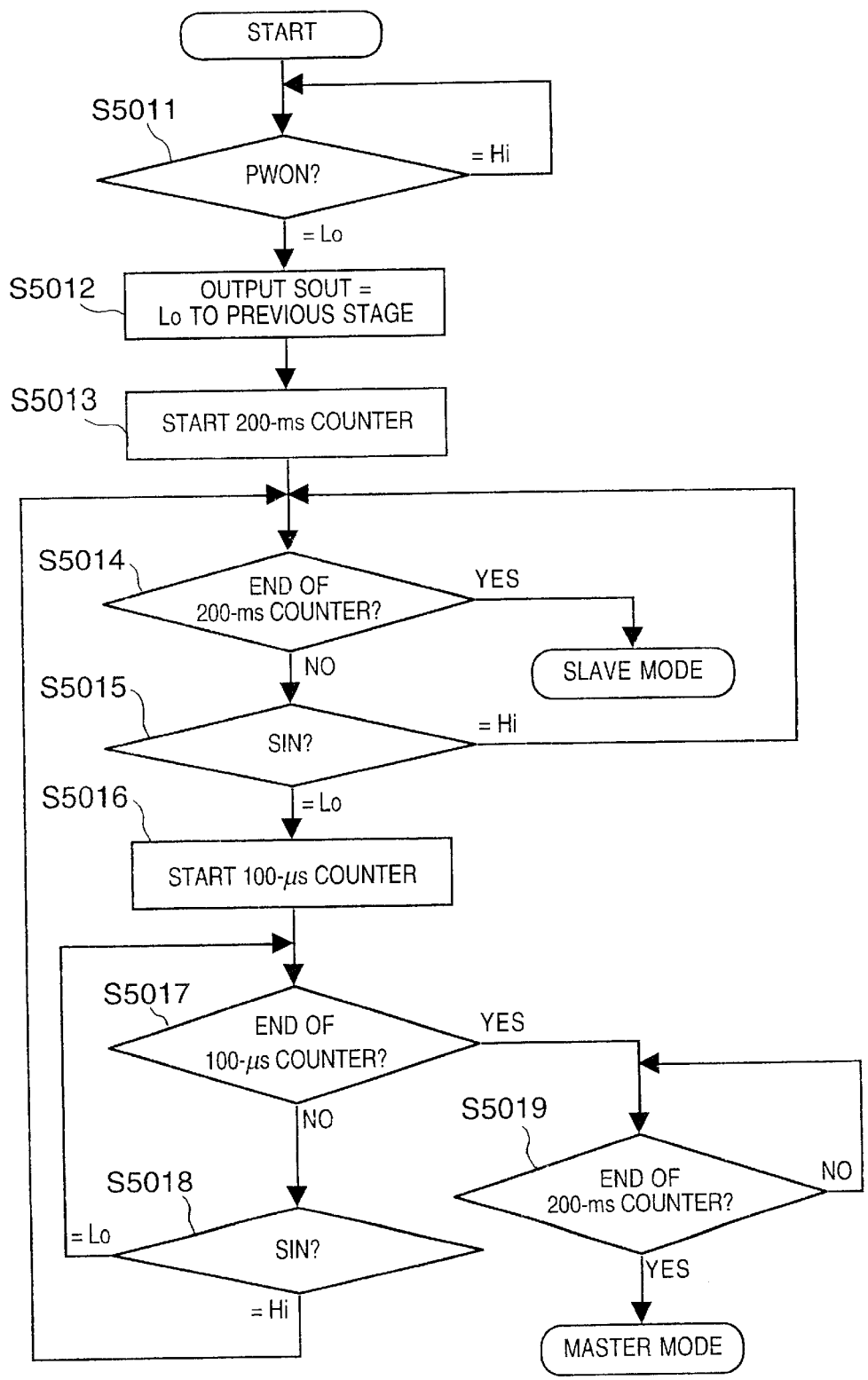
FIG. 52 is a flow chart showing the determination sequence of the master and slave modes according to the sixth embodiment of the present invention.

FIG. 52 is a flow chart for explaining the determination sequence of the master or slave mode according to the sixth embodiment.

The operation of the mode determination switch circuit 5024 will be described in detail below with reference to FIGS. 49 and 52.

When the power supply of the host 5001 is turned on, the signal PWON changes from high level (Hi) to low level (Lo) as a result of initialization of the host 5001. The mode determination circuit 5146 is temporarily reset since the signal PWON has changed to Hi. When the signal PWON changes to Lo, the gates of the latch circuits 5141, 5142, and 5143 are enabled, and the latch circuit 5141 outputs a Lo signal SOUT (steps S5011 and S5012). Subsequently, the output from the latch circuit 5142 also changes to Lo, and the counter 5144 starts counting clocks FCLK (step S5013).

To restate, the counter 5144 measures 200 ms, and when the signal SIN does not go Lo during 200 ms, the slave mode is determined for the device (steps S5014 and S5015). In case of the branch connector 5003a, since the partner of serial communications is the host 5001, the signal SIN changes to Lo in response to a response signal from the host 5001 (FIG. 50). When the signal SIN is latched by the latch circuit 5143, the counter 5145 counts clocks FCLK to start measurement of 100 µs (steps S5015 and S5016).

When the latch circuit 5142 latches the Lo output SOUT and the counter 5144 has measured 200 ms, if both the counters 5144 and 5145 have been counted up, the master mode is determined (steps S5017 to S5019). On the other hand, if the counter 5144 alone has been counted up, the slave mode is determined. In this example, since both the counters 5144 and 5145 have been counted up, the master mode is determined for the branch connector 5003a. Based on this determination result, a signal is sent to the switch circuit 5147 to perform gate processing of the latch circuits and the like.

In FIG. 47, when the display 5002b and branch connector 5003b are turned on while the display 5002a and branch connector 5003a are operating in the master mode, the branch connector 5003b supplies a Lo signal SOUT to the branch connector 5003a, but the branch connector 5003a which is operating in the master mode does not inform the host 5001 of reception of this signal, and keeps outputting Hi level as the signal O-SIN. As a consequence, the branch connector 5003b cannot detect any Lo signal SIN within 200 ms, and is set in the slave mode (FIG. 51).

Figure 53A:
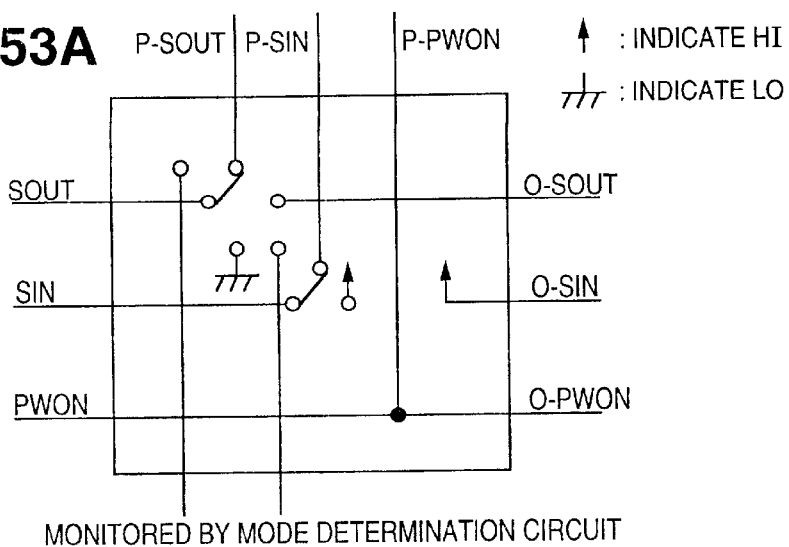
FIG. 53A is a diagram for explaining the connection state of a switch circuit in the respective modes.
Figure 53B:
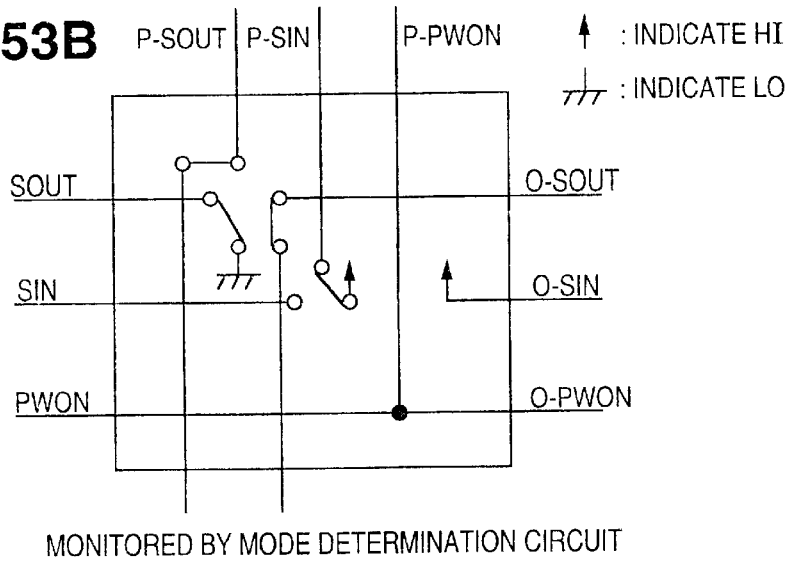
FIG. 53B is a diagram for explaining the connection state of the switch circuit in the respective modes.
Figure 53C:
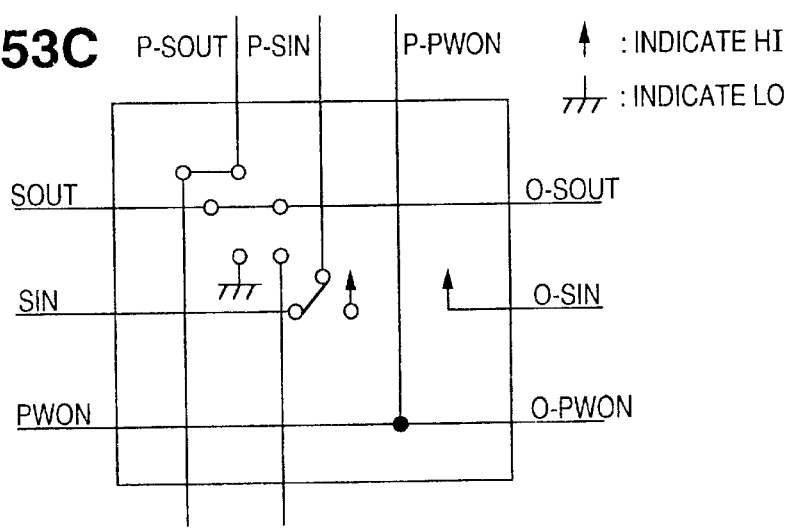
FIG. 53C is a diagram for explaining the connection state of the switch circuit in the respective modes.

FIGS. 53A, 53B, and 53C are views for explaining the connection states of the switch circuit in the respective modes.

The switch circuit 5147 switches, as shown in FIGS. 53A, 53B, and 53C, on the basis of the signal sent from the mode determination circuit 5146.

In the master mode, the gates of all the latch circuits 5141, 5142, and 5143 are disabled. As shown in FIG. 53A, the switch circuit connects SOUT and P-SOUT and SIN and P-SIN to realize serial communications between the host and the display connected to the branch connector of interest. Also, the switch circuit connects PWON and P-PWON. The signal O-SOUT input from the branch connector in the slave mode is ignored (NC), and the signal O-SIN to be output to the branch connector in the slave mode is kept at Hi. For this reason, as described above, when the power supply of the branch connector on the output stage side of the branch connector in the master mode is turned on, the signal SOUT output from the branch connector on the output stage side is ignored, the signal SIN is maintained Hi, and the branch connector on the output stage side is set in the slave mode.

In the branch connector set in the slave mode, the latch circuit 5141 remains enabled, and the latch circuits 5142 and 5143 are disabled. As a consequence, as shown in FIG. 53B, the signal SOUT from the branch connector in the slave mode is always Lo. The state of SIN is ignored (NC). Furthermore, the signal P-SOUT as the input from the display is monitored but is not output to an external branch connector. The branch connector in the slave mode checks by monitoring the signal P-SOUT if the power supply of the corresponding display is ON. Also, the signal P-SIN to be output from the switch circuit 5147 to the display is maintained Hi.

Furthermore, the signal SOUT (Lo in case of the device in the slave mode) from the branch connector on the output stage side is received as a signal O-SOUT so as to monitor the operation state of the branch connector on the output stage side. Also, the signal SIN input from the branch connector on the input stage side (host side) is ignored (NC), and the signal O-SIN to be output to the branch connector on the output stage side and the signal P-SIN to be output to the display are kept at Hi. Furthermore, the signal PWON is connected to P-PWON and O-PWON.

When the display is removed (disconnected) or its power supply is turned off, the switch circuit 5147 connects signals, as shown in FIG. 53C. More specifically, the switch circuit connects SOUT and O-SOUT, and SIN and O-SIN to serve as a simple relay that connects the serial signals from the branch connector on the input stage side to that on the output stage side. Also, the switch circuit monitors the signal P-SOUT from the display. Upon confirmation of power ON of the display, the switch circuit sets the signals P-PWON and O-PWON at Hi to make the branch connector on the output stage side to set its mode (FIG. 52) and also sets its own mode. As a result, if the branch connector of interest is closest to the host, this branch connector is newly set in the master mode, and that on its output stage side is set in the slave mode.

For example, when the display connected to the branch connector which is operating in the master mode is disconnected or its power supply is turned off, for example, when the display 5002a is disconnected from the branch connector 5003a or the power supply of the display 5002a is turned off, the signal O-PWON is temporarily set at Hi and is then set at Lo. With this control, the branch connector connected to the output side of the branch connector of interest sets its mode, and is newly set in the master mode. Note that disconnection of the display and power OFF can be detected by monitoring P-SOUT.

Upon completion of mode setups, the display 5002a connected to the branch connector 5003a set in the master mode makes serial communications with the host 5001 to supply display performance information in its operation environment. The host 5001 sets the transfer rate of image data and the like on the basis of the display performance information obtained via the serial communications, and outputs image data. The display set in the slave mode displays according to image data output from the host 5001.

Note that the serial communications between the host and display used in the sixth embodiment use those described previously in the fifth embodiment with reference to FIGS. 36 to 40.

By exchanging information in these communication protocols, the host can be informed of the drive conditions of the display depending on temperature, and a display state suitable for the display performance can be obtained.

As described above, according to the sixth embodiment, when a plurality of displays are connected to a single host, the master and slave displays can be automatically determined. Even when the power supply of an OFF/ON display is turned on/off, the master and slave displays are re-set appropriately, thus preventing operation errors.

A connection device, which selectively passes signals to be exchanged with the host to a display, specifies a display (in the master mode) that makes serial communications with the host, and inhibits other displays from making serial communications with the host. In this fashion, as described above with reference to FIG. 32, display data corresponding to change in display performance in the actual operation environment can be generated without changing the information volume from the conventional one.

The display that makes serial communications is automatically determined, and other displays are automatically set in a state wherein they are inhibited from making serial communications. Hence, no complicated setups are required. Upon turning on/off the power supply, the display in the master mode is re-set automatically. For this reason, each display can receive display data corresponding to the display performance in the actual operation environment from the host.

<Seventh Embodiment>

The seventh embodiment of the present invention will be explained below.

In the seventh embodiment, the operations of the display controller and drive controller of the display are different from those in the fifth embodiment. In the seventh embodiment, even when the power supply of the display that is operating in the master mode is turned off, other displays that is operating in the slave mode automatically detect it, and a new display that is to operate in the master mode is automatically determined.

Note that the same reference numerals in the respective drawings to be referred to in the seventh embodiment denote parts that have the same arrangement and perform the same operations as those in the fifth embodiment, and a detailed description thereof will be omitted.

In the internal arrangement of the display in the seventh embodiment, a drive controller 4102 and display controller 4103 perform operations different from those in the fifth embodiment. The operations of the drive controller 4102 and display controller 4103 of the seventh embodiment will be explained below.

Figure 54:
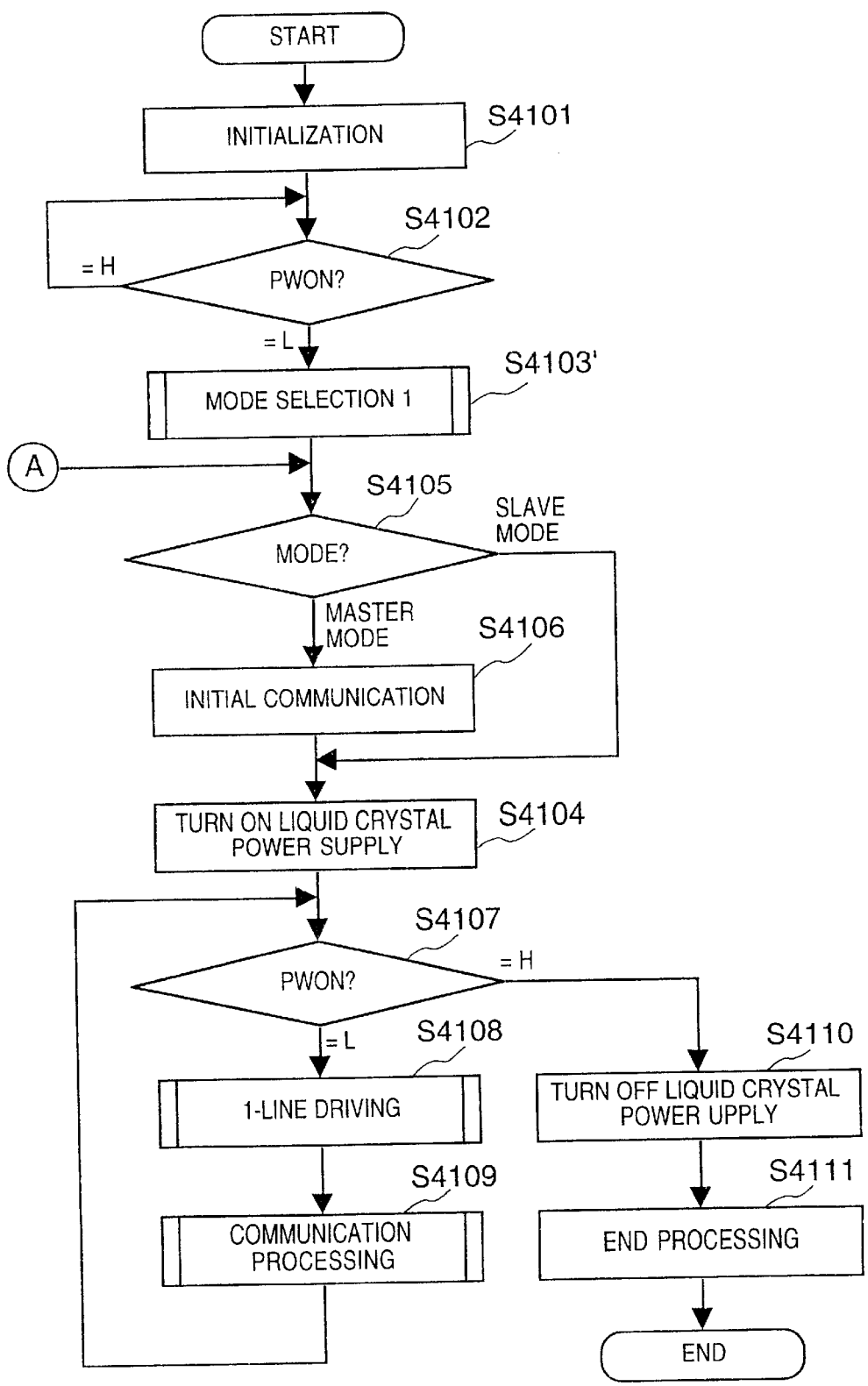
FIG. 54 is a flow chart showing the overall operation of a display controller 303 according to the seventh embodiment of the present invention.

FIG. 54 is a flow chart showing the overall operation of the display controller 4103 in the seventh embodiment.

The ON timing of the liquid crystal power supply in step S4104 is different from the fifth embodiment, but this step may be executed before step S4105 as in the fifth embodiment. Also, in mode selection 1 in step S4103', the same processing as in step S4103 in the fifth embodiment is done.

Figure 55:
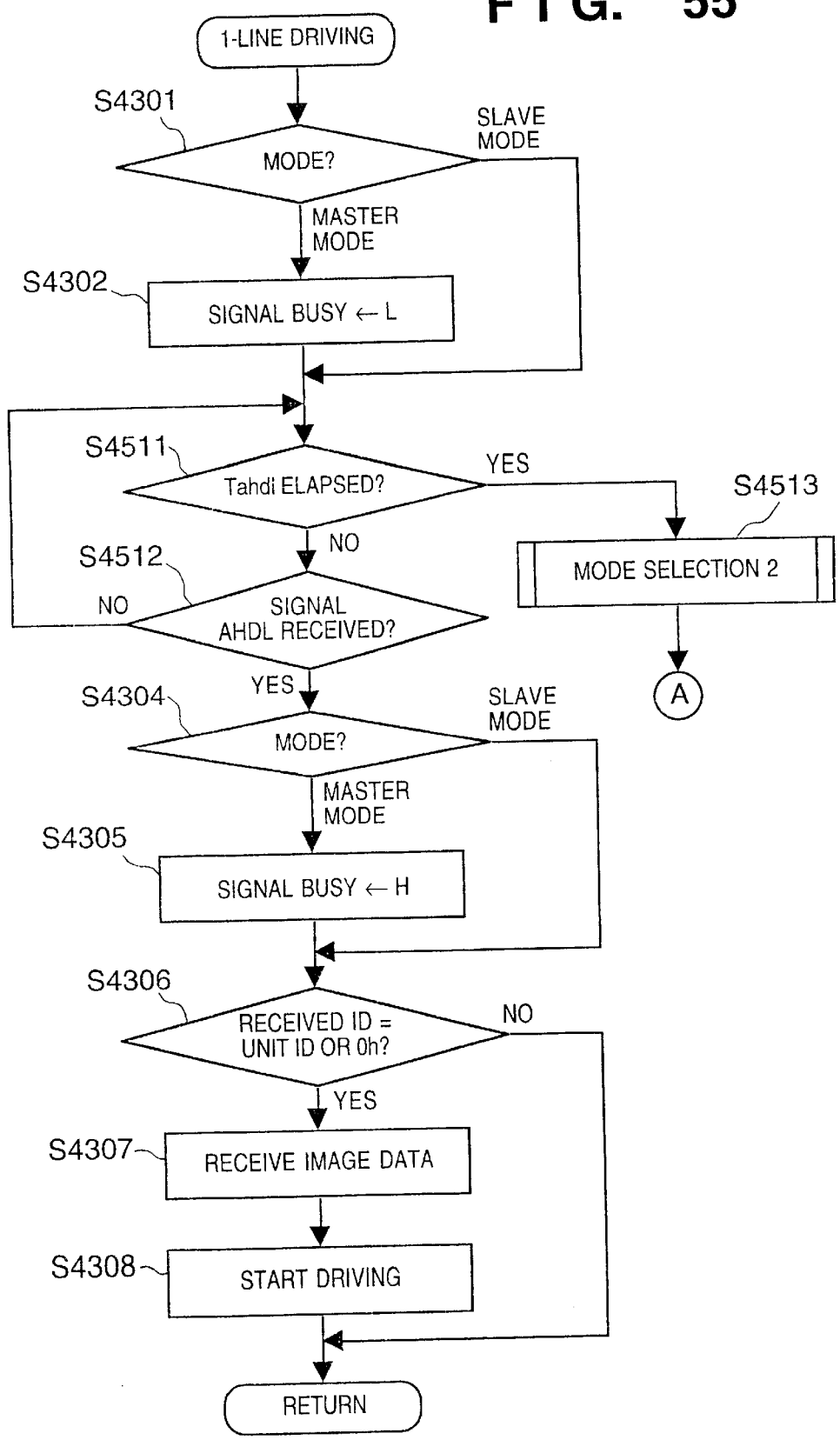
FIG. 55 is a flow chart showing 1-line driving according to the seventh embodiment of the present invention.

FIG. 55 is a flow chart showing 1-line driving according to the seventh embodiment.

In 1-line driving, image data for one horizontal scanning line of a liquid crystal display element 4105 are received from a host computer 4201, and are transferred to the display element 4105 to drive it.

An L image data request signal BUSY is output when the operation mode is the master mode, or the signal BUSY is maintained H in case of the slave mode (steps S4301 and S4302), and the control waits for a signal AHDL indicating start of transfer of image data within a time Tahdl (steps S4511 and S4512).

Upon reception of the scanning line address and unit ID together with an H signal AHDL, the signal BUSY is set at H when the operation mode is the master mode (steps S4304 and S4305). If the received unit I matches that set in an ID setting unit 4108, or if the received unit ID indicates 0h designating all the displays, the subsequent image data are received, and the received image data is transferred to a driver circuit (not shown) of the liquid crystal display element 4105 in synchronism with the timing of the display element 4105, thus instructing start of driving for one scanning line (steps S4304 to S4308). On the other hand, if the received ID neither matches that set in the ID setting unit 4108 nor is 0h, neither reception and transfer of image data to the liquid crystal display element 4105 nor the driving start instruction for one scanning line are made.

If the H signal AHDL cannot be detected within the time Tahdl in steps S4511 and S4512, mode selection 2 is executed (step S4513). Mode selection 2 is the processing for determining the operation mode of the display again.

The image data transfer request to the host computer 4201 is issued by only one display in the master mode of a plurality of connected displays, and other displays in the slave mode commonly receive image data transferred from the host computer 4201 in response to the image data transfer request from the display in the master mode. When the power supply of the display in the master mode is turned off in such state, a plurality of displays in the slave mode must detect interruption of image data transfer, and must start operation for selecting a display that is to operate in the master mode again.

The time-out (AHDL time-out) time Tahdl used for detecting interruption of image data transfer must be selected to be sufficiently longer than the normal data transfer period, but not to disturb the user's use due to interruption of the image data transfer. For example, Tahdl is suitably selected to be approximately 10 to 1,000 times one horizontal scanning time 1H as the drive conditions of each display at that time.

Figure 56:
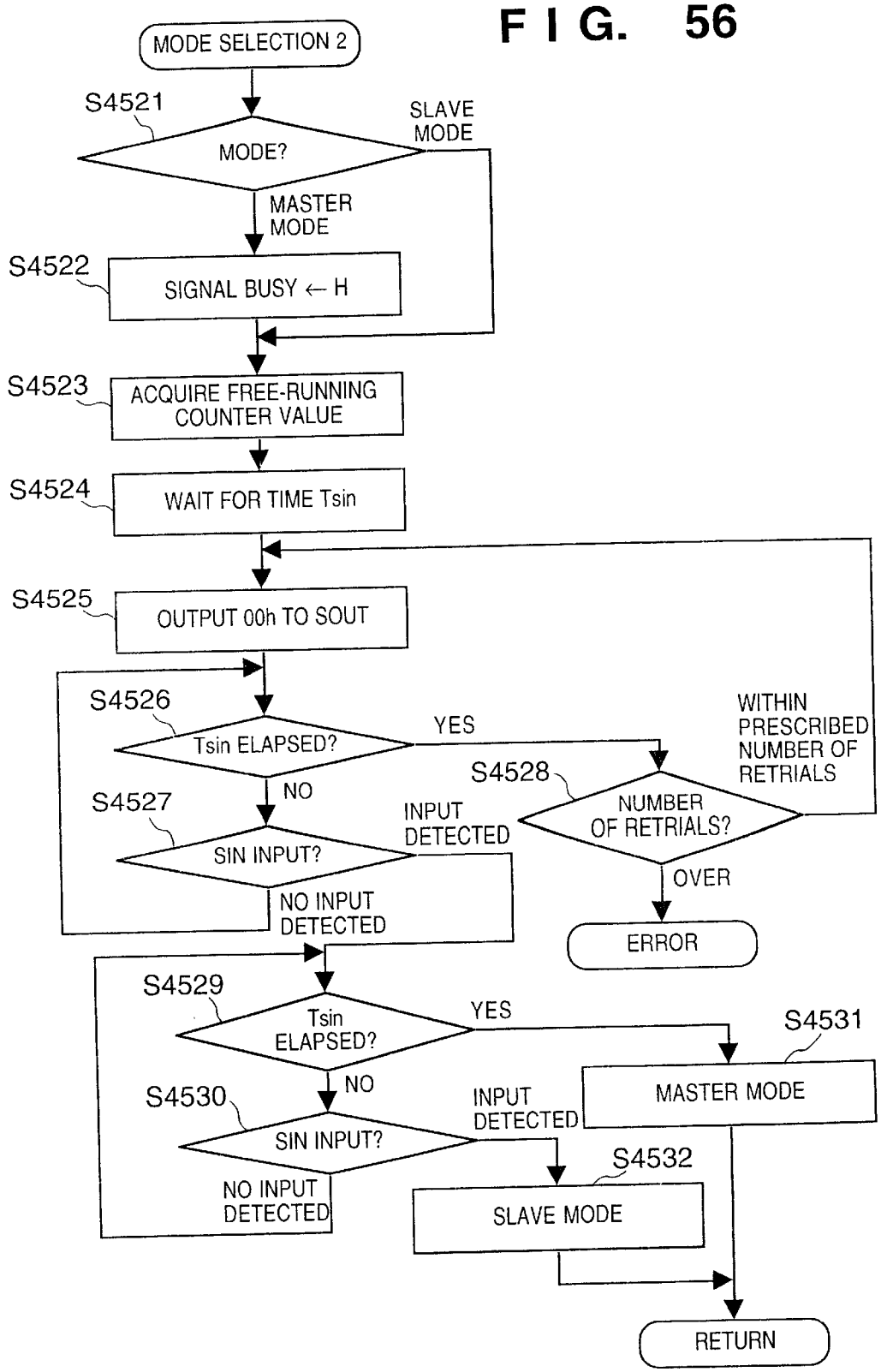
FIG. 56 is a flow chart showing the processing sequence of mode selection according to the seventh embodiment of the present invention.

FIG. 56 is a flow chart showing the processing sequence of mode selection executed in step S4513.

AHDL time-out normally occurs only in the displays in the slave mode. When the display in the master mode executes mode selection 2 in consideration of AHDL time-out arising from some abnormality of the host computer 4201, it sets a signal BUSY at H (steps S4521 and S4522).

Then, the 4 bits on the LSB side are acquired from the internal free-running counter (not shown) of the display controller 4103, and status 0h (OK) is issued after an elapse of time Tsin (steps S4523, S4524, and S4525). The time Tsin will be explained later.

The status issued in step S4525 is an unexpected one for the host computer 4201. The host computer 4201 issues a Request Status command in response to this unexpected status. More specifically, the Request Status command is obtained as the SIN input before an elapse of the time Tsin (e.g., 200 ms), and the flow advances to step S4529 via steps S4526 and S4527.

If another display in the master mode is in operation, since it returns status in response to this Request Statu command, a Request Attention Information command then issued by the host computer 4201 is received within the time Tsin. As a result, the flow advances to step S4532 via steps S4529 and S4530 to determine the slave mode. The flow then returns to step S4105 in FIG. 54 to repeat 1-line driving and communication processing.

On the other hand, if no display in the master mode exists, no command is received after the Request Status command. That is, no Request Attention Information command is issued, and the flow advances to step S4531 after an elapse of the time Tsin, thus determining the master mode. The flow then returns to step S4105 in FIG. 54 to repeat 1-line driving and communication processing.

The time Tsin in mode selection 2 is determined by the unit ID value set in the ID setting unit 4108 and a 4-bit value Clsb on the LSB side of the free-running counter obtained in step S4523 in mode selection 2. That is, the time Tsin is given by:

$$T\text{sin} = \text{unit } ID \times 20 \text{ ms} + C\text{lsb} \times 1 \text{ ms}$$

Since the time Tsin is determined by the above equation, mode selection 2 (operations in step S4525 and the subsequent steps) preferentially starts from a display with a smaller unit ID. Also, even when the displays have an identical unit ID, the operation timing of mode selection 2 varies in units of 1 ms. Hence, even when a plurality of displays nearly simultaneously detect AHDL time-out, collision of serial communications in mode selection 2 can be prevented in practice. The user can control the priority of the displays to be set in the master mode by selecting the unit IDs set in their ID setting units 4108.

As described above, according to the seventh embodiment, in a display which has a communication function (serial communications in this embodiment) other than image data transfer, and communicates with the host, the operation mode can be appropriately selected using serial communications prior to the display start of the display. Especially, since the priority of the displays to be set in the master mode is determined according to the unit IDs of the displays, a desired display can be set in the master mode.

Upon connecting a plurality of displays of identical type to 1-line cables via relay circuits, communications that individual displays make with the host can be prevented from colliding. Also, even when the drive time as optimal drive conditions for the display varies due to internal temperature rise differences arising from heat produced upon driving, and the image data transfer period differs, the host need not have any expensive image memory such as a frame memory, and a plurality of displays can be connected to 1-line cables via simple, inexpensive relay circuits.

In a peripheral device system which connects a plurality of peripheral devices by branching them from a single communication bus, one of these peripheral devices is permitted to communicate control information other than data to be processed by the individual peripheral devices, and other peripheral devices is automatically inhibited from communicating the control information. For this reason, in such peripheral device system, communications pertaining to the control information can be implemented by a lower-cost arrangement.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

What is claimed is:

1. A display control system which has an image memory for storing image information to be displayed on a plurality of display devices and controls said plurality of display devices to display an image on a basis of the image information, the display control system comprising:

designation means for designating a destination display device from said plurality of display devices, each of said plurality of display devices comprising a display screen which has a plurality of display lines;

transmitting means for transmitting to said plurality of display devices, device information representing the destination display device designated by said designation means, line information representing a single display line of the plurality of display lines of the destination display device and image information to be displayed on the single display line; and control means for controlling the single display line of the destination display device to display the image information in accordance with the device information and the line information.

2. The system according to claim 1, wherein a unique identification is respectively assigned to each of said plurality of display devices, and said designation means designates the destination display device of the image information using the respective unique identification.

3. The system according to claim 2, wherein said designation means comprises storage means for storing a plurality of different kinds of image information, and said designation means selects image information to be displayed from the plurality of different kinds of image information stored in said storage means, and designates the identification of the destination display device of the selected image information.

4. The system according to claim 3, wherein said control means stores the selected image information in said image memory upon completion of designation of the identification of the destination display device of the image information selected by said designation means.

5. The system according to claim 3, wherein said control means stores the selected image information in said image memory while a non-assigned identification of a display device is designated.

6. A method of controlling a display control system which has an image memory for storing image information to be displayed on a plurality of display devices and controls said plurality of display devices to display an image on a basis of the image information, the method comprising:

a designation step of designating a destination display device from said plurality of display devices, each of said plurality of display devices comprising a display screen which has a plurality of display lines;

a transmitting step of transmitting to said plurality of display devices, device information representing the destination display device designated by said designation step, line information representing a single display line of the plurality of display lines of the destination display device and image information to be displayed on the single display line; and a control step of controlling the single display line of the destination display device to display the image information in accordance with the device information and the line information.

7. The method according to claim 6, wherein a unique identification is respectively assigned to each of said plurality of display devices, and the designation step includes the step of designating the destination display device of the image information using the identification.

8. The method according to claim 7, wherein the designation step includes the step of selecting image information to be displayed from a storage medium which stores a plurality of different kinds of image information, and designating the identification of the destination display device of the selected image information.

9. The method according to claim 8, wherein the control step includes the step of storing the selected image information in said image memory upon completion of designation of the identification of the destination display device of the image information selected in the designation step.

10. The method according to claim 8, wherein the control step includes the step of storing the selected image information in said image memory while a non-assigned identification of a display device is designated.

11. A computer-readable memory medium which stores program codes for controlling a display control system which has an image memory for storing image information to be displayed on a plurality of display devices, and controls said plurality of display devices to display an image on a basis of the image information, the program codes comprising:

a program code for a designation step of designating a destination display device from said plurality of display devices, each of said plurality of display devices comprising a display screen which has a plurality of display lines;

a program code for a transmitting step of transmitting to said plurality of display devices, device information representing the destination display device designated by said designation step, line information representing a single display line of the plurality of display lines of the destination display device and image information to be displayed on the single display line; and a program code for a control step of controlling the single display line of the destination display device to display the image information in accordance with the device information and the line information.

* * * * *

UNITED STATES PATENT AND TRADEMARK OFFICE
CERTIFICATE OF CORRECTION

PATENT NO. : 6,714,172 B2
DATED : March 30, 2004
INVENTOR(S) : Matsuzaki et al.

It is certified that error appears in the above-identified patent and that said Letters Patent is hereby corrected as shown below:

Title page,
Item [56], References Cited, U.S. PATENT DOCUMENTS, "Inouie" should read -- Inoue --.

Column 19,
Line 14, "denotes" should read -- denote --.

Column 21,
Line 12, "deice" should read -- device --.

Column 23,
Line 66, "1109." should read -- 1109 is set --.

Column 35,
Line 20, "me" should read -- mode --; and
Line 25, "is" should read -- that is --.

Column 40,
Line 43, "is" should read -- are --.

Column 41,
Line 67, "Statu" should read -- Status --.

Column 42,
Line 56, "is" should read -- are --.

Signed and Sealed this

Twenty-fifth Day of January, 2005

JON W. DUDAS
*Director of the United States Patent and Trademark Office*